(12) United States Patent
Furuichi et al.

(10) Patent No.: US 10,149,294 B2
(45) Date of Patent: *Dec. 4, 2018

(54) COMMUNICATION CONTROL DEVICE, COMMUNICATION CONTROL METHOD, AND WIRELESS COMMUNICATION DEVICE

(71) Applicant: SONY CORPORATION, Tokyo (JP)

(72) Inventors: Sho Furuichi, Tokyo (JP); Ryo Sawai, Tokyo (JP); Ryota Kimura, Tokyo (JP); Hiromasa Uchiyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,051

(22) Filed: Nov. 17, 2017

(65) Prior Publication Data

US 2018/0077707 A1   Mar. 15, 2018

Related U.S. Application Data

(63) Continuation of application No. 14/647,936, filed as application No. PCT/JP2013/080915 on Nov. 15, 2013, now Pat. No. 9,844,052.

(30) Foreign Application Priority Data

Jan. 25, 2013  (JP) ................................. 2013-011727

(51) Int. Cl.
*H04W 72/04* (2009.01)
*H04W 16/32* (2009.01)
(Continued)

(52) U.S. Cl.
CPC ....... *H04W 72/0446* (2013.01); *H04W 4/023* (2013.01); *H04W 16/32* (2013.01); *H04W 52/283* (2013.01)

(58) Field of Classification Search
None
See application file for complete search history.

(56) References Cited

U.S. PATENT DOCUMENTS

2002/0049063 A1   4/2002   Nohara et al.
2005/0074019 A1   4/2005   Handforth et al.
(Continued)

FOREIGN PATENT DOCUMENTS

CN   101541071 A   9/2009
CN   101626269 A   1/2010
(Continued)

OTHER PUBLICATIONS

Office Action for CN Patent Application No. 201380070769.4, dated Feb. 14, 2018, 05 pages of Office Action and 10 pages of English Translation.
(Continued)

*Primary Examiner* — Hassan A Phillips
*Assistant Examiner* — Gautam Sharma
(74) *Attorney, Agent, or Firm* — Chip Law Group

(57) ABSTRACT

There is provided a communication control device including an acquiring section that acquires first position related information relating to positions of one or more wireless communication devices among a plurality of access points that perform transmission of signals to a target device in parallel using an identical frequency resource and second position related information relating to a position of the target device, an estimating section that estimates a distance between the target device and each of the one or more wireless communication devices during the transmission on the basis of the first position related information and the second position related information, and a deciding section that decides transmission timing of each of the plurality of access points for the transmission on the basis of informa-
(Continued)

tion that includes information on the estimated distance and relates to a distance between the target device and each of the plurality of access points.

9 Claims, 32 Drawing Sheets

(51) Int. Cl.
*H04W 52/28* (2009.01)
*H04W 4/02* (2018.01)

(56) References Cited

U.S. PATENT DOCUMENTS

| | | |
|---|---|---|
| 2007/0252761 A1 | 11/2007 | Koorapaty et al. |
| 2008/0101262 A1 | 5/2008 | Brunel et al. |
| 2009/0232113 A1 | 9/2009 | Tamaki |
| 2010/0208720 A1 | 8/2010 | Fujishima et al. |
| 2012/0051256 A1 | 3/2012 | Yuda et al. |

FOREIGN PATENT DOCUMENTS

| | | |
|---|---|---|
| EP | 2104248 A2 | 9/2009 |
| JP | 2009-225137 A | 10/2009 |
| JP | 2012-175276 A | 9/2012 |
| WO | 2010/131488 A1 | 11/2010 |

OTHER PUBLICATIONS

Extended European Search Report for EP Application No. 13872341.6, dated Jul. 26, 2016, 5 pages.
International Search Report and Written Opinion of PCT Application No. PCT/JP2013/080915, dated Dec. 10, 2013, 05 pages of English Translation and 06 pages of ISRWO.
International Preliminary Report on Patentability of PCT Application No. PCT/JP2013/080915, dated Aug. 6, 2015, 06 pages of English Translation and 03 pages of IPRP.
Non Final Office Action for U.S. Appl. No. 14/647936, dated Jan. 20, 2017, 17 pages.
Notice of Allowance for U.S. Appl. No. 14/647,936, dated Aug. 7, 2017, 05 pages.

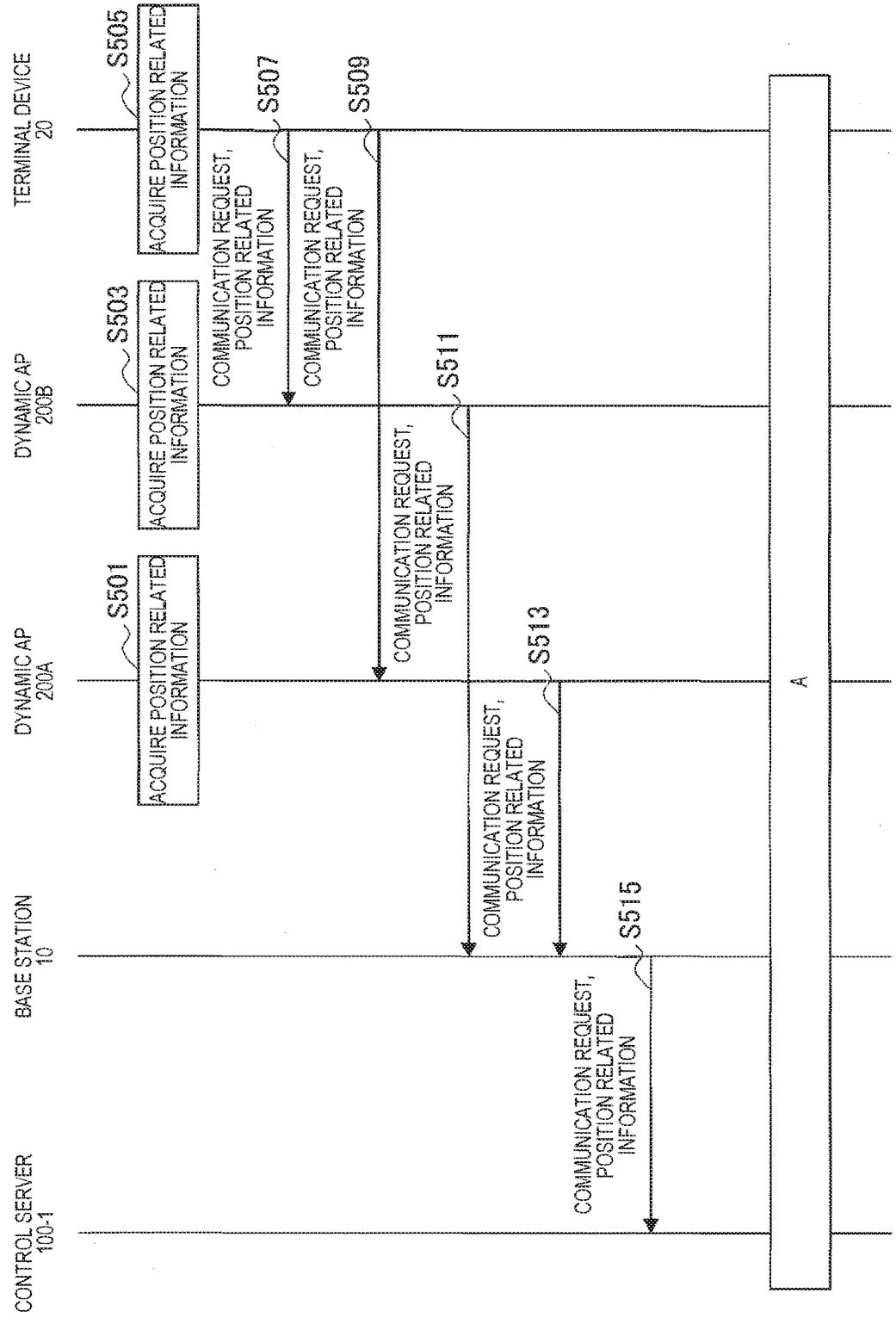

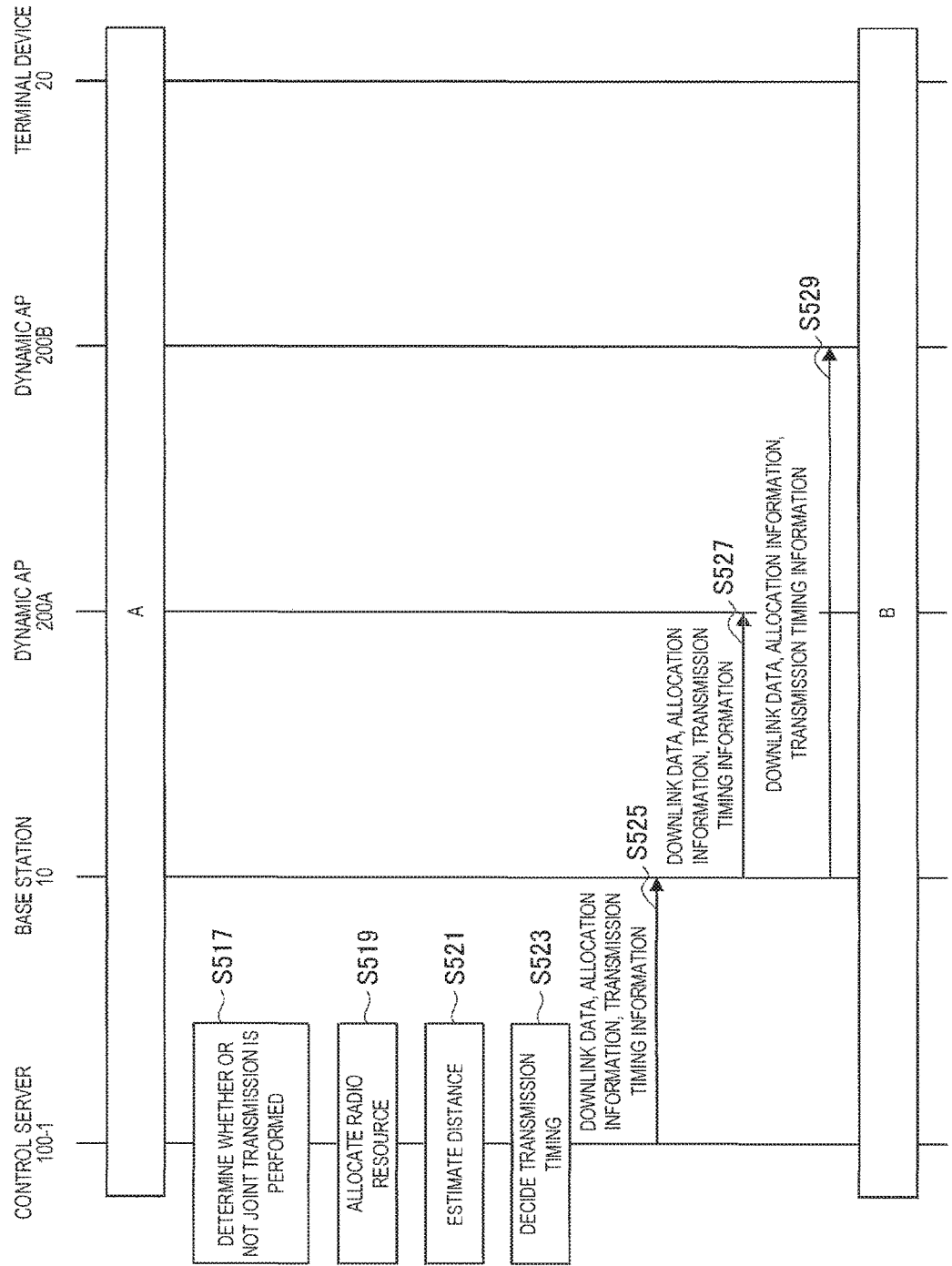

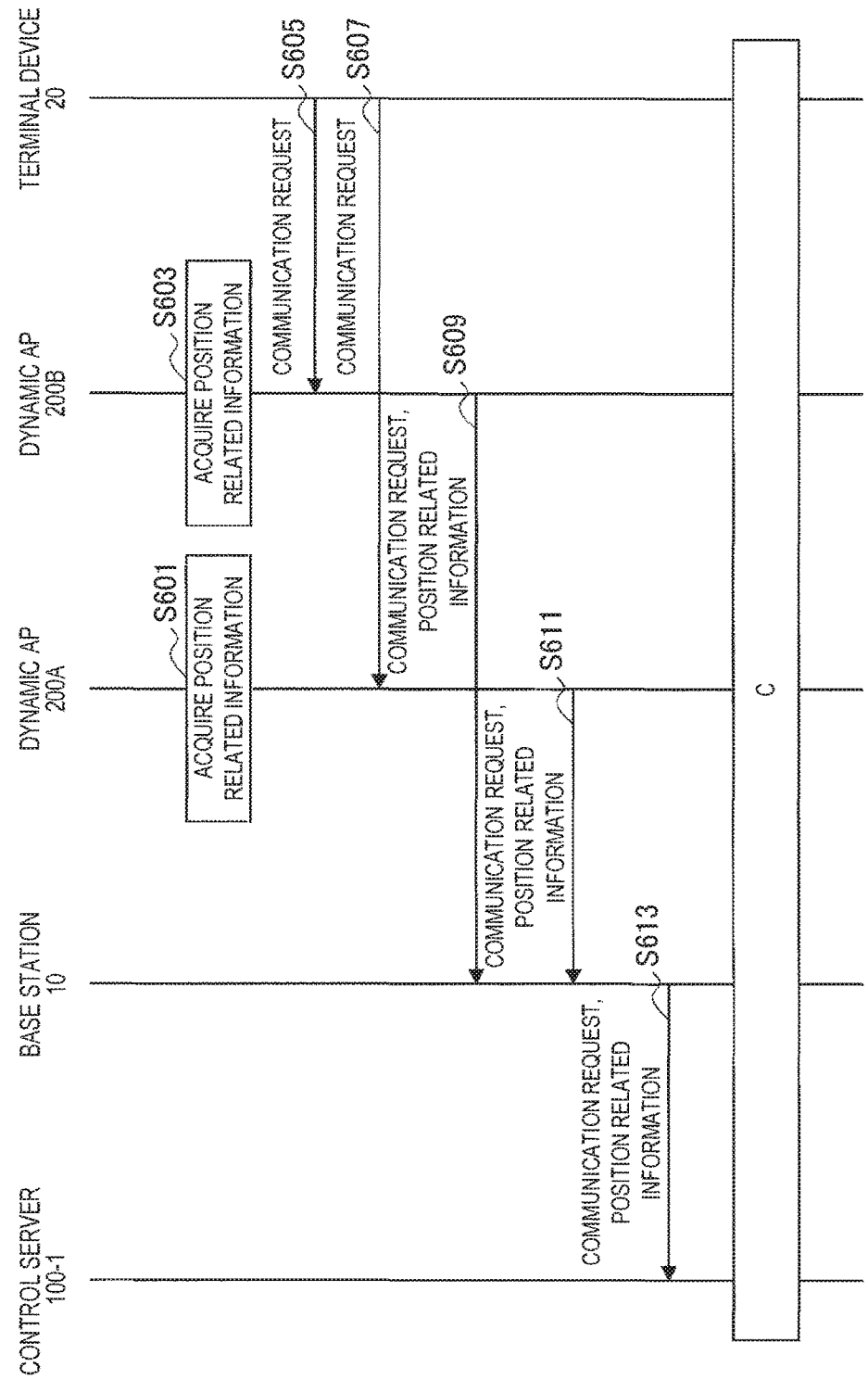

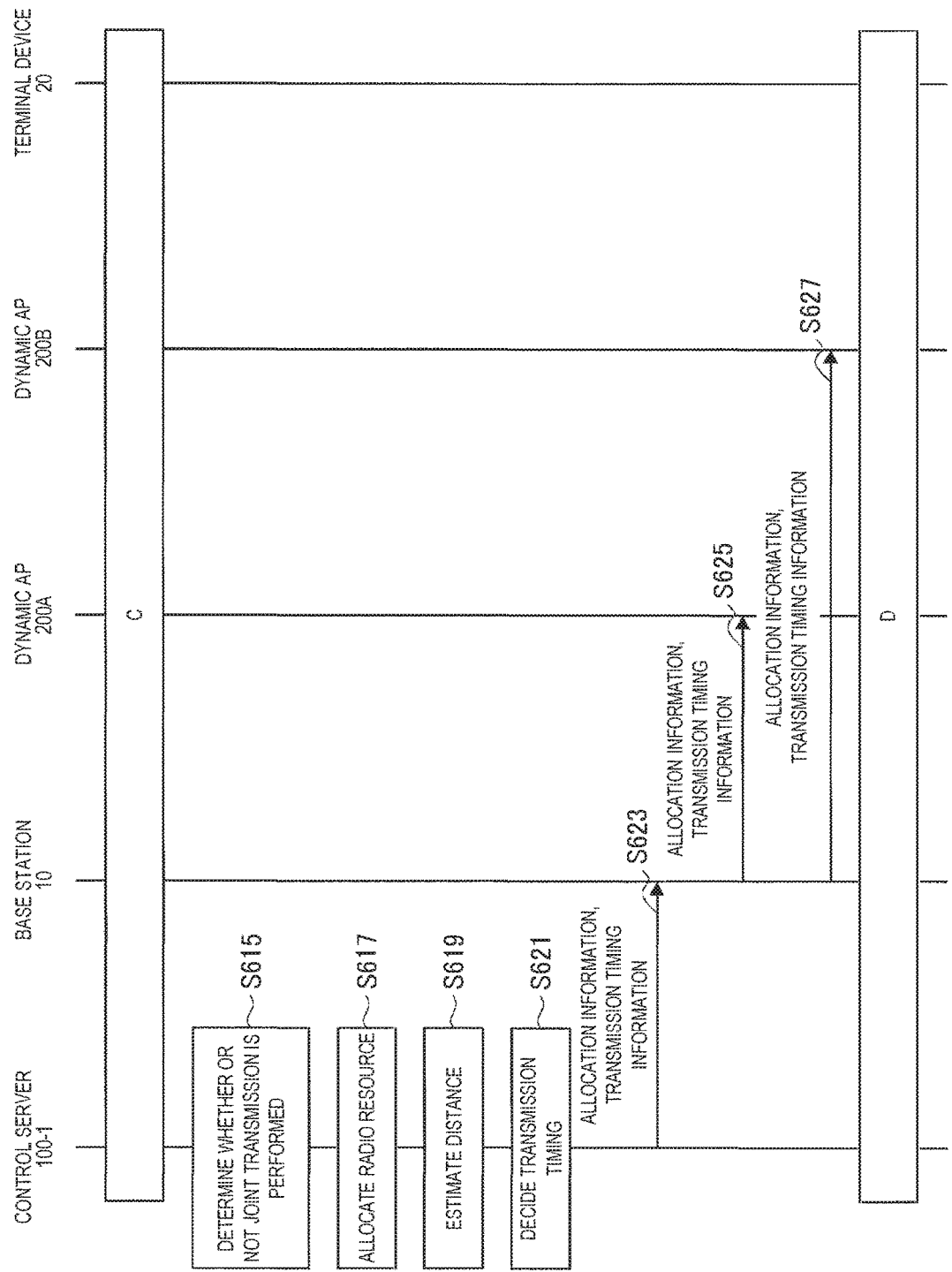

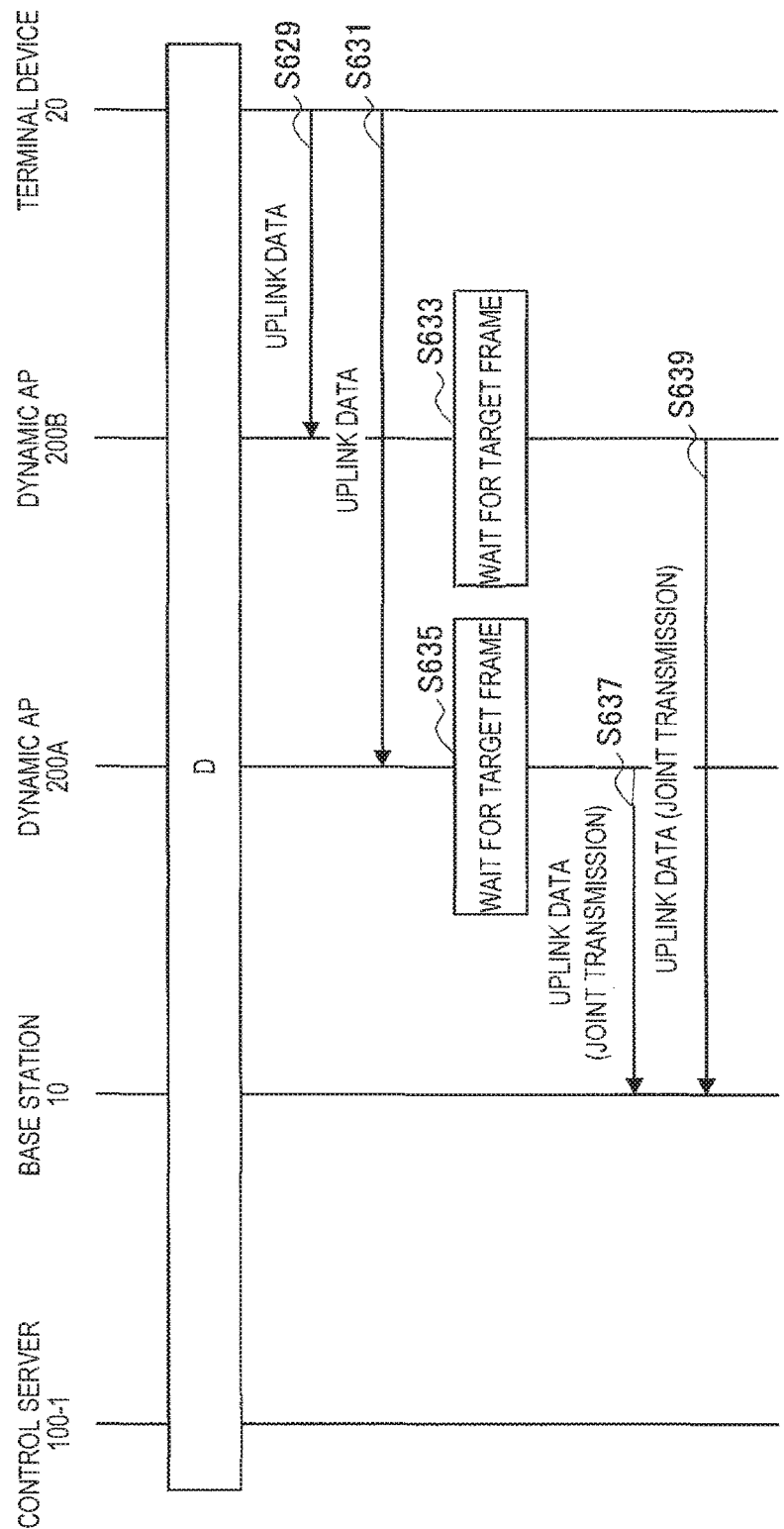

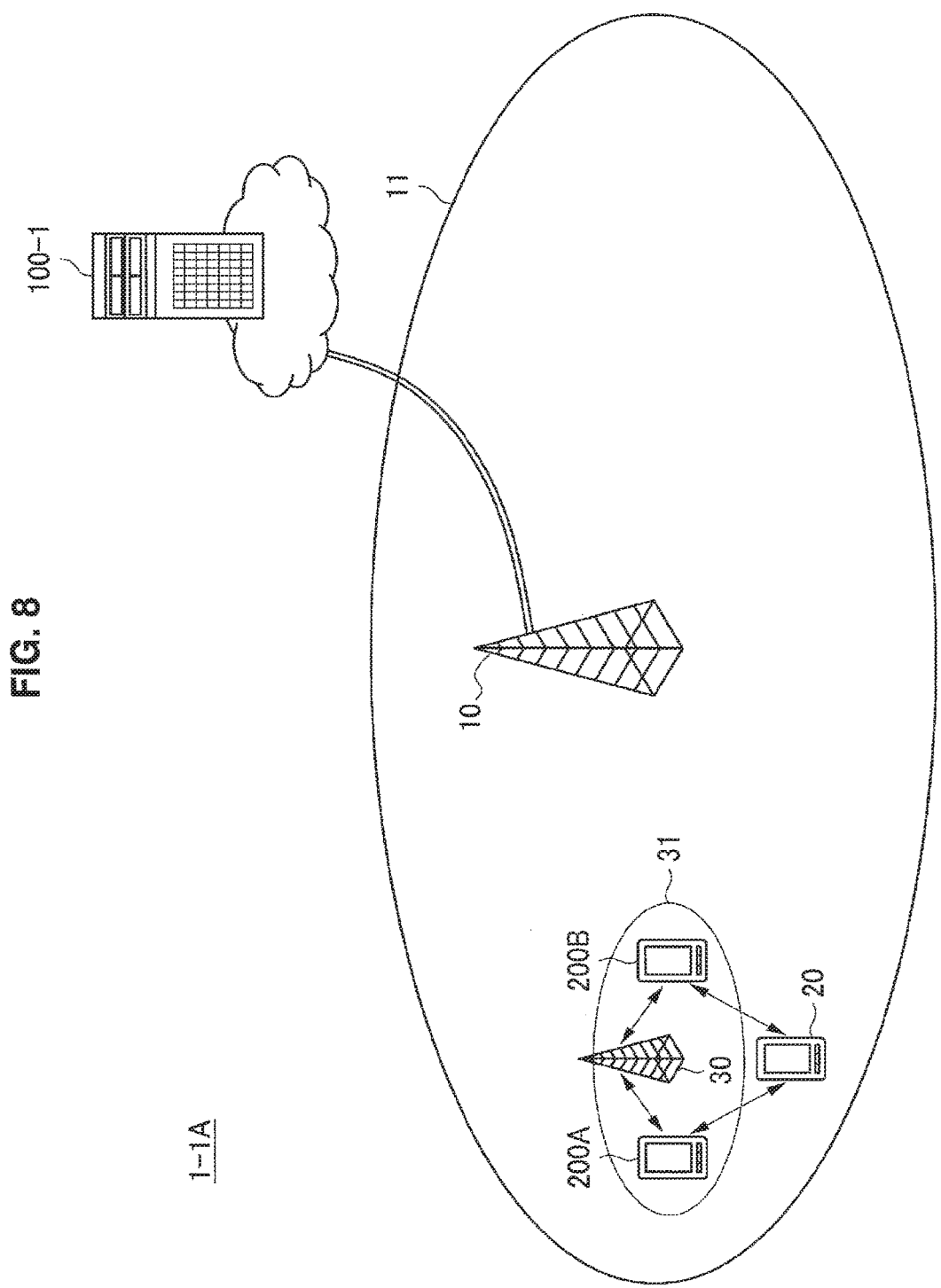

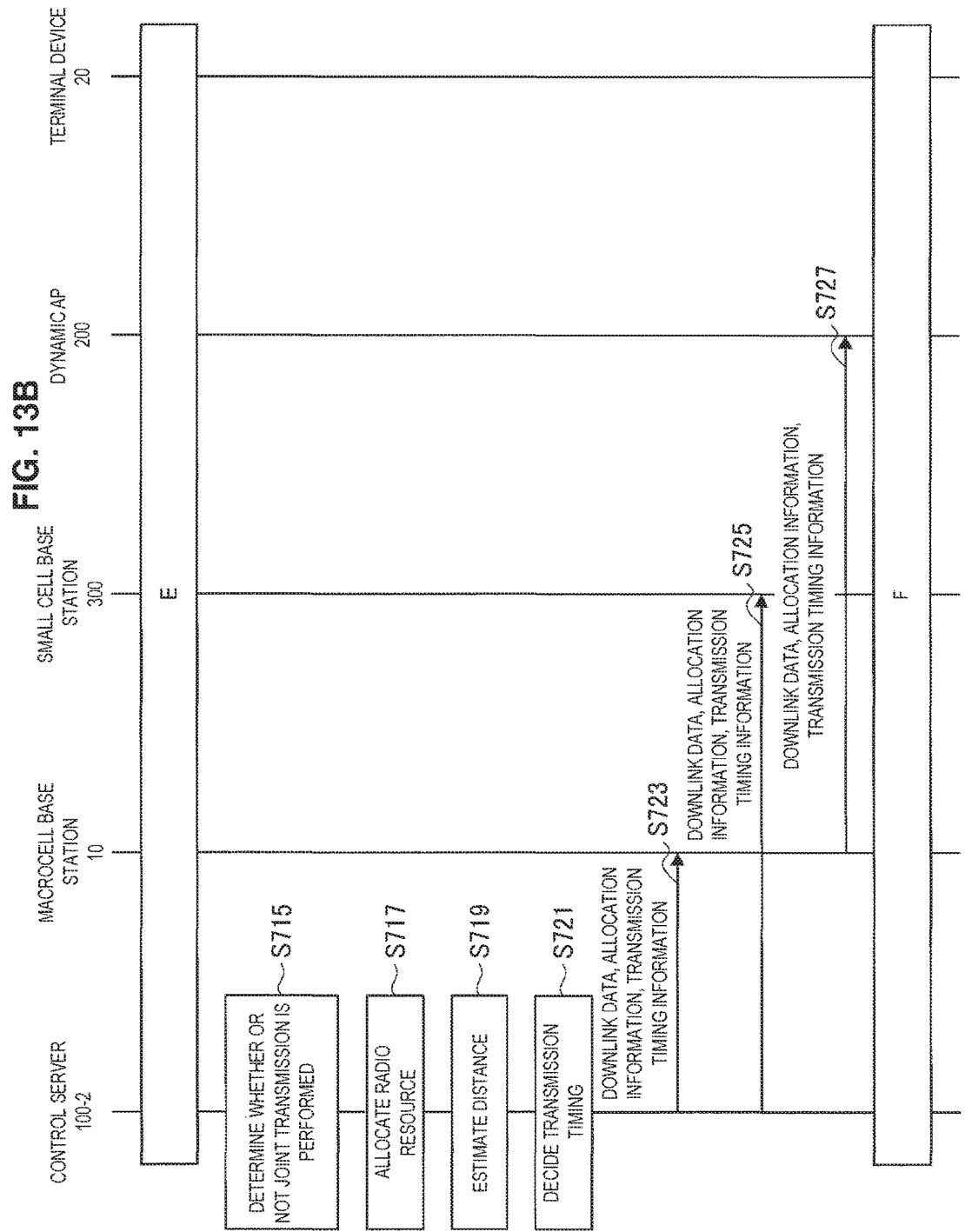

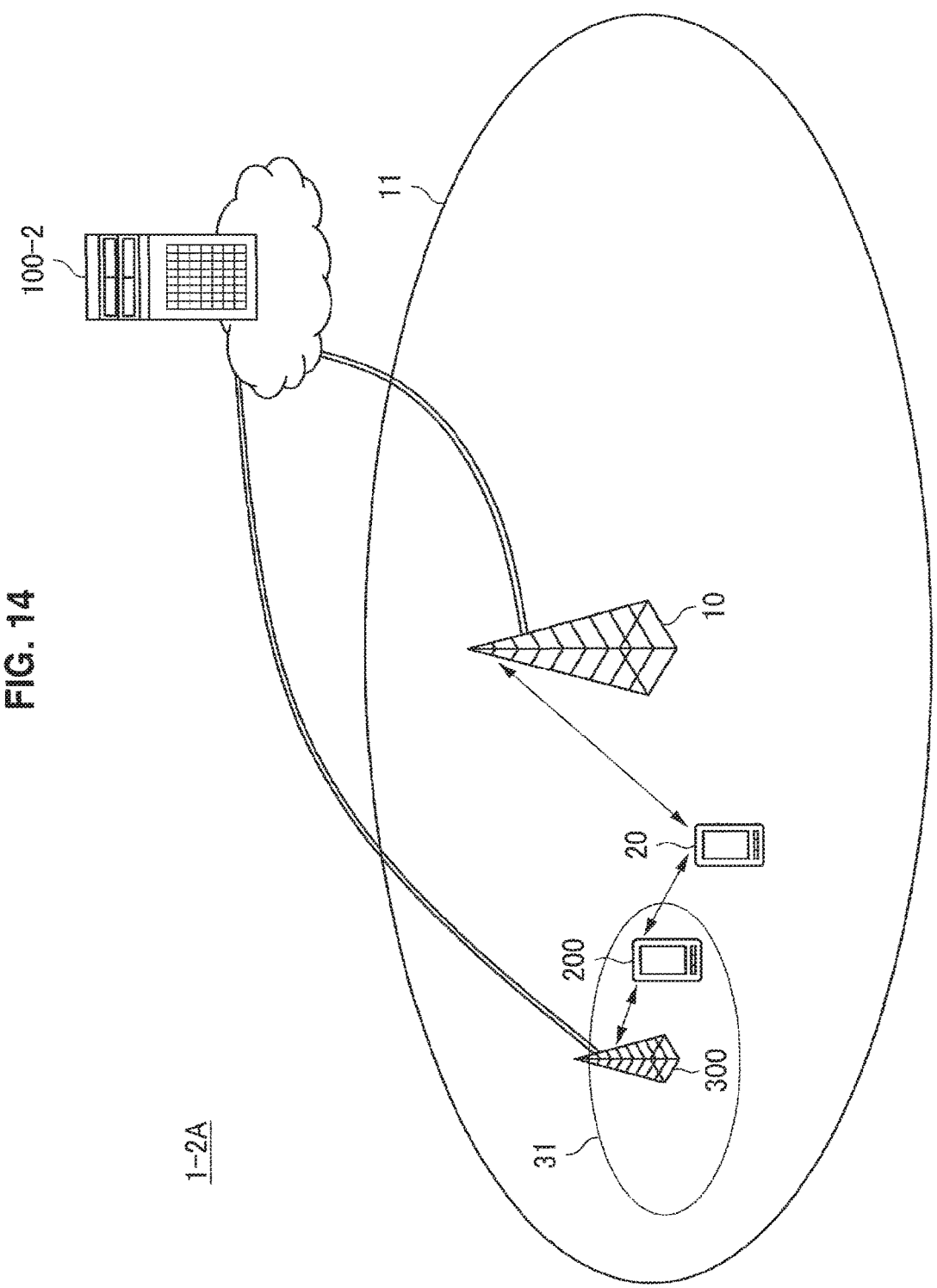

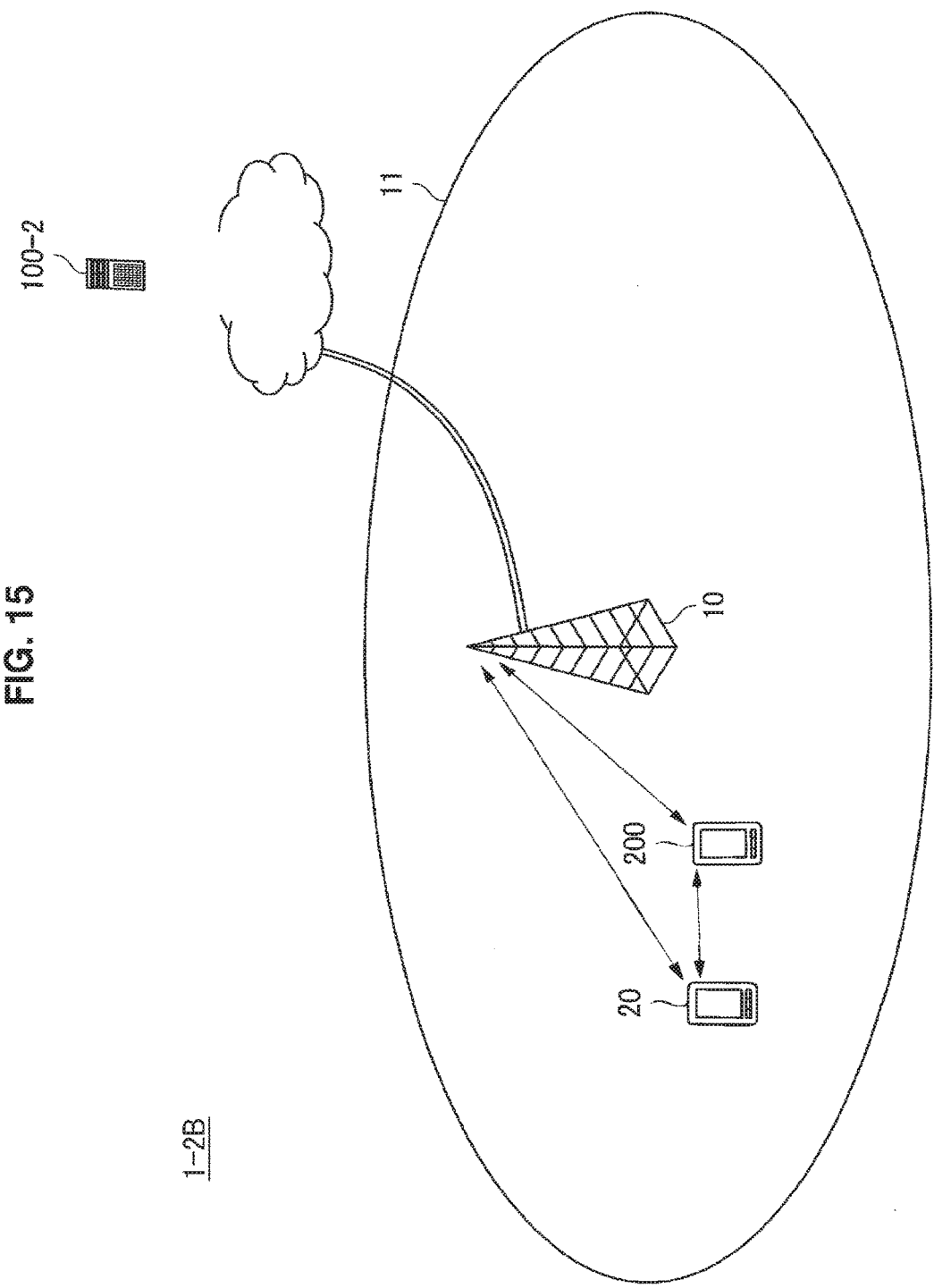

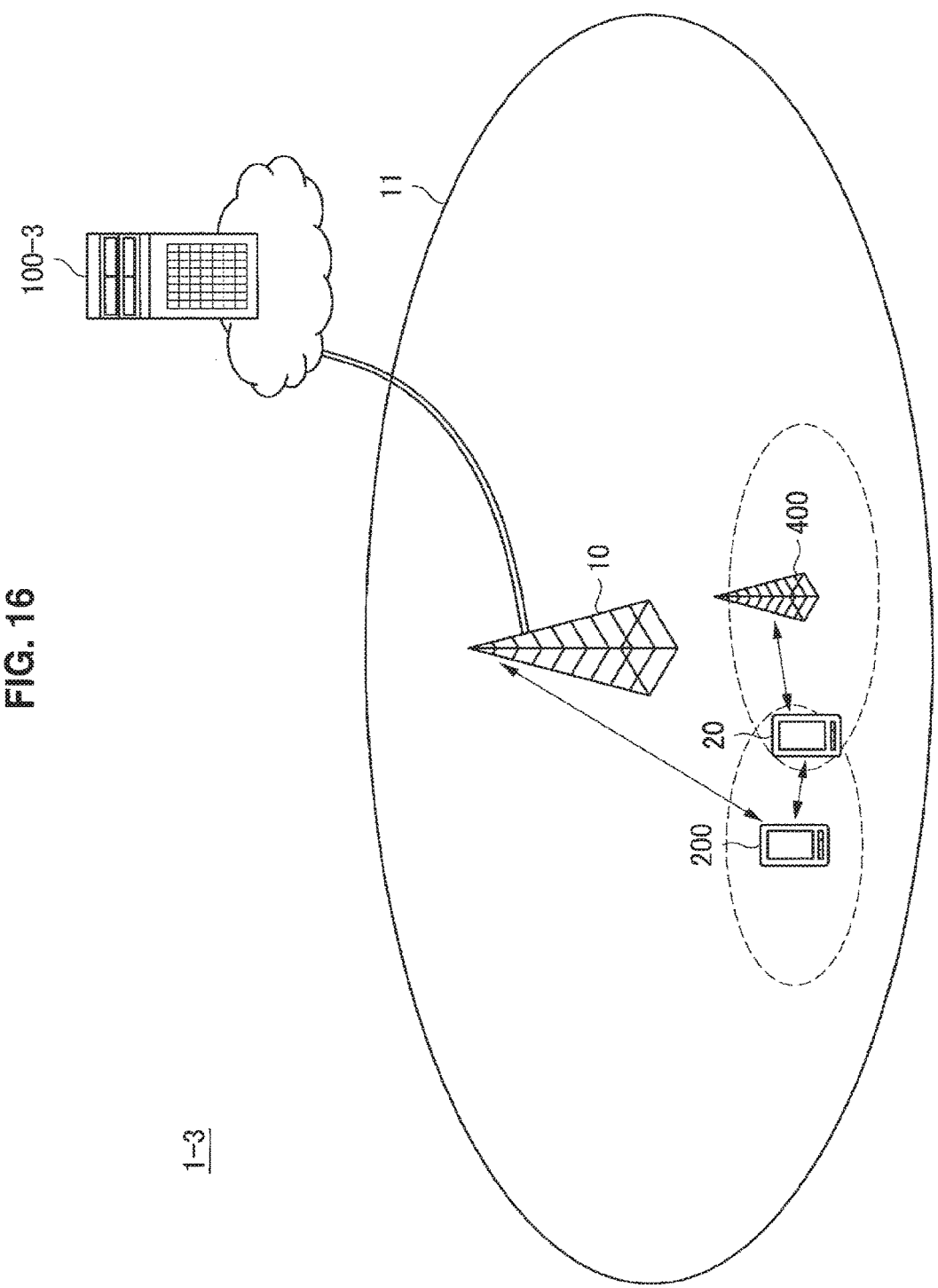

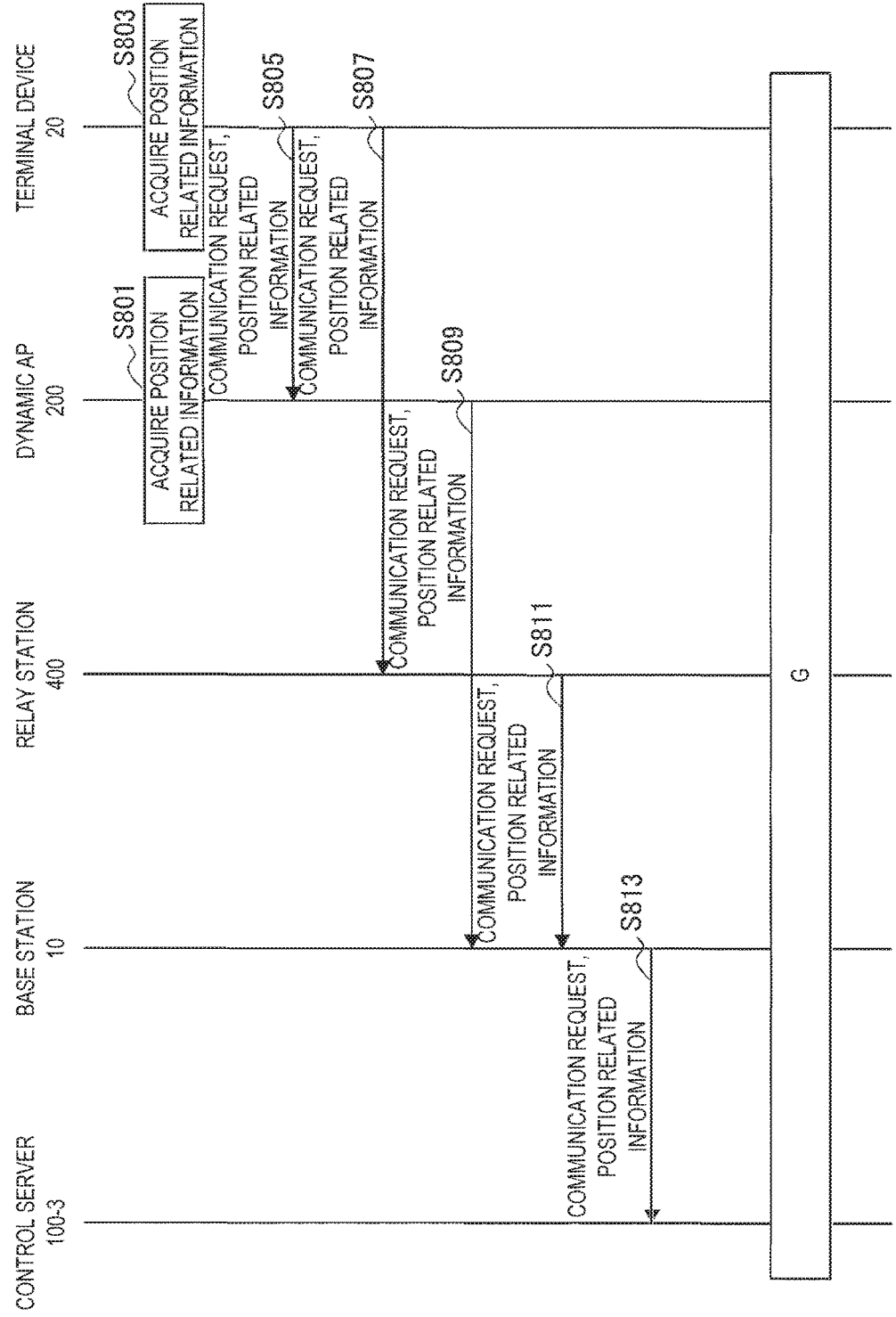

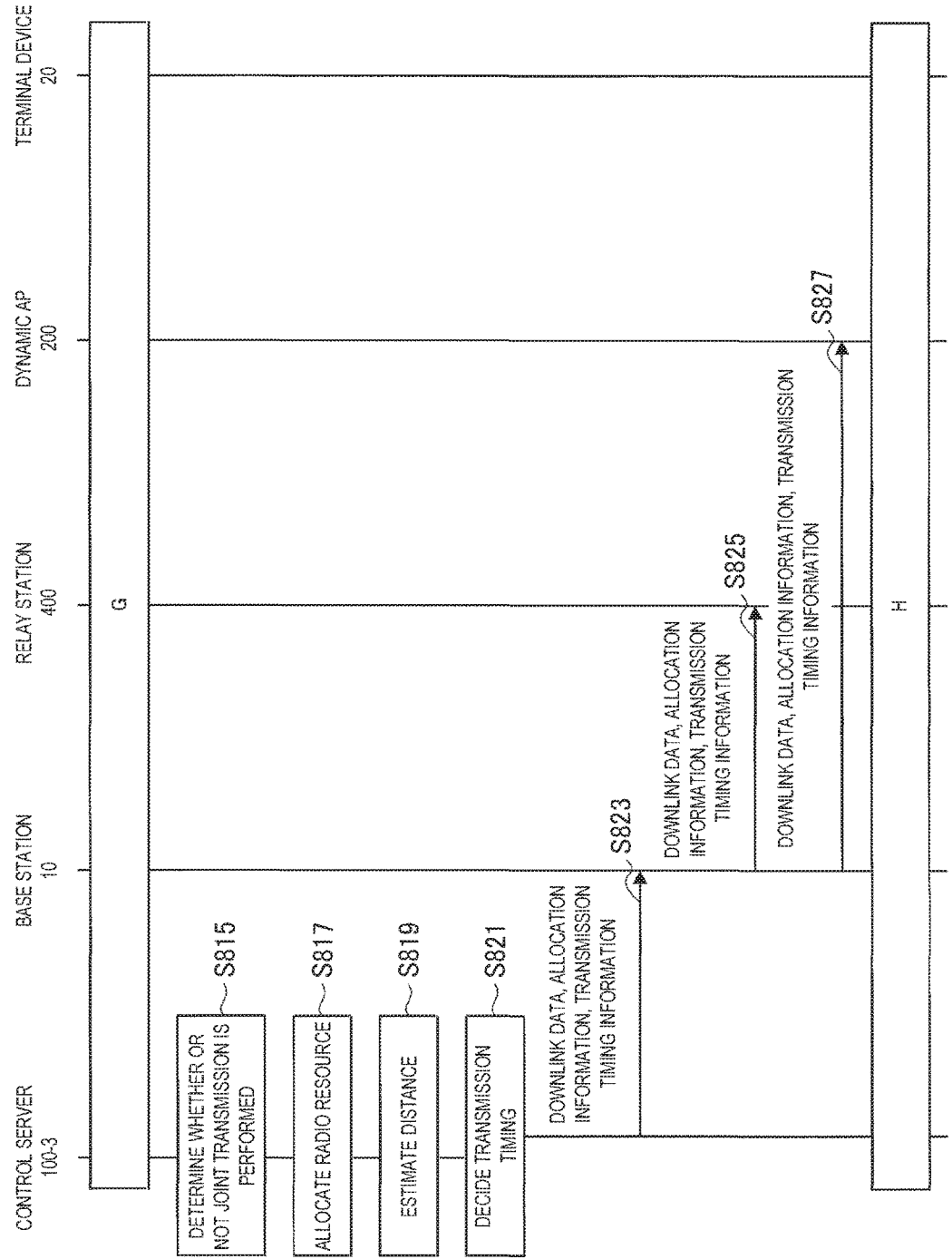

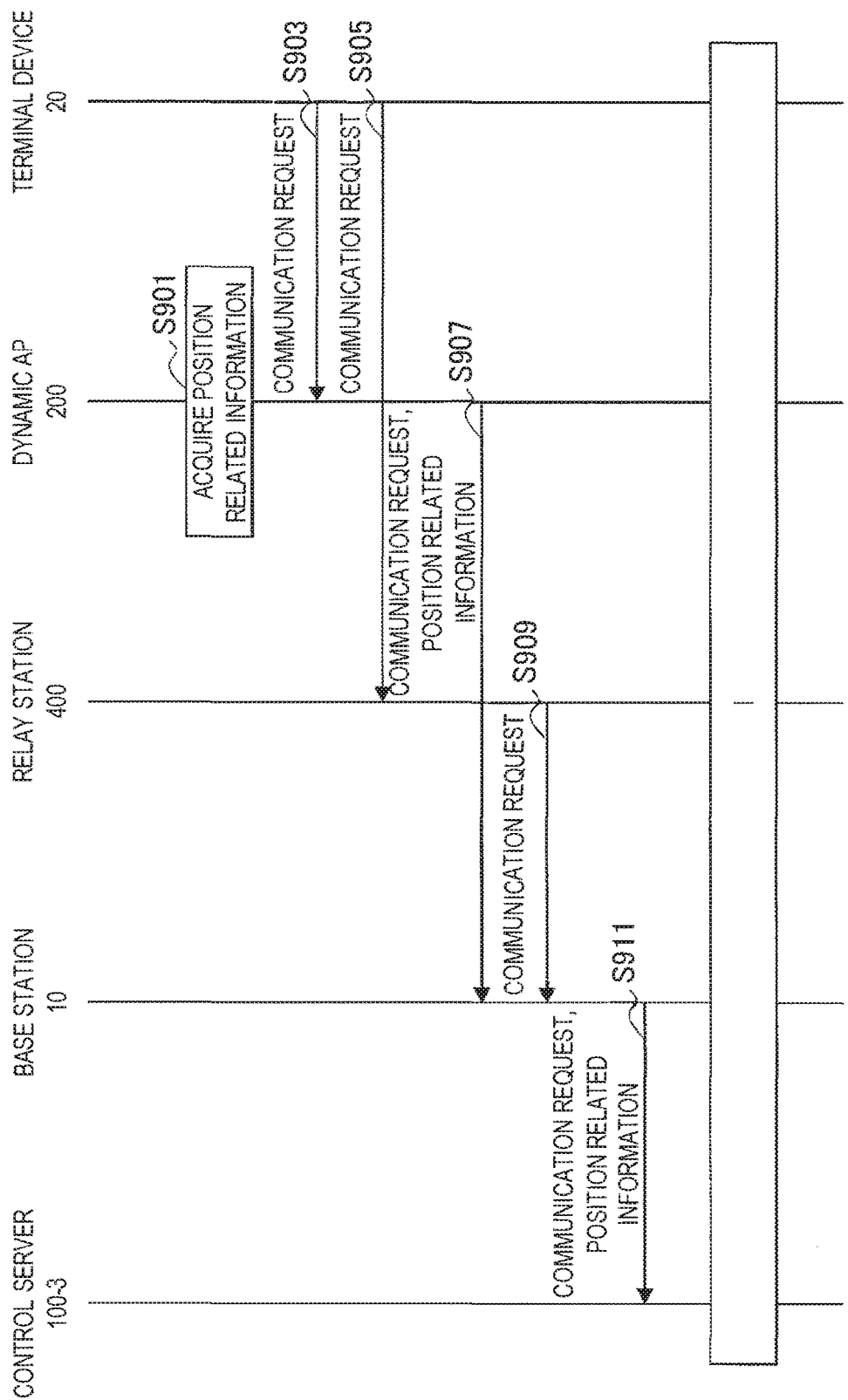

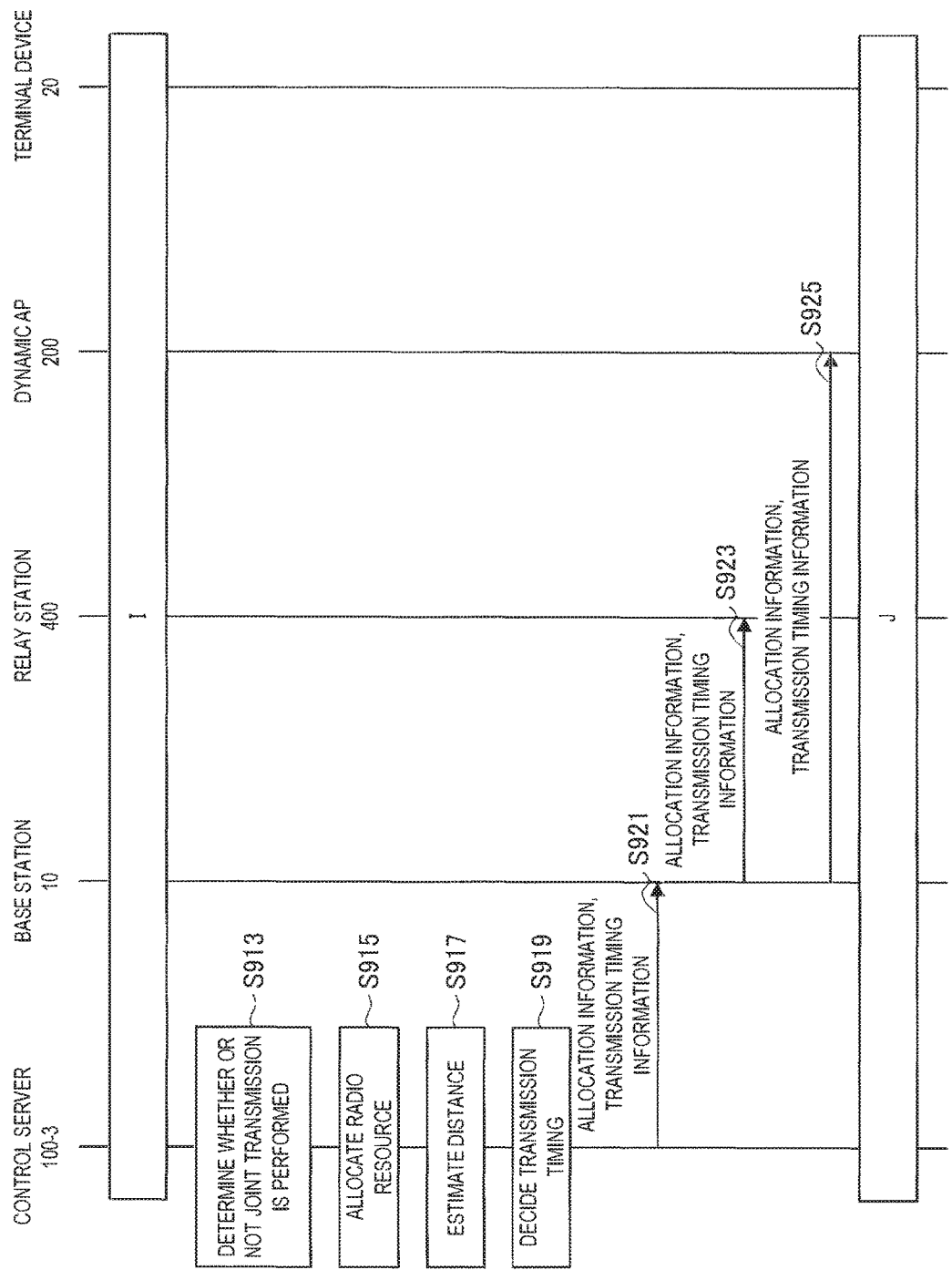

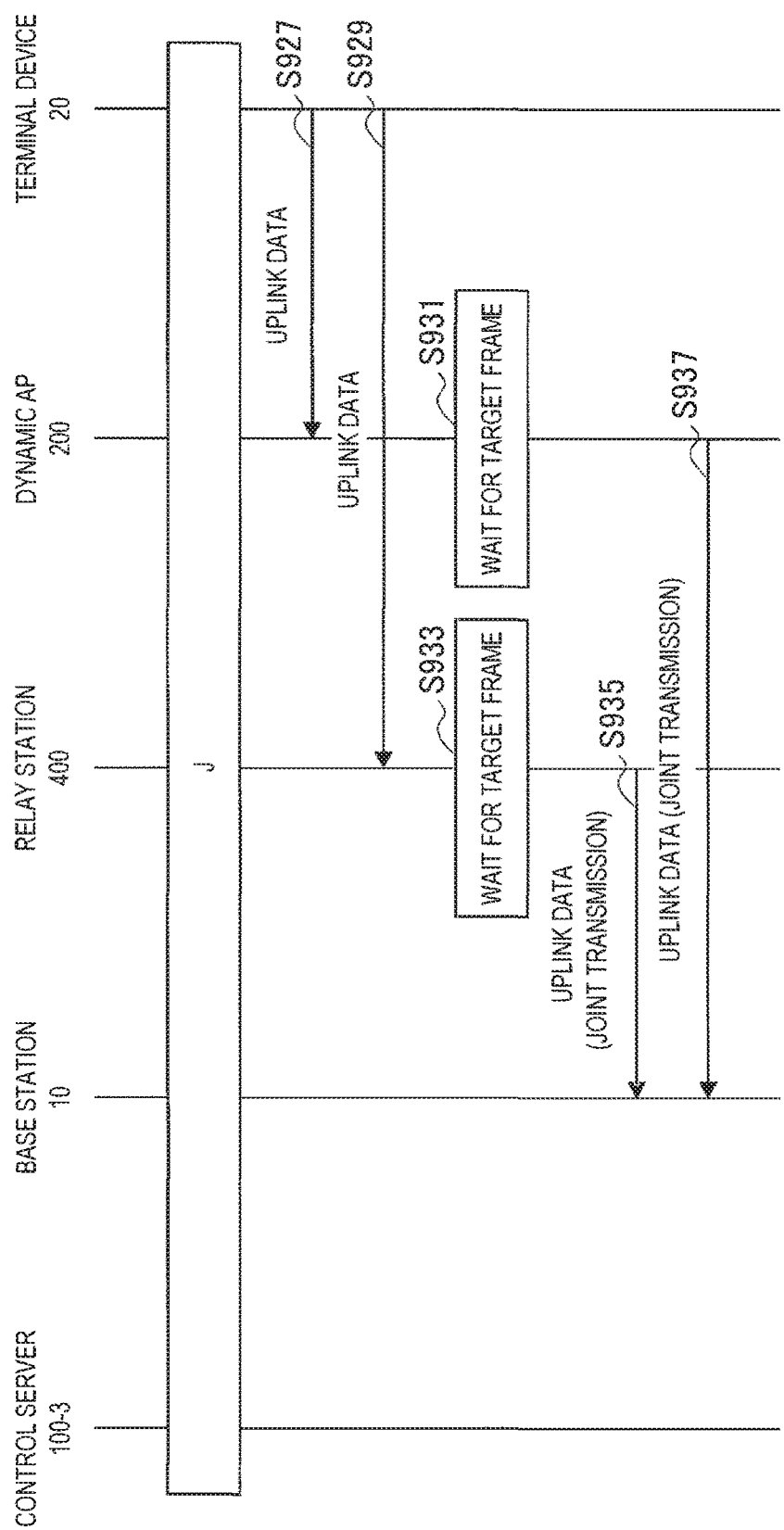

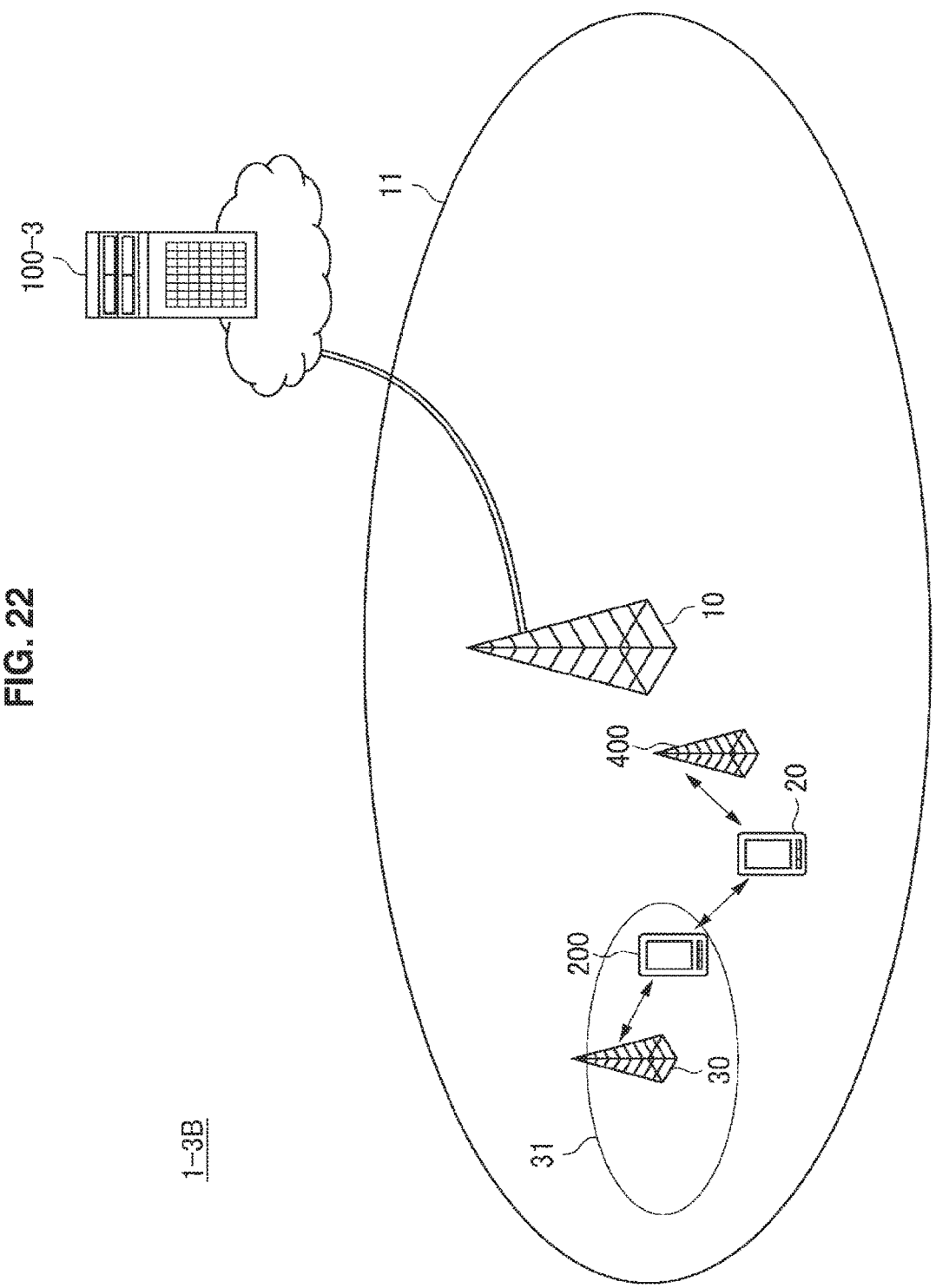

COMMUNICATION CONTROL DEVICE, COMMUNICATION CONTROL METHOD, AND WIRELESS COMMUNICATION DEVICE

This is a continuation application of U.S. patent application Ser. No. 14/647,936 filed on May 28, 2015, which is a National Stage Entry of PCT/JP2013/080915, filed Nov. 15, 2013, which claims priority from Japanese Priority Patent Application 2013-011727 filed in the Japanese Patent Office on Jan. 25, 2013. Each of the above referenced applications is hereby incorporated by reference in its entirety.

TECHNICAL FIELD

The present disclosure relates to a communication control device, a communication control method, and a wireless communication device.

BACKGROUND ART

Long Term Evolution (LTE)-Advanced of the 3rd Generation Partnership Project (3GPP) proposes coordinated multipoint (CoMP) transmission and reception in which coordinated eNodeBs transmit and receive signals to and from a single UE.

For example, the CoMP transmission in the downlink increases the reception power level of a UE positioned at the cell edge, which can increase throughput as a result. The CoMP transmission includes two techniques such as joint processing (JP) and coordinated scheduling and/or beamforming (CS/CB). In particular, the joint processing includes a technique called joint transmission. According to the joint transmission, two eNodeBs transmit signals to a single UE in parallel using the same frequency resource. As a result, the reception power level of the UE can be increased. A variety of techniques relating to the joint transmission have been proposed.

For example, Patent Literature 1 discloses a technique of adjusting transmission timing for the joint transmission common to a plurality of terminals, focusing on a difference in the reception power of signals from two base stations. In addition, for example, Patent Literature 2 discloses a technique of deciding transmission timing for the joint transmission performed by a first base station and a second base station on the basis of a propagation delay time between each of the first base station and the second base station and a terminal.

CITATION LIST

Patent Literature

Patent Literature 1: JP 2012-175276A
Patent Literature 2: JP 2009-225137A

SUMMARY OF INVENTION

Technical Problem

The techniques disclosed in the Patent Literature 1 and Patent Literature 2, however, presuppose that base stations, which do not move with the lapse of time, perform joint transmission. However, it is possible that a first device which may move with the lapse of time, for example, operates as an access point, and performs joint transmission to a terminal along with a second device. The distance between the first device and the terminal changes with the lapse of time in this case. The change in the distance may then change a time from the transmission of a signal by the first device to the reception of the signal by the terminal. Accordingly, the technique disclosed in Patent Literature 2 (and the technique disclosed in Patent Literature 1) causes the terminal to have a gap between the reception timing of a signal transmitted by the first device and the reception timing of a signal transmitted by the second device. As a result, an insufficient increase in the reception power level of the terminal is a concern.

Accordingly, it is desirable to provide a mechanism that allows the reception power level of signals to be increased even when one or more of a plurality of access points may move, the access points performing transmission of the signals to a target device in parallel using the same frequency resource.

Solution to Problem

According to the present disclosure, there is provided a communication control device including: an acquiring section configured to acquire first position related information and second position related information, the first position related information relating to positions of one or more wireless communication devices among a plurality of access points that perform transmission of signals to a target device in parallel using an identical frequency resource, the second position related information relating to a position of the target device; an estimating section configured to estimate a distance between the target device and each of the one or more wireless communication devices during the transmission on the basis of the first position related information and the second position related information; and a deciding section configured to decide transmission timing of each of the plurality of access points for the transmission on the basis of information that includes information on the estimated distance and relates to a distance between the target device and each of the plurality of access points. The first position related information includes information relating to a change in the position of each of the one or more wireless communication devices.

In addition, according to the present disclosure, there is provided a communication control method including: acquiring first position related information and second position related information, the first position related information relating to positions of one or more wireless communication devices among a plurality of access points that perform transmission of signals to a target device in parallel using an identical frequency resource, the second position related information relating to a position of the target device; estimating a distance between the target device and each of the one or more wireless communication devices during the transmission on the basis of the first position related information and the second position related information; and deciding transmission timing of each of the plurality of access points for the transmission on the basis of information that includes information on the estimated distance and relates to a distance between the target device and each of the plurality of access points. The first position related information includes information relating to a change in the position of each of the one or more wireless communication devices.

Furthermore, according to the present disclosure, there is provided a wireless communication device including: a communication control section configured to operate the wireless communication device as an access point; and an acquiring section configured to, when the wireless communication device and one or more access points perform transmission of signals to a target device in parallel using an identical frequency resource, acquire information on transmission timing of the wireless communication device for the transmission after a communication control device decides transmission timing of the wireless communication device and each of the one or more access points for the transmission. The communication control section controls transmission of the wireless communication device for the transmission on the basis of the transmission timing of the wireless communication device for the transmission. The transmission timing of the wireless communication device and each of the one or more access points for the transmission is decided on the basis of information relating to a distance between the target device and the wireless communication device and between the target device and each of the one or more access points. The information relating to the distance includes information on a distance to be estimated between the target device and the wireless communication device during the transmission. The distance to be estimated is estimated on the basis of individual position related information relating to a position of the wireless communication device and position related information relating to a position of the target device. The individual position related information includes information on a change in the position of the wireless communication device.

Advantageous Effects of Invention

According to the present disclosure as described above, it becomes possible to increase the reception power level of signals even when one or more of a plurality of access points may move, the access points performing transmission of the signals to a target device in parallel using the same frequency resource.

BRIEF DESCRIPTION OF DRAWINGS

FIG. 6A is a flowchart illustrating an example of a schematic flow of communication control processing according to the first embodiment for a downlink.

FIG. 6B is a flowchart illustrating the example of the schematic flow of the communication control processing according to the first embodiment for a downlink.

FIG. 7A is a flowchart illustrating an example of a schematic flow of communication control processing according to the first embodiment for a downlink.

FIG. 7B is a flowchart illustrating the example of the schematic flow of the communication control processing according to the first embodiment for a downlink.

FIG. 7C is a flowchart illustrating the example of the schematic flow of the communication control processing according to the first embodiment for a downlink.

FIG. 8 is an explanatory diagram illustrating an example of a schematic configuration of a communication system according to a first modified example of the first embodiment.

FIG. 13B is a flowchart illustrating the example of the schematic flow of the communication control processing according to the second embodiment.

FIG. 14 is an explanatory diagram illustrating a first example of a schematic configuration of a communication system according to a modified example of the second embodiment.

FIG. 15 is an explanatory diagram illustrating a second example of the schematic configuration of the communication system according to the modified example of the second embodiment.

FIG. 16 is an explanatory diagram illustrating an example of a schematic configuration of a communication system according to a third embodiment.

FIG. 19A is a flowchart illustrating an example of a schematic flow of communication control processing according to the third embodiment for a downlink.

FIG. 19B is a flowchart illustrating the example of the schematic flow of the communication control processing according to the third embodiment for a downlink.

FIG. 20A is a flowchart illustrating an example of a schematic flow of communication control processing according to the third embodiment for a downlink.

FIG. 20B is a flowchart illustrating the example of the schematic flow of the communication control processing according to the third embodiment for a downlink.

FIG. 20C is a flowchart illustrating the example of the schematic flow of the communication control processing according to the third embodiment for a downlink.

FIG. 22 is an explanatory diagram illustrating an example of a schematic configuration of a communication system according to a second modified example of the third embodiment.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description will be now made in the following order.
1. First Embodiment
1.1. Schematic Configuration of Communication System
1.2. Configuration of Each Device
1.2.1. Configuration of Control Server
1.2.2. Configuration of Dynamic Access Point
1.3. Flow of Processing
1.4. Modified Examples
2. Second Embodiment
2.1. Schematic Configuration of Communication System
2.2. Configuration of Each Device
2.2.1. Configuration of Control Server
2.2.2. Configuration of Small Cell Base Station
2.3. Flow of Processing
2.4. Modified Examples
3. Third Embodiment
3.1. Schematic Configuration of Communication System
3.2. Configuration of Each Device
3.2.1. Configuration of Control Server
3.2.2. Configuration of Relay Station
3.3. Flow of Processing
3.4. Modified Examples

1. First Embodiment

First of all, a first embodiment of the present disclosure will be described with reference to FIGS. 1 to 9. A plurality of wireless communication devices (such as terminal devices) that operate as access points perform transmission of signals to a target device (such as a base station or a terminal device) in parallel using the same frequency resource in the first embodiment.

1.1. Schematic Configuration of Communication System

Figure 1:
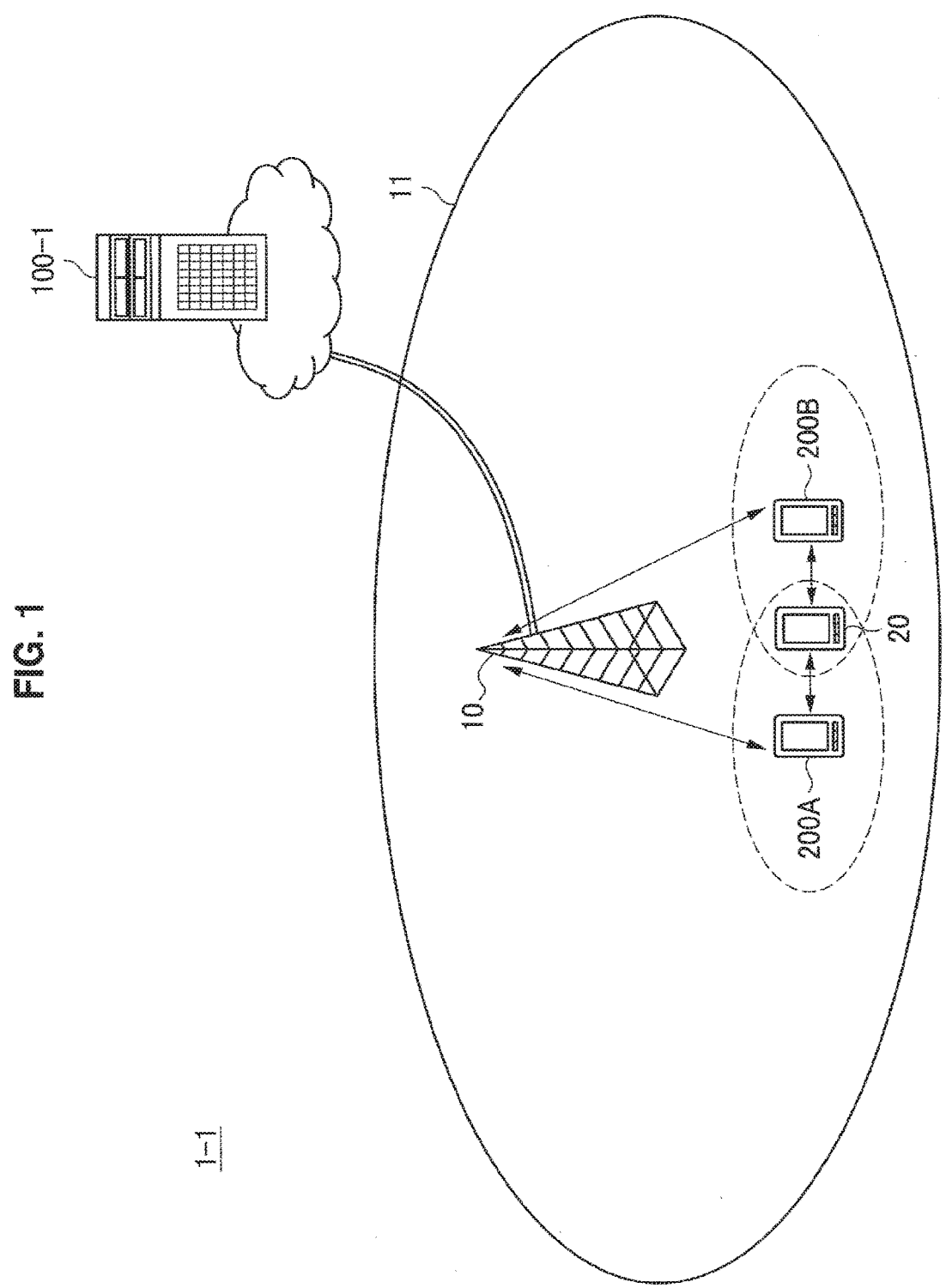
FIG. 1 is an explanatory diagram illustrating an example of a schematic configuration of a communication system according to a first embodiment.

First of all, a schematic configuration of a communication system 1-1 according to the first embodiment of the present disclosure will be described with reference to FIG. 1. FIG. 1 is an explanatory diagram illustrating an example of a schematic configuration of the communication system 1-1 according to the first embodiment. FIG. 1 illustrates that the communication system 1-1 includes a base station 10, a terminal device 20, a control server 100-1, and a dynamic access point 200 (which will be referred to as "dynamic AP 200" below).

(Base Station 10)

The base station 10 wirelessly communicates with a device positioned within a cell 11. For example, the base station 10 wirelessly communicates with the terminal device 20 positioned within the cell 11. That is to say, the base station 10 transmits a signal to the terminal device 20, and receives a signal transmitted by the terminal device 20. In addition, the base station 10 wirelessly communicates with the dynamic AP 200 positioned within the cell 11. That is to say, the base station 10 transmits a signal to the dynamic AP 200, and receives a signal transmitted by the dynamic AP 200.

(Terminal Device 20)

When positioned within the cell 11, the terminal device 20 wirelessly communicates with the base station 10. That is to say, the terminal device 20 transmits a signal to the base station 10, and receives a signal transmitted by the base station 10.

The terminal device 20 is, for example, a movable device. That is to say, the terminal device 20 may move with the lapse of time. As an example, the terminal device 20 is a smartphone carried by a user.

(Dynamic AP 200)

The dynamic AP 200 is a wireless communication device, and wirelessly communicates with the base station 10 when the dynamic AP 200 is positioned within the cell 11. That is to say, the dynamic AP 200 transmits a signal to the base station 10, and receives a signal transmitted by the base station 10.

The dynamic AP 200 is, for example, a movable device. That is to say, the dynamic AP 200 may move with the lapse of time. As an example, the dynamic AP 200 is a smartphone carried by a user.

In addition, the dynamic AP 200 can operate as an access point. For example, the dynamic AP 200 wirelessly communicates with the terminal device 20, and relays communication between the base station 10 and the terminal device 20. More specifically, the dynamic AP 200, for example, receives a signal transmitted by the base station 10, and transmits a signal of data addressed to the terminal device 20 to the terminal device 20, the signal being included in the received signal. For example, the dynamic AP 200 receives a signal transmitted by the terminal device 20, and transmits a signal of data included in the received signal to the base station 10.

The plurality of dynamic APs 200 perform transmission of signals to a target device in parallel using the same frequency resource especially in the first embodiment. For example, the target device is the base station 10 or a terminal device 20. In other words, the plurality of dynamic APs 200 perform joint transmission to the base station 10 or the terminal device 20.

(Control Server 100-1)

When a plurality of access points perform transmission of signals to a target device in parallel using the same frequency resource, the control server 100-1 decides transmission timing for the transmission.

As discussed above, a plurality of dynamic APs perform transmission of signals to a target device in parallel using the same frequency resource in the first embodiment. The control server 100-1 decides transmission timing of each of the plurality of dynamic APs for the transmission in this case. Each of the plurality of dynamic APs then performs the transmission on the basis of the decided transmission timing.

(Others)

Additionally, the base station 10 and the control server 100-1 communicate with each other, for example, via a wired backbone line.

Meanwhile, the base station 10 and the dynamic AP 200 communicate with each other, for example, via a wireless backbone line. More specifically, a time slot for communication via a wireless backbone line is, for example, prepared in the cell 11. That is to say, a frequency band used for wireless communication between the base station 10 and the dynamic AP 200 is the same as a frequency band used for wireless communication between the terminal device 20, and the base station 10 and the dynamic AP, but these kinds of wireless communication are performed at different time.

1.2. Configuration of Each Device

Next, the configurations of the control server 100-1 and the dynamic AP 200 will be described.

<1.2.1. Configuration of Control Server>

Figure 2:
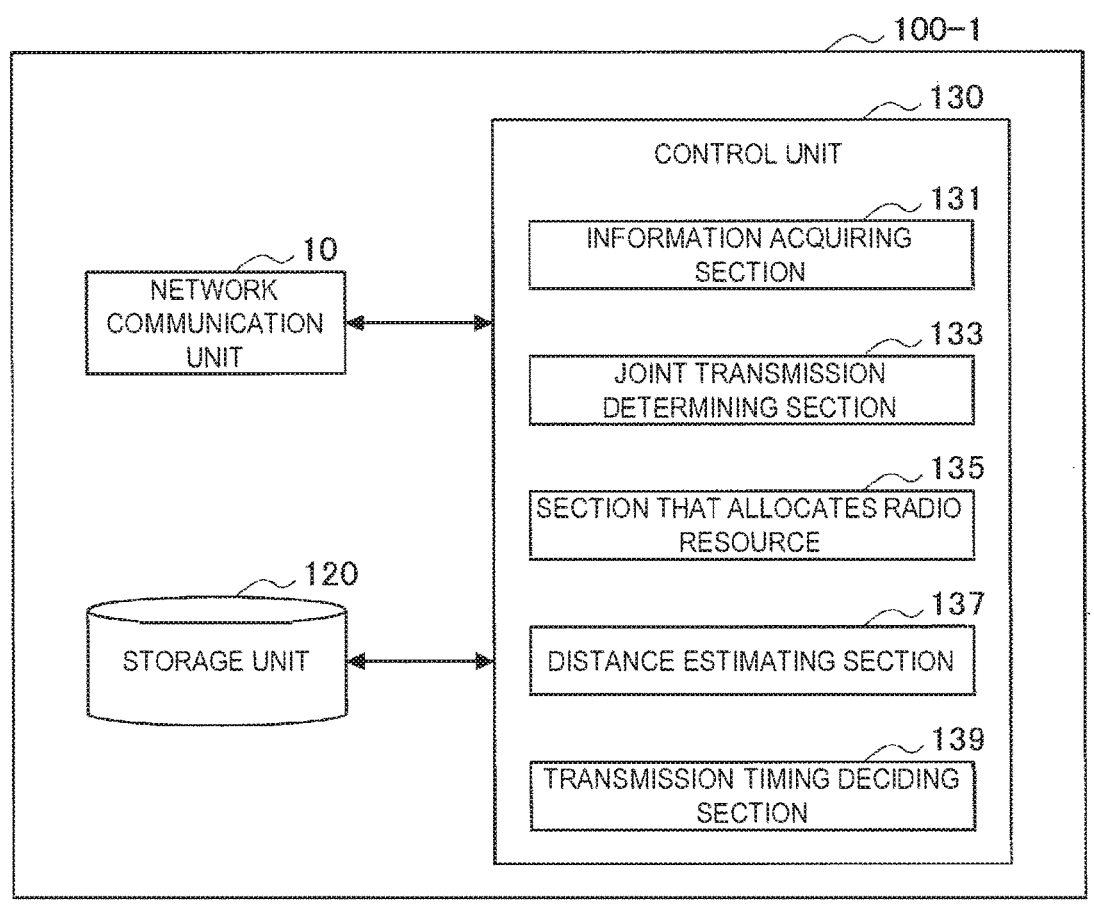
FIG. 2 is a block diagram illustrating an example of a configuration of a control server according to the first embodiment.

An example of the configuration of the control server 100-1 according to the first embodiment will be described with reference to FIGS. 2 to 4. FIG. 2 is a block diagram illustrating an example of the configuration of the control server 100-1 according to the first embodiment. FIG. 2 illustrates that the control server 100-1 includes a network communication unit 110, a storage unit 120, and a control unit 130.

(Network Communication Unit 110)

The network communication unit 110 communicates with another device. For example, the network communication unit 110 communicates with the base station 10. More specifically, for example, the network communication unit 110 communicates with the base station 10 via a wired backbone line.

The network communication unit 110 includes, for example, a LAN terminal, a transmission circuit, and another communication processing circuit.

(Storage Unit 120)

The storage unit 120 stores a program and data for operating the control server 100-1. The storage unit 120 includes, for example, a magnetic storage device such as a hard disk, or nonvolatile memory such as electrically erasable and programmable read only memory (EEPROM) and flash memory.

(Control Unit 130)

The control unit 130 provides a variety of functions of the control server 100-1. The control unit 130 includes, for example, a processor such as a central processing unit (CPU) or a digital signal processor (DSP). The control unit 130 then provides the variety of functions by executing a program stored in the storage unit 120 or another storage medium.

The storage unit 130 includes an information acquiring section 131, a joint transmission determining section 133, a scheduling section 135, a distance estimating section 137, and a transmission timing deciding section 139.

(Information Acquiring Section 131)

The information acquiring section 131 acquires first position related information (which will be referred to as DAP position related information below) and second position related information (which will be referred to as target device position related information below), the DAP position related information relating to the positions of the one or more dynamic APs 200 among a plurality of access points that perform transmission of signals to a target device in parallel using the same frequency resource, the target device position related information relating to the position of the target device.

For example, the information acquiring section 131 acquires individual position related information from each of the one or more dynamic APs 200 via the network communication unit 110, thereby acquiring the DAP position related information.

For example, the target device is the base station 10 or the terminal device 20. When the target device is the terminal device 20, the information acquiring section 131 acquires target device position related information from the terminal device 20 via the network communication unit 110. Meanwhile, when the target device is the base station 10, the information acquiring section 131, for example, acquires target device position related information (i.e. information relating to the position of the base station 10) stored in the storage unit 120.

DAP Position Related Information

For example, the DAP position related information includes information relating to a change in the position of each of the one or more dynamic APs 200. More specifically, the information relating to a change in the position is, for example, positional information and movement information on each of the one or more dynamic APs 200.

For example, the positional information indicates the position of the dynamic AP 200 at some time point. As an example, the position $P_T$ of the dynamic AP 200 at some time point T is represented by plane coordinates (X, Y). That is to say, the positional information indicates the position $P_T=(X, Y)$.

Meanwhile, the movement information indicates, for example, the moving velocity $V_T$ of the dynamic AP 200 at some time point T. The moving velocity includes moving speed and a moving direction. As an example, the moving velocity $V_T$ of the dynamic AP 200 at some time point T is represented by a plane vector $(V_X, V_Y)$. That is to say, the movement information indicates the moving velocity $V_T=(V_X, V_Y)$.

Additionally, the plurality of access points are, for example, the one or more dynamic APs 200 especially in the first embodiment. That is to say, each of the plurality of access points is the dynamic AP 200, and the plurality of dynamic APs 200 perform transmission of signals to a target device in parallel using the same frequency resource. Accordingly, the DAP position related information includes information (such as positional information and movement information) relating to a change in the position of each of the plurality of dynamic APs 200.

Target Device Position Related Information

For example, the target device is the base station 10 or the terminal device 20. The target device position related information becomes different in accordance with whether the target device is the base station 10 or the terminal device 20.

Target Device is Terminal Device

For example, the target device is the terminal device 20. That is to say, transmission of signals to the terminal device 20 in parallel is performed using the same frequency resource. The target device position related information is position related information relating to the position of the terminal device 20 in this case.

Furthermore, the target device position related information includes, for example, information relating to a change in the position of the terminal device 20 in this case. More specifically, the information relating to a change in the position is, for example, positional information and movement information on the terminal device 20. The positional information and the movement information have been described in connection with the DAP position related information.

Target Device is Base Station

For example, the target device is the base station 10. That is to say, transmission of signals to the base station 10 in parallel is performed using the same frequency resource.

That is to say, the target device position related information is position related information relating to the position of the base station 10.

Furthermore, the target device position related information includes, for example, positional information indicating the position of the base station 10 in this case. For example, the positional information indicates a fixed position that does not change with the lapse of time. In addition, the positional information is stored, for example, in the storage unit 120 in advance.

(Joint Transmission Determining Section 133)

The joint transmission determining section 133 determines whether or not a plurality of access points perform transmission of signals to a target device in parallel using the same frequency resource.

For example, once the terminal device 20 requests communication in the cell 11 via a plurality of access points, the joint transmission determining section 133 determines whether or not the plurality of access points perform transmission of signals to a target device in parallel using the same frequency resource.

For example, the joint transmission determining section 133 determines whether or not the plurality of dynamic APs 200 perform transmission of signals to the terminal device 20 in parallel using the same frequency resource. In other words, the joint transmission determining section 133 determines whether or not joint transmission to the terminal device 20 in the downlink is performed.

More specifically, the joint transmission determining section 133, for example, estimates the reception power of signals in the terminal device 20, and compares the estimated reception power with a threshold, the signals being transmitted by the base station 10. If the estimated reception power falls below the threshold, the joint transmission determining section 133 determines that the plurality of dynamic APs 200 perform transmission of signals to the terminal device 20 in parallel using the same frequency resource. That is to say, it is determined that the base station 10 transmits signals including the same data to the plurality of dynamic APs 200, and the plurality of dynamic APs 200 transmit the signals including the same data to the terminal device 20 in parallel using the same frequency resource.

For example, the joint transmission determining section 133 determines whether or not the plurality of dynamic APs 200 perform transmission of signals to the base station 10 in parallel using the same frequency resource. In other words, the joint transmission determining section 133 determines whether or not joint transmission to the base station 10 in the uplink is performed.

More specifically, the joint transmission determining section 133, for example, estimates the reception power of signals in the base station 10, and compares the estimated reception power with a threshold, the signals being transmitted by the terminal device 20. If the estimated reception power falls below the threshold, the joint transmission determining section 133 determines that the plurality of dynamic APs 200 perform transmission of signals to the base station 10 in parallel using the same frequency resource. That is to say, it is determined that the terminal device 20 transmits signals including the same data to the two or more dynamic APs 200, and the two or more dynamic APs 200 transmit the signals including the same data to the base station 10 in parallel using the same frequency resource.

(Scheduling Section 135)

The scheduling section 135 allocates a radio resource for performing transmission of signals to a target device in parallel using the same frequency resource. In other words, the scheduling section 135 allocates a radio resource for performing joint transmission to a target device.

For example, when the communication system 1-1 is compliant with LTE, the radio resource is one or more resource blocks as an example. That is to say, the scheduling section 135 allocates one or more resource blocks for performing joint transmission to each of a plurality of access points.

Additionally, the plurality of access points are, for example, the one or more dynamic APs 200 in the first embodiment. That is to say, each of the plurality of access points is the dynamic APs 200. Accordingly, the scheduling section 135 allocates the one or more resource blocks to each of the plurality of dynamic APs 200.

In addition, the scheduling section 135, for example, generates allocation information relating to the allocation of a radio resource for performing the transmission (i.e. transmission of signals to a target device in parallel using the same frequency resource). For example, the allocation information includes information on a transmission frame with which the transmission of signals to the target device is performed. For example, the transmission frame is a sub-frame. The information on a transmission frame includes identification information (such as a system frame number (SFN)) on a radio frame and identification information (such as a sub-frame number) on a sub-frame included in the radio frame in this case. The allocation information includes identification information on a frequency resource with which the transmission is performed. The allocation information includes such a kind of information, thereby identifying one or more resource blocks with which the transmission is performed.

The scheduling section 135 then provides the allocation information to the base station 10 via the network communication unit 110. As a result, the allocation information is transmitted to the plurality of dynamic APs 200 by the base station 10. As a result, the radio resource is used in the cell 11 by each of the plurality of access points (i.e. dynamic APs 200) for joint transmission.

In addition, the scheduling section 135 provides the allocation information to the distance estimating section 137.

(Distance Estimating Section 137)

The distance estimating section 137 estimates the distance between the target device and each of the one or more dynamic APs 200 during the transmission of signals to the target device on the basis of the DAP position related information and the target device position related information.

For example, the distance estimating section 137 estimates the distance further on the basis of the allocation information. More specifically, the distance estimating section 137, for example, estimates the distance further on the basis of the information on a transmission frame included in the allocation information.

As specific processing, the distance estimating section 137 estimates the position of each of the one or more dynamic APs during the transmission of signals to the target device, for example, on the basis of the DAP position related information and the allocation information. A specific example will be described below in terms of this point with reference to FIG. 3.

Figure 3:
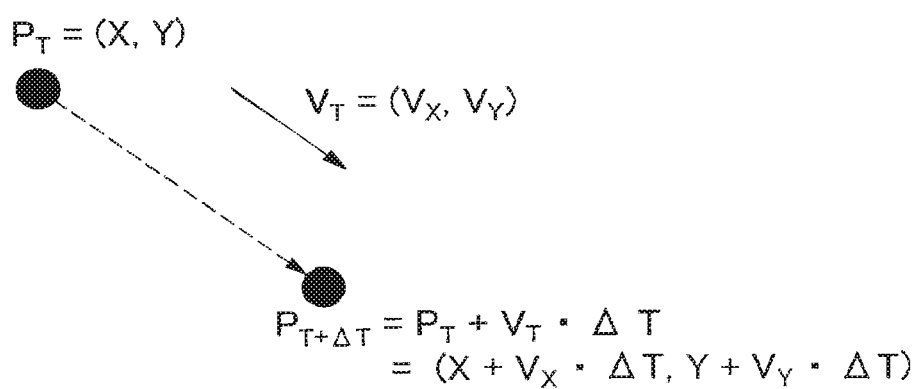
FIG. 3 is an explanatory diagram for describing an example of an estimated position of a dynamic AP.

FIG. 3 is an explanatory diagram for describing an example of the estimated position of the dynamic AP 200. FIG. 3 illustrates that the position $P_T$ of the dynamic AP 200 at some time point T and the moving velocity $V_T$ of the dynamic AP 200 at some time point T are acquired from the DAP position related information. In addition, a difference ΔT between the time point T and a starting time point of a transmission frame with which the transmission of signals to the target device is performed is calculated from the time point T and transmission timing included in the allocation information. The position $P_{T+\Delta T}$ of the dynamic AP 200 during the transmission (i.e. joint transmission) of signals to the target device is then estimated, for example, as below.

$$P_{T+\Delta T} \approx P_T + V_T \Delta T = (X + V_X \Delta T, Y + V_Y \Delta T) \qquad [\text{Math 1}]$$

For example, when the target device is the terminal device 20, the distance estimating section 137 estimates the position of the terminal device 20 during the transmission of signals to the target device on the basis of the target device position related information and the allocation information in the same way for the estimation of the position of the dynamic AP 200. Meanwhile, for example, when the target device is the base station 10, the distance estimating section 137 acquires positional information indicating the position of the base station 10 from the target device position related information.

The distance estimating section 137 then estimates the distance between the target device and each of the one or more dynamic APs during the transmission of signals to the target device on the basis of the estimated position of each of the one or more dynamic APs and the position of the target device (terminal device 20 or base station 10).

For example, in this way, the distance estimating section 137 estimates the distance between the target device and each dynamic AP 200.

As discussed above, each of the plurality of access points is, for example, the dynamic AP 200 in the first embodiment. The distance estimating section 137 thus estimates the distance between the target device and each of the plurality of dynamic APs 200 during the transmission of signals to the target device.

(Transmission Timing Deciding Section 139)

The transmission timing deciding section 139 decides transmission timing of each of the plurality of access points for the transmission of signals to the target device on the basis of information relating to the distance between the target device and each of the plurality of access points. The information relating to the distance includes information on the estimated distance between the target device and each of the one or more dynamic APs 200.

For example, the decided transmission timing is the timing of the transmission in a transmission frame in which the transmission of signals to the target device is performed.

As discussed above, each of the plurality of access points is, for example, the dynamic APs 200 in the first embodiment. Accordingly, for example, the transmission timing deciding section 139 decides transmission timing of each of the plurality of dynamic APs 200 for the transmission of signals to the target device on the basis of information on the estimated distance between the target device and each of the plurality of dynamic APs 200.

As specific processing, the transmission timing deciding section 139, for example, selects the farthest dynamic AP 200 from the target device from the information on the estimated distance between the target device and each of the plurality of dynamic APs 200. The transmission timing deciding section 139 then decides, as transmission timing of the selected dynamic AP 200, a starting time point of a transmission frame with which the transmission (i.e. joint transmission) of signals to the target device is performed, for example.

The transmission timing deciding section 139, for example, estimates a propagation delay time (which will be referred to as "reference propagation delay time" below) from the selected dynamic AP 200 to the target device on the basis of information on the distance between the target device and the selected dynamic AP 200. In addition, the transmission timing deciding section 139 estimates a propagation delay time of signals for each of the other dynamic APs 200 from the dynamic AP 200 to the target device on the basis of information on the distance between the target device and the dynamic AP 200. The transmission timing deciding section 139 then calculates a difference between the estimated propagation delay time and the reference propagation delay time. The transmission timing deciding section 139 decides, as transmission timing of the dynamic AP 200, a time point that is delayed from the starting time point of a transmission frame as much as the difference.

For example, in this way, the transmission timing deciding section 139 decides transmission timing of each of the plurality of dynamic APs for the transmission (i.e. joint transmission) of signals to the target device. A specific example of the decision of transmission timing will be described below with reference to FIG. 4.

Figure 4:
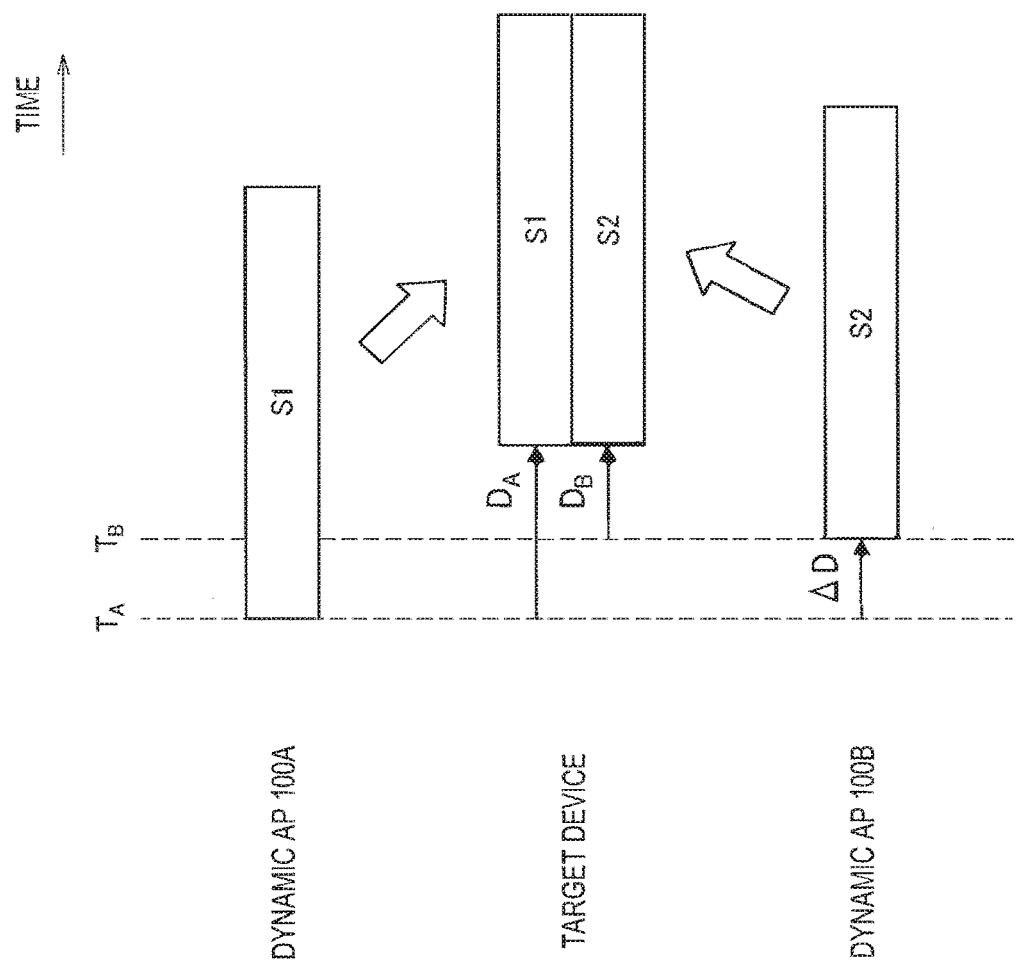
FIG. 4 is an explanatory diagram for describing an example of transmission timing of a dynamic AP.

FIG. 4 is an explanatory diagram for describing an example of transmission timing of the dynamic AP 200. FIG. 4 illustrates transmission timing at which a dynamic AP 200A and a dynamic AP 200B perform transmission (i.e. joint transmission) of signals to a target device in parallel using the same frequency resource. For example, the dynamic AP 200A is farther from the target device than the dynamic AP 200B. Accordingly, a starting time point of a transmission frame with which joint transmission is performed is decided as transmission timing $T_A$ of the dynamic AP 200A for the joint transmission. A time ΔD is a difference between an estimated propagation delay time $D_A$ of signals from the dynamic AP 200A to a target device and an estimated propagation delay time $D_B$ of signals from the dynamic AP 200B to the target device. Accordingly, a time point delayed, as much as the time ΔD, from the starting time point (i.e. transmission timing $T_A$) of a transmission frames with which joint transmission is performed is decided as transmission timing $T_B$ of the dynamic AP 200B for the joint transmission.

In addition, the transmission timing deciding section 139, for example, provides information on the decided transmission timing to a plurality of access points via the network communication unit 110, the plurality of access points performing the transmission (i.e. joint transmission) of signals to the target device. The information on the decided transmission timing is provided to the plurality of dynamic APs 200 in the first embodiment. For example, the information is provided via the base station 10.

Additionally, the transmission timing deciding section 139 may decide the transmission timing further on the basis of propagation path information relating to a propagation path between the target device and each of the one or more dynamic APs 200. The propagation path information may include information relating to a change in the phase of the propagation path. As an example, the propagation path information may include information on the frequency of a radio resource used for joint transmission. The frequency may change the extent to which the phase of signals is shifted in the propagation path in the joint transmission. Accordingly, the further use of such a kind of propagation path information allows more appropriate transmission timing to be decided. That is to say, it becomes possible to cancel phase shift of the propagation path.

<1.2.2. Configuration of Dynamic Access Point>

Figure 5:
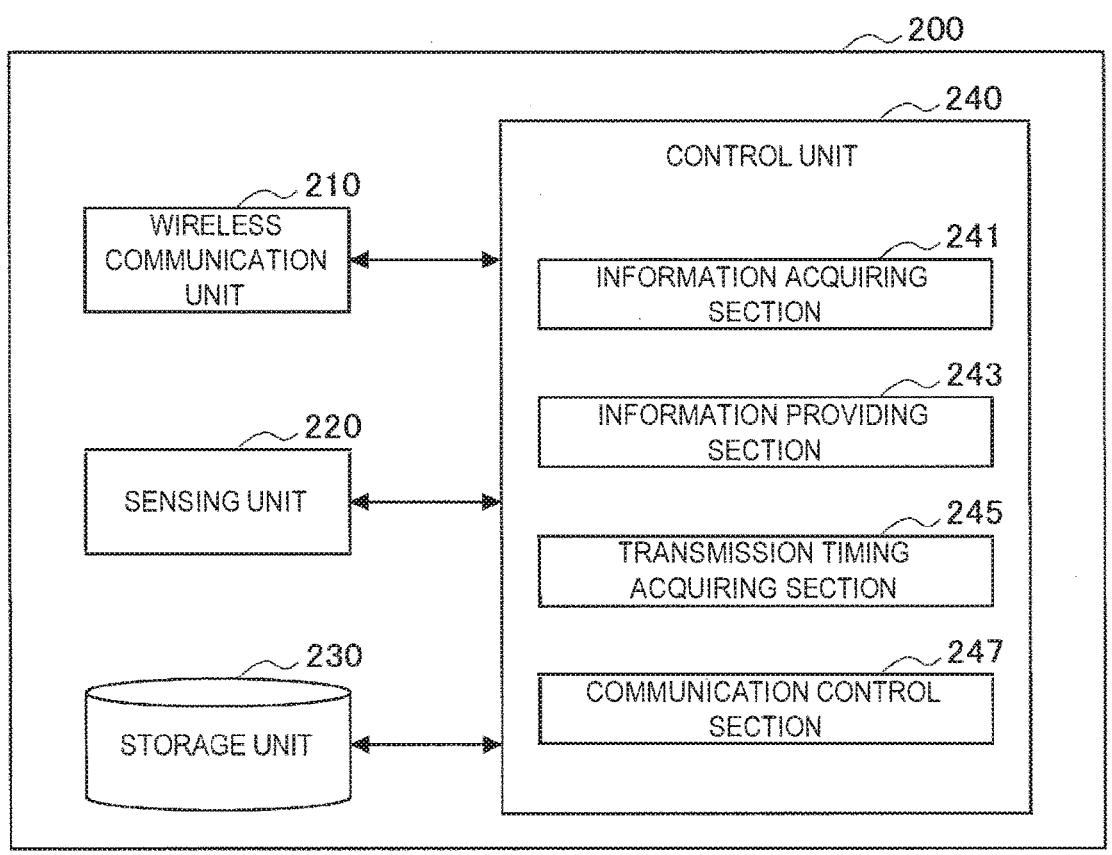
FIG. 5 is a block diagram illustrating an example of a configuration of a dynamic AP according to the first embodiment.

An example of the configuration of the dynamic AP 200 according to the first embodiment will be described with reference to FIG. 5. FIG. 5 is a block diagram illustrating an example of the configuration of the dynamic AP 200 according to the first embodiment. FIG. 5 illustrates that the dynamic AP 200 includes a wireless communication unit 210, a sensing unit 220, a storage unit 230, and a control unit 240.

(Wireless Communication Unit 210)

The wireless communication unit 210 wirelessly communicates with another device. That is to say, the wireless communication unit 210 transmits a signal to the other device, and receives a signal transmitted by the other device.

For example, the wireless communication unit 210 wirelessly communicates with the base station 10. In addition, when the dynamic AP 200 operates as an access point, the wireless communication unit 210 wirelessly communicates with the terminal device 20.

The wireless communication unit 210 includes, for example, a communication antenna, an RF circuit, and another communication processing circuit.

(Sensing Unit 220)

The sensing unit 220 detects information relating to the dynamic AP 200. The sensing unit 220 then provides the detected information to the control unit 240.

For example, the sensing unit 220 detects positional information indicating the position of the dynamic AP 200. Specifically, the sensing unit 220 includes, for example, a GPS sensor, and detects information indicating the position $P_T$ of the dynamic AP 200 which is represented by plane coordinates (X, Y).

In addition, the sensing unit 220 detects, for example, direction information indicating the direction of the dynamic AP 200. Specifically, the sensing unit 220 includes, for example, a geomagnetic sensor, and detects information indicating the magnetic field strength in the triaxial directions of the dynamic AP 200 which are orthogonal to each other.

In addition, the sensing unit 220 detects, for example, acceleration information indicating the acceleration of the dynamic AP 200. Specifically, the sensing unit 220 includes, for example, an acceleration sensor, and detects information indicating the acceleration in the triaxial directions of the dynamic AP 200 which are orthogonal to each other.

(Storage Unit 230)

The storage unit 230 stores a program and data for operating the dynamic AP 200. The storage unit 230 includes, for example, a magnetic storage device such as a hard disk, or nonvolatile memory such as EEPROM and flash memory.

(Control Unit 240)

The control unit 240 provides a variety of functions of the dynamic AP 200. The control unit 240 includes, for example, a processor such as a CPU or a DSP. The control unit 240 then provides the variety of functions by executing a program stored in the storage unit 230 or another storage medium.

The control unit 240 includes an information acquiring section 241, an information providing section 243, a transmission timing acquiring section 245, and a communication control section 247.

(Information Acquiring Section 241)

The information acquiring section 241 acquires individual position related information relating to the position of the dynamic AP 200. That is to say, the information acquiring section 241 acquires individual position related information relating to the position of the dynamic AP 200 among DAP position related information acquired by the control server 100-1.

For example, the individual position related information includes information relating to a change in the position of the dynamic AP 200. More specifically, the information relating to a change in the position is, for example, positional information and movement information on the dynamic AP 200.

For example, the information acquiring section 241 acquires positional information on the position of the dynamic AP 200 from the sensing unit 220.

In addition, the information acquiring section 241, for example, acquires direction information and acceleration information on the dynamic AP 200 from the sensing unit 220, and calculates the moving velocity $V_T$ (moving speed and moving direction) of the dynamic AP 200 on the basis of the direction information and the acceleration information. For example, in this way, the information acquiring section 241 acquires movement information indicating the moving velocity of the dynamic AP 200.

As described above, the information acquiring section 241 acquires information (positional information and movement information) relating to a change in the position of the dynamic AP 200, thereby acquiring individual position related information.

(Information Providing Section 243)

The information providing section 243 provides individual position related information relating to the position of the dynamic AP 200 to the control server 100-1. For example, the information providing section 243 provides the individual position related information to the control server 100-1 via the wireless communication unit 210 upon receiving the individual position related information from the information acquiring section 241.

(Transmission Timing Acquiring Section 245)

When the dynamic AP 200 and one or more access points perform transmission of signals to a target device in parallel using the same frequency resource, the control server 100-1 decides transmission timing of the dynamic AP 200 and each of the one or more access points for the transmission. The transmission timing acquiring section 245 then acquires information on the transmission timing of the dynamic AP 200 for the transmission.

For example, once the control server 100-1 provides the information on the transmission timing to the dynamic AP 200 via the base station 10, the transmission timing acquiring section 245 acquires the information on the transmission timing via the wireless communication unit 210.

In addition, the transmission timing acquiring section 245 also acquires allocation information including information on a transmission frame with which the transmission of signals to the target device is performed.

For example, once the control server 100-1 provides the allocation information to the base station 10, the base station 10 transmits the allocation information to the dynamic AP 200. The transmission timing acquiring section 245 then acquires the allocation information via the wireless communication unit 210.

(Communication Control Section 247)

The communication control section 247 controls communication performed by the dynamic AP 200.

The communication control section 247 operates the dynamic AP 200 as an access point in particular.

For example, the communication control section 247 wirelessly communicates with the terminal device 20 via the wireless communication unit 210, and relays communication between the base station 10 and the terminal device 20. More specifically, the communication control section 247, for example, causes the wireless communication unit 210 to receive signals transmitted by the base station 10, and to transmit signals of data addressed to the terminal device 20 to the terminal device 20, the signals being included in the received signals. For example, the communication control section 247 causes the wireless communication unit 210 to receive signals transmitted by the terminal device 20, and to transmit signals of data included in the received signals to the base station 10.

In particular, based on the transmission timing of the dynamic AP 200 for the transmission (i.e. joint transmission) of signals to a target device in parallel using the same frequency resource, the communication control section 247 controls the transmission of the dynamic AP 200 for the transmission.

For example, once the transmission timing acquiring section 245 acquires transmission timing and allocation information, the communication control section 247 causes the wireless communication unit 210 to transmit signals to a target device at the transmission timing in a transmission frame in which the transmission of signals to the target device is performed. Additionally, the target device is the terminal device 20 in the downlink, and the base station 10 in the uplink.

1.3. Flow of Processing

Next, an example of communication control processing according to the first embodiment will be described with reference to FIGS. 6A to 7C.

(Communication Control Processing for Downlink)

Figure 6C:
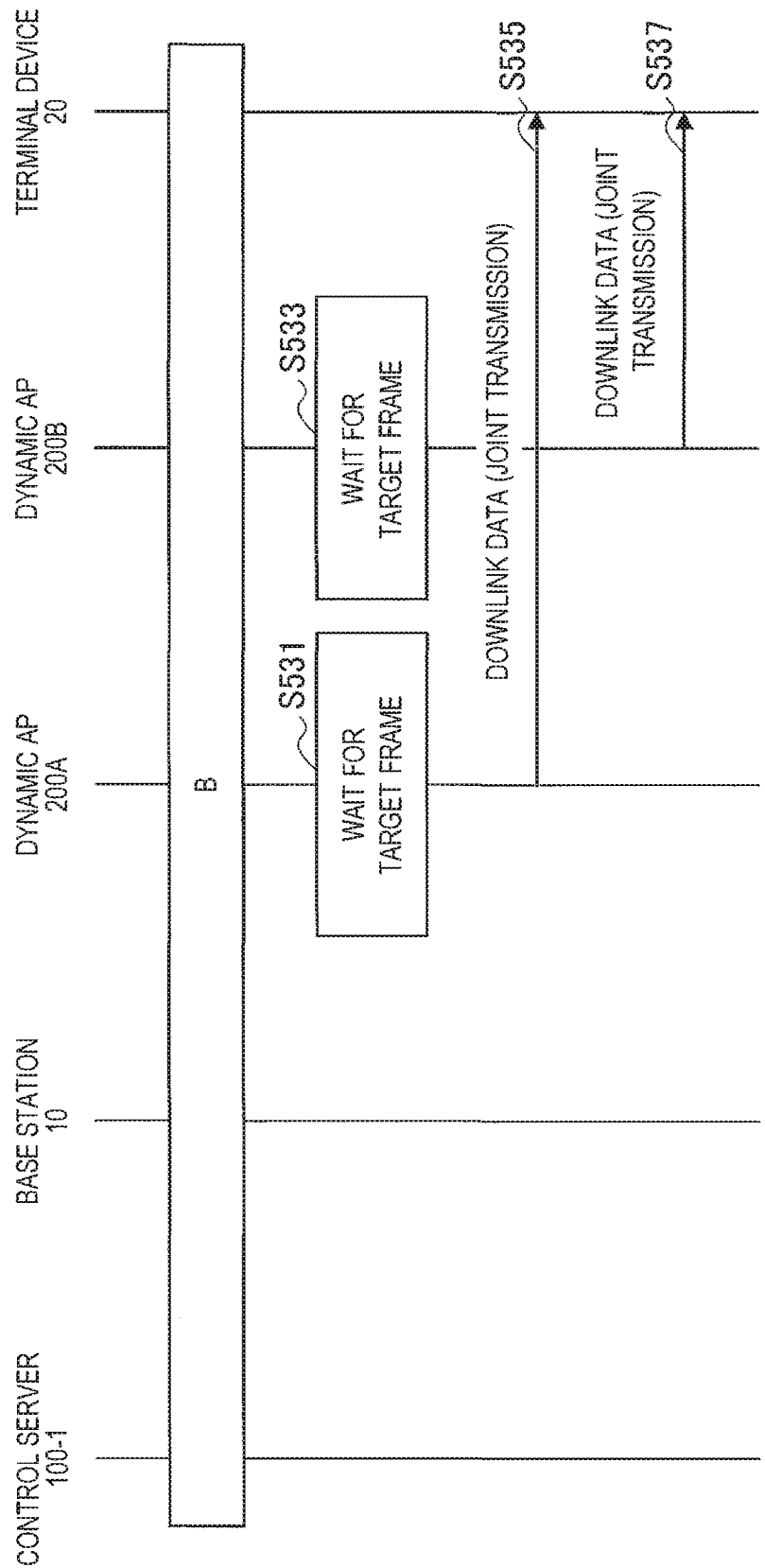
FIG. 6C is a flowchart illustrating the example of the schematic flow of the communication control processing according to the first embodiment for a downlink.

First of all, an example of communication control processing for the downlink will be described with reference to FIGS. 6A to 6C. Each of FIGS. 6A to 6C is a flowchart illustrating an example of a schematic flow of communication control processing according to the first embodiment for the downlink.

First of all, the information acquiring section 241 of the dynamic AP 200A acquires individual position related information relating to the position of the dynamic AP 200A (step S501). In addition, the information acquiring section 241 of the dynamic AP 200B also acquires individual position related information relating to the position of the dynamic AP 200B (step S503). Furthermore, the terminal device 20 also acquires position related information relating to the position of the terminal device 20 (step S505).

The terminal device 20 then transmits a request for communication by the terminal device 20 in the cell 11 and the position related information (i.e. target device position related information) relating to the position of the terminal device 20 to the dynamic AP 200B and the dynamic AP 200A (steps S507 and S509).

The information providing section 243 of the dynamic AP 200B transmits the request for communication by the terminal device 20 in the cell 11, the position related information relating to the position of the terminal device 20, and the individual position related information relating to the position of the dynamic AP 200B to the base station 10 via the wireless communication unit 210 (S511).

The information providing section 243 of the dynamic AP 200A also transmits the request for communication by the terminal device 20 in the cell 11, the position related information relating to the position of the terminal device 20, and the individual position related information relating to the position of the dynamic AP 200A to the base station 10 via the wireless communication unit 210 (S513).

Thereafter, the base station 10 transmits the request for communication by the terminal device 20 in the cell 11 and the received position related information to the control server 100-1 (S515). The received position related information includes the position related information relating to the position of the terminal device 20, the individual position related information relating to the position of the dynamic AP 200A, and the individual position related information relating to the position of the dynamic AP 200B.

The joint transmission determining section 133 of the control server 100-1 then determines whether or not the dynamic AP 200A and the dynamic AP 200B perform transmission of signals to the terminal device 20 in parallel using the same frequency resource (S517). Here, for example, the joint transmission determining section 133 determines that the transmission of signals to the terminal device 20 is performed.

The scheduling section 135 of the control server 100-1 then allocates a radio resource for performing the transmission of signals to the terminal device 20 (S519).

Moreover, the distance estimating section 137 of the control server 100-1 estimates the distance between the terminal device 20 and each of the dynamic AP 200A and the dynamic AP 200B during the transmission of signals to the terminal device 20 on the basis of the position related information on each device (S521).

The transmission timing deciding section 139 of the control server 100-1 then decides transmission timing of each of the dynamic AP 200A and the dynamic AP 200B for the transmission (i.e. joint transmission) of signals to the terminal device 20 on the basis of information on the estimated distance (S523).

Thereafter, the control server 100-1 transmits downlink data addressed to the terminal device 20, allocation information relating to the allocation of a radio resource, and information on the decided transmission timing to the base station 10 (S525).

Moreover, the base station 10 transmits the downlink data addressed to the terminal device 20, the allocation information, and the information on the decided transmission timing to the dynamic AP 200A and the dynamic AP 200B (S527 and S529).

Thereafter, the dynamic AP 200A and the dynamic AP 200B wait for a target frame corresponding to the allocated radio resource (S531 and S533).

The communication control section 247 of the dynamic AP 200A then transmits signals including the downlink data to the terminal device 20 with the target frame at the decided transmission timing of the dynamic AP 200A (S535).

The communication control section 247 of the dynamic AP 200B also transmits signals including the downlink data to the terminal device 20 with the target frame at the decided transmission timing of the dynamic AP 200B (S537).

(Communication Control Processing for Uplink)

Furthermore, an example of communication control processing for the uplink will be described with reference to FIGS. 7A to 7C. Each of FIGS. 7A to 7C is a flowchart illustrating an example of a schematic flow of communication control processing according to the first embodiment for the downlink.

First of all, the information acquiring section 241 of the dynamic AP 200A acquires individual position related information relating to the position of the dynamic AP 200A (step S601). In addition, the information acquiring section 241 of the dynamic AP 200B also acquires individual position related information relating to the position of the dynamic AP 200B (step S603).

The terminal device 20 then transmits a request for communication by the terminal device 20 in the cell 11 to the dynamic AP 200B and the dynamic AP 200A (steps S605 and S607).

The information providing section 243 of the dynamic AP 200B transmits the request for communication by the terminal device 20 in the cell 11 and the individual position related information relating to the position of the dynamic AP 200B to the base station 10 via the wireless communication unit 210 (S609).

The information providing section 243 of the dynamic AP 200A also transmits the request for communication by the terminal device 20 in the cell 11 and the individual position related information relating to the position of the dynamic AP 200A to the base station 10 via the wireless communication unit 210 (S611).

Thereafter, the base station 10 transmits the request for communication by the terminal device 20 in the cell 11, the individual position related information relating to the position of the dynamic AP 200A, and the individual position related information relating to the position of the dynamic AP 200B to the control server 100-1 (S613).

The joint transmission determining section 133 of the control server 100-1 then determines whether or not the dynamic AP 200A and the dynamic AP 200B perform transmission of signals to the base station 10 in parallel using the same frequency resource (S615). Here, for example, the joint transmission determining section 133 determines that the transmission of signals to the base station 10 is performed.

The scheduling section 135 of the control server 100-1 then allocates a radio resource for performing the transmission of signals to the base station 10 (S617).

Moreover, the distance estimating section 137 of the control server 100-1 estimates the distance between the base station 10 and each of the dynamic AP 200A and the dynamic AP 200B during the transmission of signals to the base station 10 on the basis of the position related information on each device (S619).

The transmission timing deciding section 139 of the control server 100-1 then decides transmission timing of each of the dynamic AP 200A and the dynamic AP 200B for the transmission (i.e. joint transmission) of signals to the base station 10 on the basis of information on the estimated distance (S621).

Thereafter, the control server 100-1 transmits allocation information relating to the allocation of a radio resource and information on the decided transmission timing to the base station 10 (S623).

Moreover, the base station 10 transmits the allocation information and the information on the decided transmission timing to the dynamic AP 200A and the dynamic AP 200B (S625 and S627).

Thereafter, the terminal device 20 transmits signals including uplink data to the dynamic AP 200A and the dynamic AP 200B (S629 and S631).

The dynamic AP 200A and the dynamic AP 200B then wait for a target frame corresponding to the allocated radio resource (S633 and S635).

Thereafter, the communication control section 247 of the dynamic AP 200A then transmits signals including the uplink data to the base station 10 with the target frame at the decided transmission timing of the dynamic AP 200A (S637).

The communication control section 247 of the dynamic AP 200B also transmits signals including the uplink data to the base station 10 with the target frame at the decided transmission timing of the dynamic AP 200B (S639).

1.4. Modified Examples

Next, modified examples of the first embodiment will be described with reference to FIGS. 8 and 9.

FIG. 1 has illustrated an example in which the plurality of dynamic APs 200 communicate with the base station 10 of the cell 11, and perform joint transmission to the base station 10 or the terminal device 20 as an example of the first embodiment.

First Modified Example

Meanwhile, the plurality of dynamic APs 200 may also communicate with a small cell base station 30 of a small cell 31 a part or the whole of which overlaps with the cell 11, and perform joint transmission to the small cell base station 30 or the terminal device 20 as a first modified example of the first embodiment. That is to say, a target device that is a target of joint transmission may be a small cell base station. A specific example of the first modified example will be described with reference to FIG. 8.

FIG. 8 is an explanatory diagram illustrating an example of a schematic configuration of a communication system 1-1A according to the first modified example of the first embodiment. As illustrated in FIG. 8, the communication system 1-1A may include the small cell base station 30 in the first modified example of the first embodiment. When the dynamic AP 200A and the dynamic AP 200B communicate with the small cell base station 30, transmission of signals to the small cell base station 30 or the terminal device 20 in parallel may be performed using the same frequency resource. As with the base station 10, transmission timing for the joint transmission to the terminal device 20 or the small cell base station 30 is decided even in such a case of the small cell base station 30.

It goes without saying that when communicating with the base station 10 (i.e. macrocell base station), the plurality of dynamic APs 200 may perform transmission of signals to the base station 10 or the terminal device 20 in parallel using the same frequency resource in the first modified example.

Second Modified Example

Joint transmission to the terminal device 20 may be performed as a second modified example of the first embodiment when a part of the plurality of dynamic APs 200 communicates with the small cell base station 30 of the small cell 31, and the rest of the plurality of dynamic APs 200 communicates with the base station 10. A specific example of the second modified example will be described with reference to FIG. 8.

Figure 9:
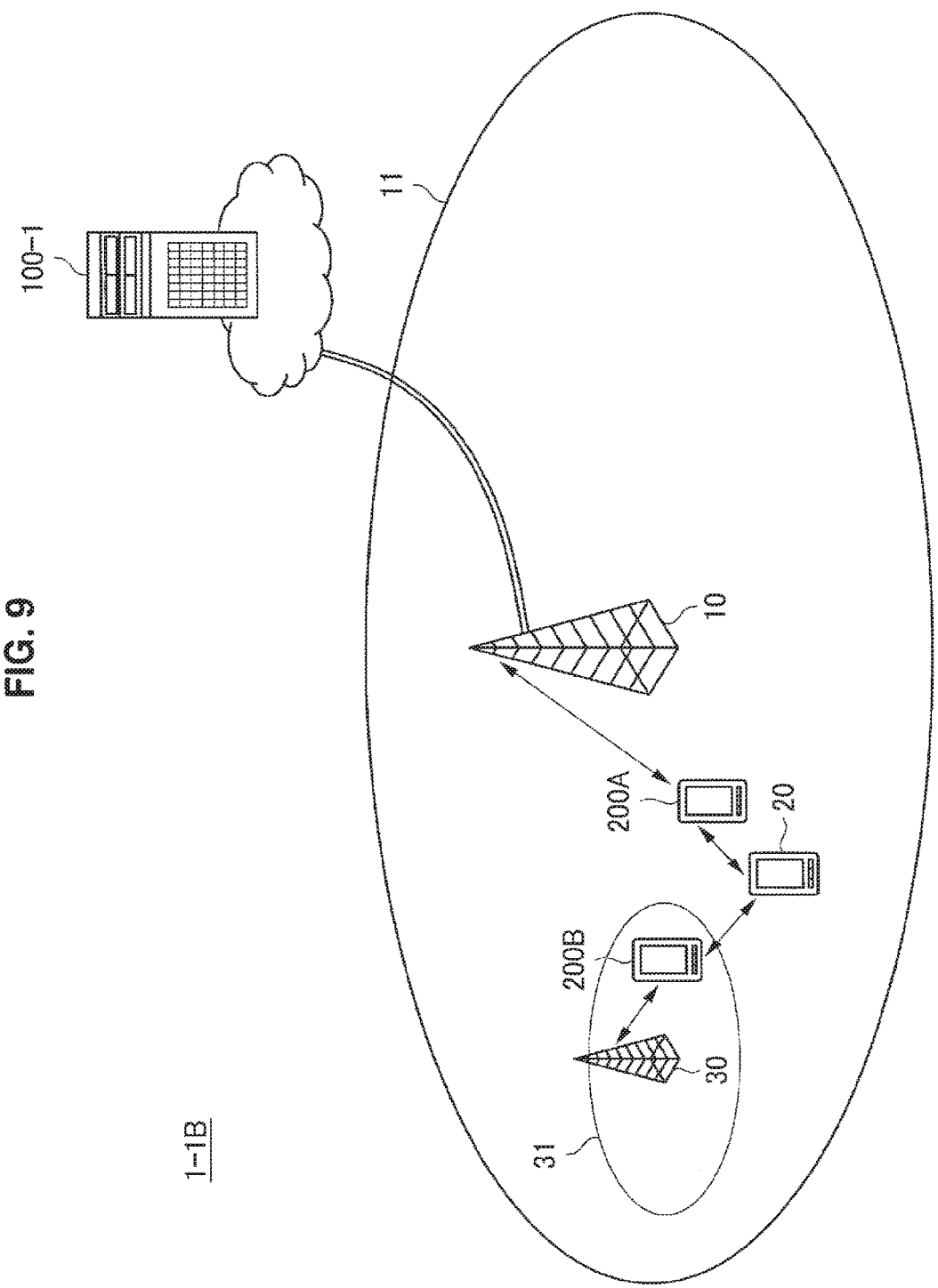
FIG. 9 is an explanatory diagram illustrating an example of a schematic configuration of a communication system according to a second modified example of the first embodiment.

FIG. 9 is an explanatory diagram illustrating an example of a schematic configuration of a communication system 1-1B according to the second modified example of the first embodiment. As illustrated in FIG. 9, the communication system 1-1B may also include the small cell base station 30 in the second modified example of the first embodiment. When the dynamic AP 200A communicates with the base station 10 and the dynamic AP 200B communicates with the small cell base station 30, the dynamic AP 200A and the dynamic AP 200B may perform transmission of signals to the terminal device 20 in parallel using the same frequency resource. Transmission timing for joint transmission to the terminal device 20 is decided in the same way even in such a case.

It goes without saying that when communicating with the base station 10 (i.e. macrocell base station), the plurality of dynamic APs 200 may perform transmission of signals to the base station 10 or the terminal device 20 in parallel using the same frequency resource in the second modified example. When the plurality of dynamic APs 200 communicate with the small cell base station 30, transmission of signals to the terminal device 20 or the small cell base station 30 in parallel may be performed using the same frequency resource.

2. Second Embodiment

Next, a second embodiment of the present disclosure will be described with reference to FIGS. 10 to 15. One or more wireless communication devices (such as terminal devices) that operate as access points, and one or more base stations perform transmission of signals to a terminal device in parallel using the same frequency resource in the second embodiment.

2.1. Schematic Configuration of Communication System

Figure 10:
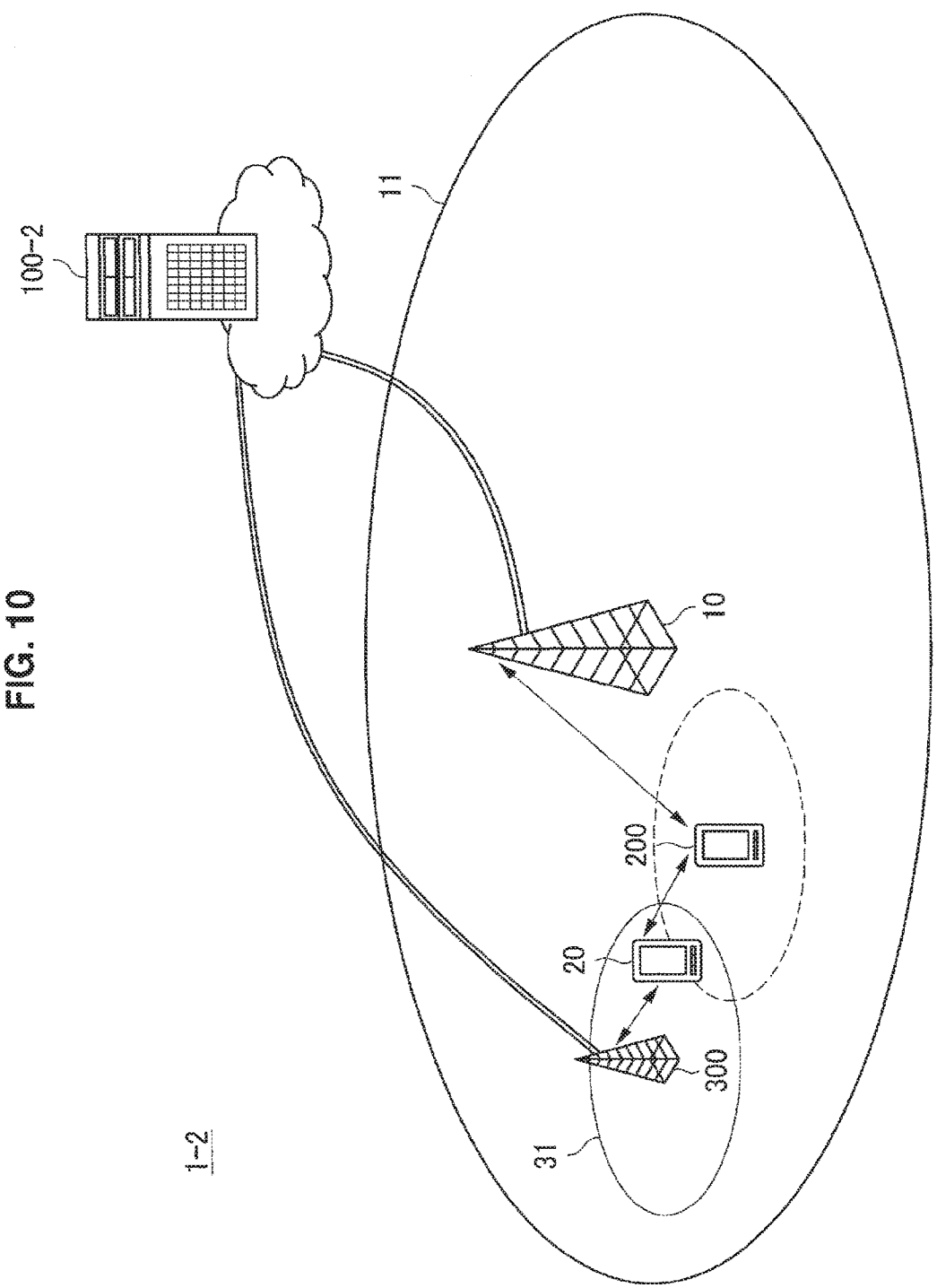
FIG. 10 is an explanatory diagram illustrating an example of a schematic configuration of a communication system according to a second embodiment.

First of all, a schematic configuration of a communication system 1-2 according to the second embodiment of the present disclosure will be described with reference to FIG. 10. FIG. 10 is an explanatory diagram illustrating an example of a schematic configuration of the communication system 1-2 according to the second embodiment. FIG. 10 illustrates that the communication system 1-2 includes a macrocell base station 10, a terminal device 20, a control server 100-2, a dynamic AP 200, and a small cell base station 300.

(Macrocell Base Station 10)

The macrocell base station 10 wirelessly communicates with a device positioned within a macrocell 11. This point has been described in the first embodiment.

(Terminal Device 20)

When positioned within the macrocell 11, the terminal device 20 wirelessly communicates with the macrocell base station 10. The terminal device 20 is, for example, a movable device. These points have been described in the first embodiment.

When positioned within a small cell 31, the terminal device 20 wirelessly communicates with the small cell base station 300 in the second embodiment. That is to say, the terminal device 20 transmits a signal to the small cell base station 300, and receives a signal transmitted by the small cell base station 300.

(Dynamic AP 200)

The dynamic AP 200 is a wireless communication device, and wirelessly communicates with the macrocell base station 10 when the dynamic AP 200 is positioned within the macrocell 11. The dynamic AP 200 is, for example, a movable device. In addition, the dynamic AP 200 can operate as an access point. These points have been described in the first embodiment.

When positioned within the small cell 31, the dynamic AP 200 wirelessly communicates with the small cell base station 300. That is to say, the dynamic AP 200 transmits a signal to the small cell base station 300, and receives a signal transmitted by the small cell base station 300.

The one or more dynamic APs 200 perform transmission of signals to the terminal device 20 in parallel along with one or more base stations (such as the one or more small cell base stations 300) by using the same frequency resource especially in the second embodiment. In other words, the one or more dynamic APs 200 perform joint transmission to the terminal device 20 along with the one or more base stations (such as the one or more small cell base stations 300).

(Small Cell Base Station 300)

The small cell base station 300 wirelessly communicates with a device positioned within the small cell 31, a part or the whole of which overlaps with the macro cell 11.

For example, the small cell base station 300 wirelessly communicates with the terminal device 20 positioned within the small cell 31. That is to say, the small cell base station 300 transmits a signal to the terminal device 20, and receives a signal transmitted by the terminal device 20.

For example, the small cell base station 300 also wirelessly communicates with the dynamic AP 200 positioned within the small cell 31. That is to say, the small cell base station 300 transmits a signal to the dynamic AP 200, and receives a signal transmitted by the dynamic AP 200.

The one or more small cell base stations 300, for example, perform transmission of signals to the terminal device in parallel along with the one or more dynamic APs 200 by using the same frequency resource especially in the second embodiment. In other words, the one or more small cell base stations 300 perform joint transmission to the terminal device 20 along with the one or more dynamic APs 200.

(Control Server 100-2)

When a plurality of access points perform transmission of signals to a target device in parallel using the same frequency resource, the control server 100-2 decides transmission timing for the transmission.

The plurality of access points include the one or more dynamic APs 200. Additionally, the plurality of access points include one or more base stations especially in the second embodiment. That is to say, as discussed above, one or more dynamic APs and one or more base stations (such as the small cell base stations 300) perform transmission of signals to a target device in parallel using the same frequency resource in the second embodiment. The control server 100-2 decides transmission timing of each of the one or more dynamic APs and the one or more base stations (such as the small cell base stations 300) for the transmission in this case. Each of the one or more dynamic APs 200 and the one or more base stations (such as the small cell base stations 300) then performs the transmission on the basis of the decided transmission timing.

(Others)

Additionally, the macrocell base station 10 and the control server 100-2 communicate with each other, for example, via a wired backbone line. Meanwhile, the macrocell base station 10 and the dynamic AP 200 communicate with each other, for example, via a wireless backbone line. These points have been described in the first embodiment.

In addition, the small cell base station 300 and the control server 100-2 communicate with each other, for example, via a wired backbone line in the second embodiment. Meanwhile, the small cell base station 300 and the dynamic AP 200 communicate with each other, for example, via a wireless backbone line.

2.2. Configuration of Each Device

Next, the configurations of the control server 100-2 and the small cell base station 300 will be described. Additionally, the configuration of the dynamic AP 200 has been described in the first embodiment.

<2.2.1. Configuration of Control Server>

Figure 11:
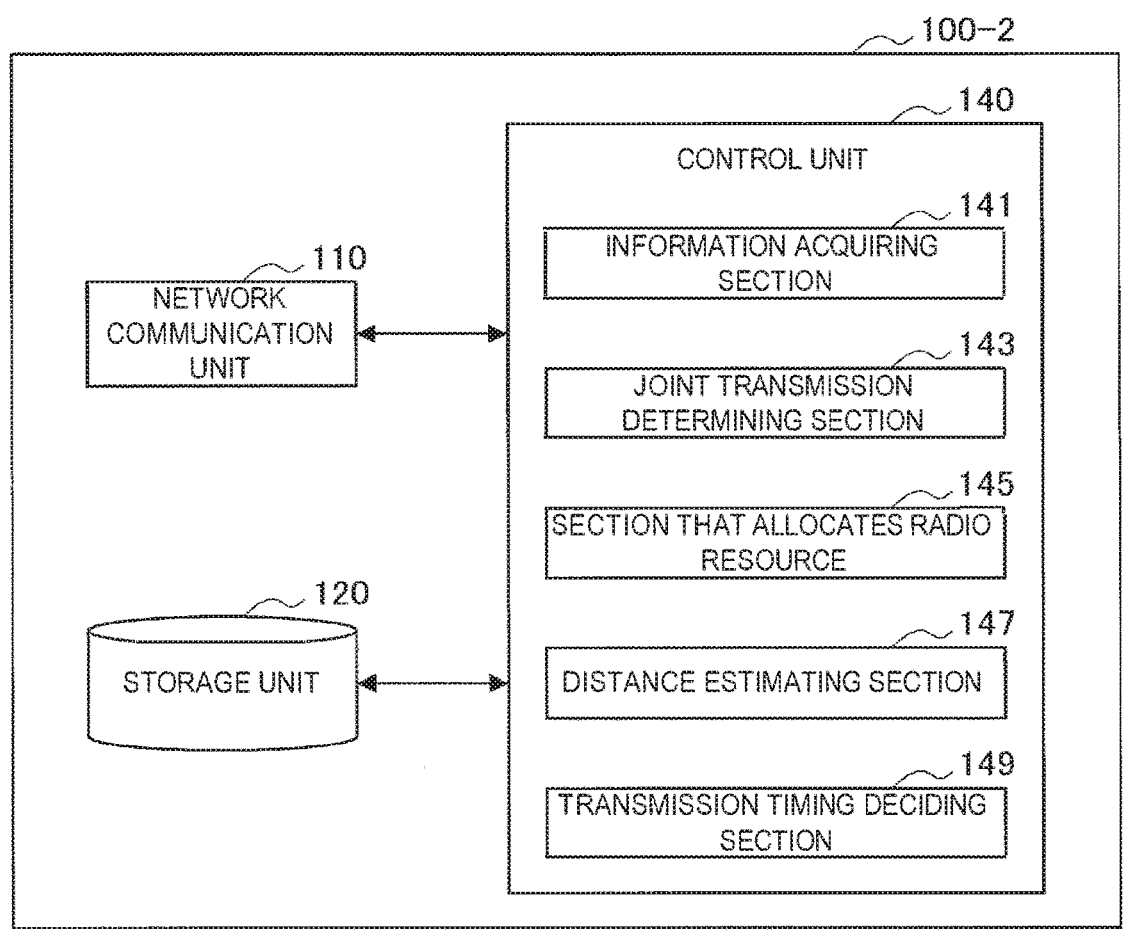
FIG. 11 is a block diagram illustrating an example of a configuration of a control server according to the second embodiment.

An example of the configuration of the control server 100-2 according to the second embodiment will be described with reference to FIG. 11. FIG. 11 is a block diagram illustrating an example of the configuration of the control server 100-2 according to the second embodiment. FIG. 11 illustrates that the control server 100-2 includes a network communication unit 110, a storage unit 120, and a control unit 140.

Additionally, there is no difference in particular in the network communication unit 110 and the storage unit 120 between the first embodiment and the second embodiment. Accordingly, the control unit 140 alone will be described here.

(Control Unit 140)

The control unit 140 provides a variety of functions of the control server 100-2. The control unit 140 includes, for example, a processor such as a CPU or a DSP. The control unit 140 then provides the variety of functions by executing a program stored in the storage unit 120 or another storage medium.

The storage unit 140 includes an information acquiring section 141, a joint transmission determining section 143, a scheduling section 145, a distance estimating section 147, and a transmission timing deciding section 149.

(Information Acquiring Section 141)

The information acquiring section 141 acquires first position related information (i.e. DAP position related information) and second position related information (i.e. target device position related information), the DAP position related information relating to the positions of the one or more dynamic APs 200 among a plurality of access points that perform transmission of signals to a target device in parallel using the same frequency resource, the target device position related information relating to the position of the target device.

For example, the information acquiring section 141 acquires individual position related information from each of the one or more dynamic APs 200 via the network communication unit 110, thereby acquiring the DAP position related information.

In addition, the target device is the terminal device 20 in the second embodiment. The information acquiring section 141 acquires target device position related information from the terminal device 20 via the network communication unit 110.

The plurality of access points include one or more base stations especially in the second embodiment. The information acquiring section 141 further acquires third position related information ("base station position related information" below) relating to the positions of the one or more base stations.

For example, the one or more base stations include at least the one small cell base station 300. More specifically, each of the one or more base stations is, for example, the small cell base station 300.

For example, the information acquiring section 141 acquires base station position related information (such as information relating to the positions of the one or more small cell base stations 300) stored in the storage unit 120.

DAP Position Related Information

For example, the DAP position related information includes information relating to a change in the position of each of the one or more dynamic APs 200. This point has been described in the first embodiment.

Additionally, the one or more dynamic APs 200 may be, for example, the one dynamic AP 200 or the plurality of dynamic APs 200 in the second embodiment.

Target Device Position Related Information

The target device position related information is position related information relating to the position of the terminal device 20 in the second embodiment. Furthermore, the target device position related information includes, for example, information relating to a change in the position of the terminal device 20. This point has been described in the first embodiment.

Base Station Position Related Information

The base station position related information includes positional information indicating the positions of the one or more base stations. For example, each of the one or more base stations is the small cell base station 300, and the base station position related information includes positional information indicating the positions of the one or more small cell base stations 300.

For example, the positional information indicates a fixed position that does not change with the lapse of time. In addition, the positional information is stored, for example, in the storage unit 120 in advance.

(Joint Transmission Determining Section 143)

The joint transmission determining section 143 determines whether or not a plurality of access points perform transmission of signals to a target device in parallel using the same frequency resource.

For example, once the terminal device 20 requests communication in the macrocell 11 via a plurality of access points, the joint transmission determining section 143 determines whether or not the plurality of access points perform transmission of signals to a target device in parallel using the same frequency resource.

The joint transmission determining section 143 determines whether or not the one or more dynamic APs 200 and one or more base stations (such as the one or more small cell base stations 300) perform transmission of signals to the terminal device 20 in parallel using the same frequency resource especially in the second embodiment. In other words, the joint transmission determining section 143 determines whether or not joint transmission to the terminal device 20 in the downlink is performed.

More specifically, the joint transmission determining section 143, for example, estimates the reception power of signals in the terminal device 20, and compares the estimated reception power with a threshold, the signals being transmitted by the macrocell base station 10. If the estimated reception power falls below the threshold, the joint transmission determining section 143 determines that the one or more dynamic APs 200 and the one or more small cell base stations 300 perform transmission of signals to the terminal device 20 in parallel using the same frequency resource. That is to say, it is determined that the macrocell base station 10 transmits signals including the same data to the one or more dynamic APs 200 and the one or more small cell base stations 300, and the one or more dynamic APs 200 and the one or more small cell base stations 300 transmit the signals including the same data to the terminal device 20 in parallel using the same frequency resource.

(Scheduling Section 145)

The scheduling section 145 allocates a radio resource for performing transmission of signals to the terminal device 20 in parallel using the same frequency resource. In other words, the scheduling section 145 allocates a radio resource for performing joint transmission to the terminal device 20.

For example, when the communication system 1-2 is compliant with LTE, the radio resource is one or more resource blocks as an example. That is to say, the scheduling section 145 allocates one or more resource blocks for performing joint transmission to each of a plurality of access points.

The plurality of access points include, for example, the one or more dynamic APs 200 and one or more base stations (such as the small cell base stations 300) especially in the second embodiment. Accordingly, the scheduling section 145 allocates each of the one or more resource blocks to the one or more dynamic APs 200 and the one or more base stations.

In addition, the scheduling section 145, for example, generates allocation information relating to the allocation of a radio resource for performing the transmission (i.e. transmission of signals to a target device in parallel using the same frequency resource). This point has been described in the first embodiment.

The scheduling section 145 then provides, for example, the allocation information to the macrocell base station 10 and the one or more small cell base stations 300 via the network communication unit 110. As a result, the allocation information is transmitted to the one or more dynamic APs 200, for example, by the macrocell base station 10. The radio resource is used by each of the one or more dynamic APs 200 and the one or more small cell base stations 300 for joint transmission in the macrocell 11.

In addition, the scheduling section 145 provides the allocation information to the distance estimating section 147.

Additionally, when the one or more base stations are the one or more small cell base stations 300, a radio resource in an almost blank subframe (ABS) for the small cell 31 is, for example, allocated.

(Distance Estimating Section 147)

The distance estimating section 147 estimates the distance between the terminal device 20 and each of the one or more dynamic APs 200 during the transmission of signals to the terminal device 20 on the basis of the DAP position related information and the target device position related information. This point has been described in the first embodiment.

The distance estimating section 147 estimates the distance between the terminal device 20 and each of the one or more base stations during the transmission of signals to the terminal device 20 on the basis of the base station position related information and the target device position related information especially in the second embodiment. For example, the one or more base stations are the one or more small cell base station 300. Additionally, the distance between the terminal device 20 and each of the one or more small cell base stations 300 may also be estimated in the same technique for the distance between the terminal device 20 and the one or more dynamic APs 200.

(Transmission Timing Deciding Section 149)

The transmission timing deciding section 149 decides transmission timing of each of the plurality of access points for the transmission of signals to the terminal device 20 on the basis of information relating to the distance between the terminal device 20 and each of the plurality of access points. The information relating to the distance includes information on the estimated distance between the terminal device 20 and each of the one or more dynamic APs 200.

In addition, the information relating to the distance includes information on the estimated distance between the terminal device 20 and each of the one or more base stations in the second embodiment. For example, the one or more base stations are the one or more small cell base station 300.

For example, the decided transmission timing is timing of the transmission in a transmission frame in which the transmission of signals to the terminal device 20 is performed.

As specific processing, the transmission timing deciding section 149, for example, selects the farthest device from the terminal device 20 among the one or more dynamic APs 200 and the one or more small cell base stations 300. The device is selected on the basis of information on the estimated distance between the terminal device 20 and each of the one or more dynamic APs 200 and information on the estimated distance between the terminal device 20 and each of the one or more small cell base stations 300. The transmission timing deciding section 149 then decides, as transmission timing of the selected device (dynamic AP 200 or small cell base station 300), a starting point of a transmission frame with which the transmission (i.e. joint transmission) of signals to the terminal device 20 is performed, for example.

The transmission timing deciding section 149, for example, estimates a propagation delay time (which will be referred to as "reference propagation delay time" below) from the selected device to the terminal device 20 on the basis of the information on the distance between the terminal device 20 and the selected device. In addition, the transmission timing deciding section 149 estimates a propagation delay time of signals from the other individual devices of the one or more dynamic APs 200 and the one or more small cell base stations 300 to the terminal device 20 for the other individual devices on the basis of information on the distance between the terminal device 20 and the individual devices. The transmission timing deciding section 149 then calculates a difference between the estimated propagation delay time and the reference propagation delay time. The transmission timing deciding section 149 decides, as transmission timing of the individual devices (dynamic APs 200 or small cell base stations 300), a time point that is delayed from the starting time point of a transmission frame as much as the difference.

In this way, the transmission timing deciding section 149, for example, decides transmission timing of each of the one or more dynamic APs 200 and the one or more small cell base stations 300 for the transmission (i.e. joint transmission) of signals to the target device.

In addition, the transmission timing deciding section 149, for example, provides information on the decided transmission timing to a plurality of access points via the network communication unit 110, the plurality of access points performing the transmission (i.e. joint transmission) of signals to the target device. The information on the decided transmission timing is provided to the one or more dynamic APs 200 and the one or more small cell base stations 300 in the second embodiment.

Additionally, the transmission timing deciding section 149 may decide the transmission timing further on the basis of propagation path information relating to a propagation path between the target device and each of the one or more dynamic APs 200. This point has been described in the first embodiment.

<2.2.2. Configuration of Small Cell Base Station>

Figure 12:
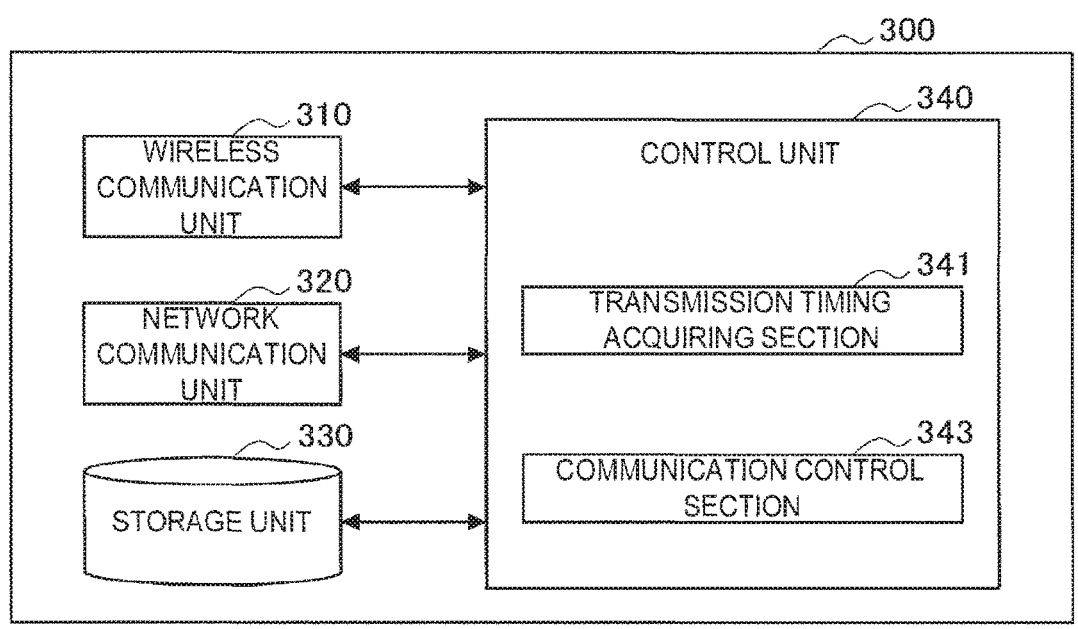
FIG. 12 is a block diagram illustrating an example of a configuration of a small cell base station according to the second embodiment.

An example of the configuration of the small cell base station 300 according to the second embodiment will be described with reference to FIG. 12. FIG. 12 is a block diagram illustrating an example of the configuration of the small cell base station 300 according to the second embodiment. FIG. 12 illustrates that the small cell base station 300 includes a wireless communication unit 310, a network communication unit 320, a storage unit 330, and a control unit 340.

(Wireless Communication Unit 310)

The wireless communication unit 310 wirelessly communicates with another device. That is to say, the wireless communication unit 310 transmits a signal to the other device, and receives a signal transmitted by the other device.

For example, the wireless communication unit 310 wirelessly communicates with the terminal device 20. In addition, the wireless communication unit 310 wirelessly communicates, for example, with the dynamic AP 200.

The wireless communication unit 310 includes, for example, a communication antenna, an RF circuit, and another communication processing circuit.

(Network Communication Unit 320)

The network communication unit 320 communicates with another device. For example, the network communication unit 320 communicates with the control server 100-2. For example, the network communication unit 320 communicates with the macrocell base station 10. More specifically, for example, the network communication unit 320 communicates with the control server 100-2 and the macrocell base station 10 via a wired backbone line.

The network communication unit 110 includes, for example, a LAN terminal, a transmission circuit, and another communication processing circuit.

(Storage Unit 330)

The storage unit 330 stores a program and data for operating the small cell base station 300. The storage unit 330 includes, for example, a magnetic storage device such as a hard disk, or nonvolatile memory such as EEPROM and flash memory.

(Control Unit 340)

The control unit 340 provides a variety of functions of the small cell base station 300. The control unit 340 includes, for example, a processor such as a CPU or a DSP. The control unit 340 then provides the variety of functions by executing a program stored in the storage unit 330 or another storage medium.

The control unit 340 includes a transmission timing acquiring section 341 and a communication control section 343.

(Transmission Timing Acquiring Section 341)

The transmission timing acquiring section 341 acquires information on the transmission timing of the small cell base station 300 for the transmission (i.e. joint transmission) of signals to the terminal device 20.

In addition, the transmission timing acquiring section 341 also acquires allocation information including information on a transmission frame with which the transmission of signals to the terminal device 20 is performed.

For example, once the control server 100-2 provides the information on the transmission timing and the allocation information to the small cell base station 30, the transmission timing acquiring section 341 acquires the information on the transmission timing and the allocation information via the network communication unit 320.

(Communication Control Section 343)

The communication control section 343 controls communication performed by the small cell base station 300.

In particular, based on the transmission timing of the small cell base station 300 for the transmission (i.e. joint transmission) of signals to the terminal device 20 in parallel using the same frequency resource, the communication control section 343 controls the transmission of the small cell base station 300 for the transmission.

For example, once the transmission timing acquiring section 341 acquires transmission timing and allocation information, the communication control section 343 causes the wireless communication unit 310 to transmit signals to the terminal device 20 at the transmission timing in a transmission frame with which the transmission of signals to the terminal device 20 is performed.

2.3. Flow of Processing

Figure 13A:
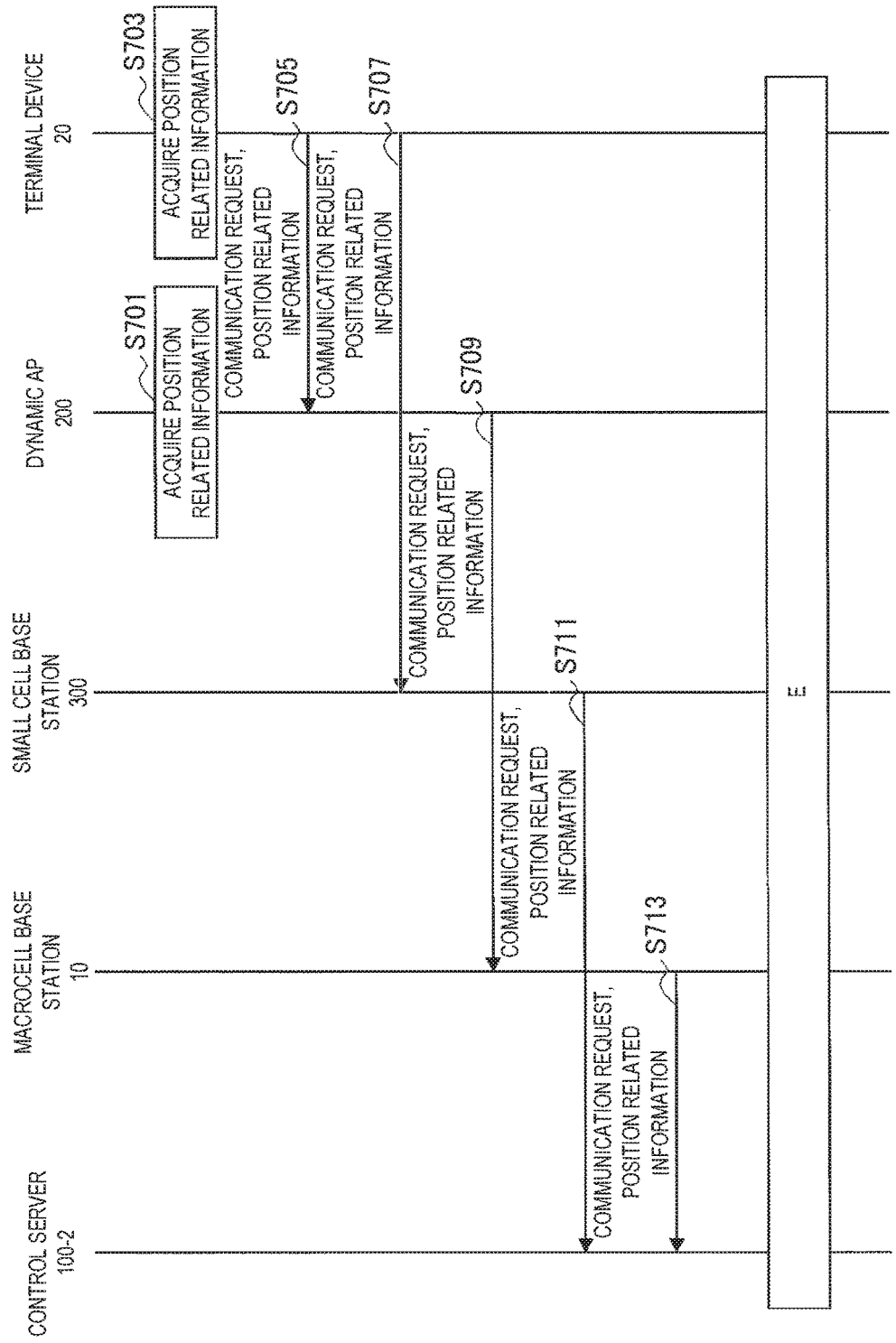
FIG. 13A is a flowchart illustrating an example of a schematic flow of communication control processing according to the second embodiment.
Figure 13C:
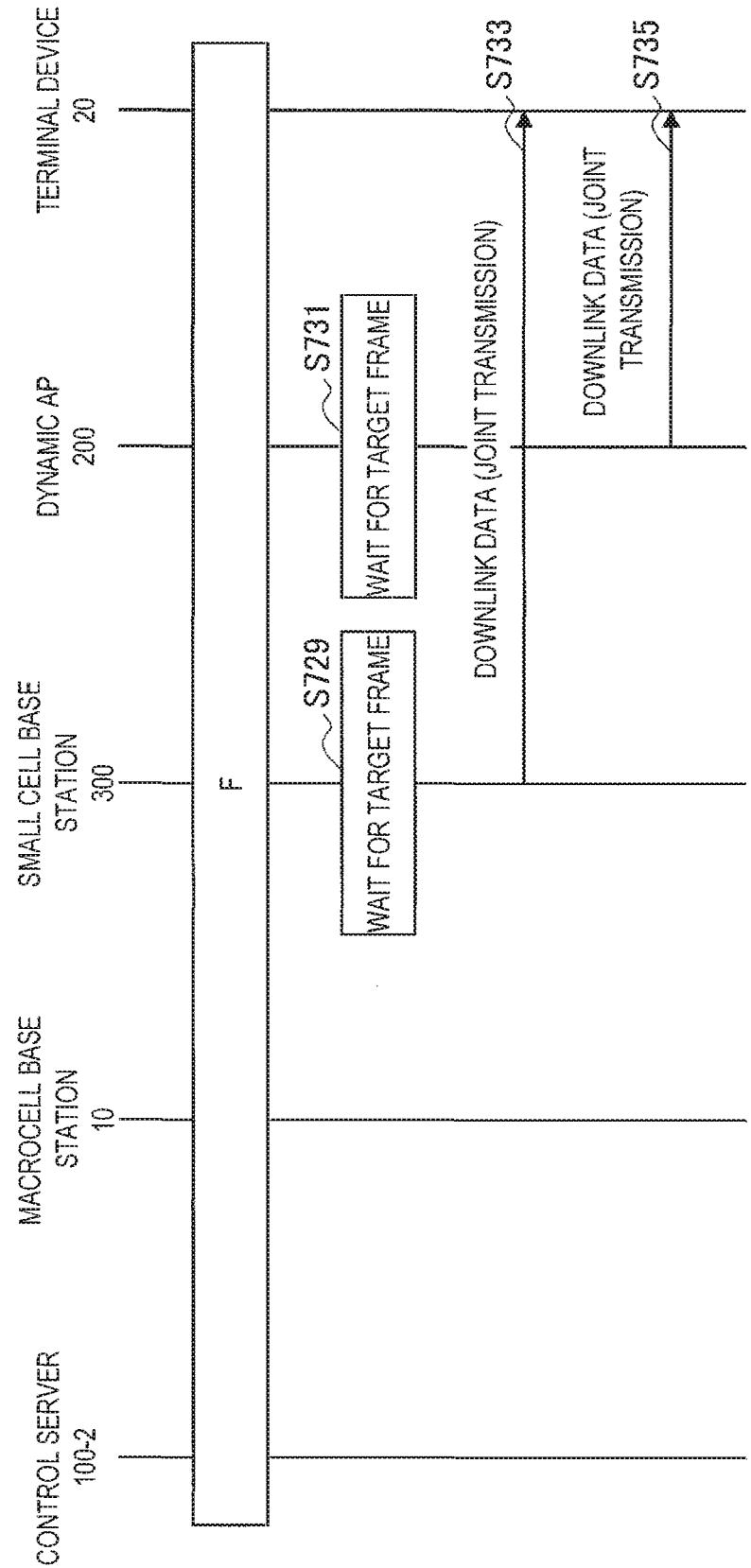
FIG. 13C is a flowchart illustrating the example of the schematic flow of the communication control processing according to the second embodiment.

Next, an example of communication control processing according to the second embodiment will be described with reference to FIGS. 13A to 13C. Each of FIGS. 13A to 13C is a flowchart illustrating an example of a schematic flow of communication control processing according to the second embodiment.

First of all, the information acquiring section 241 of the dynamic AP 200 acquires individual position related information relating to the position of the dynamic AP 200 (step S701). Furthermore, the terminal device 20 also acquires position related information relating to the position of the terminal device 20 (step S703).

The terminal device 20 then transmits a request for communication by the terminal device 20 in the cell 11 and the position related information relating to the position of the terminal device 20 to the small cell base station 300 and the dynamic AP 200 (steps S705 and S707).

The information providing section 243 of the dynamic AP 200 transmits the request for communication by the terminal device 20 in the cell 11, the position related information relating to the position of the terminal device 20, and the individual position related information relating to the position of the dynamic AP 200 to the macrocell base station 10 via the wireless communication unit 210 (S709).

In addition, the small cell base station 300 transmits a request for communication by the terminal device 20 in the cell 11 and the position related information relating to the position of the terminal device 20 to the control server 100-2 via the network communication unit 320 (S711).

Meanwhile, the macrocell base station 10 transmits the information received from the dynamic AP 200 to the control server 100-2 (S713).

The joint transmission determining section 143 of the control server 100-2 then determines whether or not the dynamic AP 200 and the small cell base station 300 perform transmission of signals to the terminal device 20 in parallel using the same frequency resource (S715). Here, for example, the joint transmission determining section 143 determines that the transmission of signals to the terminal device 20 is performed.

The scheduling section 145 of the control server 100-2 then allocates a radio resource for performing the transmission of signals to the terminal device 20 (S717)

Moreover, the distance estimating section 147 of the control server 100-2 estimates the distance between the terminal device 20 and each of the dynamic AP 200 and the small cell base station 300 during the transmission of signals to the terminal device 20 on the basis of the position related information on each device (S719).

The transmission timing deciding section 149 of the control server 100-2 then decides transmission timing of each of the dynamic AP 200 and the small cell base station 300 for the transmission (i.e. joint transmission) of signals to the terminal device 20 on the basis of information on the estimated distance (S721).

Thereafter, the control server 100-2 transmits downlink data addressed to the terminal device 20, allocation information relating to the allocation of a radio resource, and information on the decided transmission timing of the dynamic AP 200 to the macrocell base station 10 (S723).

In addition, the control server 100-2 transmits the downlink data addressed to the terminal device 20, the allocation information relating to the allocation of a radio resource, and information on the decided transmission timing of the small cell base station 300 to the small cell base station 30 (S725).

Moreover, the macrocell base station 10 transmits the downlink data addressed to the terminal device 20, the allocation information, and the information on the decided transmission timing of the dynamic AP 200 to the dynamic AP 200 (S727).

Thereafter, the dynamic AP 200 and the small cell base station 300 wait for a target frame corresponding to the allocated radio resource (S729 and S731).

The communication control section 343 of the small cell base station 300 then transmits signals including the downlink data to the terminal device 20 with the target frame at the decided transmission timing of the small cell base station 300 (S733).

The communication control section 247 of the dynamic AP 200 also transmits signals including the downlink data to the terminal device 20 with the target frame at the decided transmission timing of the dynamic AP 200 (S735).

2.4. Modified Examples

Next, a modified example of the second embodiment will be described with reference to FIGS. 14 and 15.

As discussed above, the one or more dynamic APs 200 and one or more base stations perform joint transmission to the terminal device 20 in the second embodiment. As an example of the second embodiment, an example has been described in which the one or more base stations are the one or more small cell base stations 300.

Meanwhile, the one or more base stations may include at least the one base station 10 of a macrocell as a modified example of the second embodiment. For example, the one or more base stations may be the one or more base station 10 of a macrocell. That is to say, the one or more dynamic APs 200 and the one or more macrocell base stations 10 may perform joint transmission to the terminal device 20. The one or more dynamic APs 200 may communicate with the small cell base station 300 or the macrocell base station 10 in this case. A specific example of the modified example will be described with reference to FIGS. 14 and 15.

FIG. 14 is an explanatory diagram illustrating a first example of a schematic configuration of a communication system 1-2A according to a modified example of the second embodiment. As illustrated in FIG. 14, the dynamic AP 200, which communicates, for example, with the small cell base station 300, and the macrocell base station 10 may perform transmission of signals to the terminal device 20 in parallel using the same frequency resource in the modified example of the second embodiment. Transmission timing for joint transmission to the terminal device 20 is decided in the same way even in such a case.

FIG. 15 is an explanatory diagram illustrating a second example of a schematic configuration of a communication system 1-2B according to a modified example of the second embodiment. As illustrated in FIG. 15, the dynamic AP 200, which communicates, for example, with the macrocell base station 10, and the macrocell base station 10 may perform transmission of signals to the terminal device 20 in parallel using the same frequency resource in the modified example of the second embodiment. Transmission timing for joint transmission to the terminal device 20 is decided in the same way even in such a case.

Additionally, it goes without saying that the one or more dynamic APs 200 and the one or more small cell base stations 300 may perform joint transmission to the terminal device 20 in the modified example of the second embodiment. In addition, the one or more dynamic APs 200, the one or more small cell base stations 300, and the one or more macrocell base stations 10 may perform joint transmission to the terminal device 20 in the modified example of the second embodiment.

3. Third Embodiment

Next, a third embodiment of the present disclosure will be described with reference to FIGS. 16 to 22. One or more wireless communication devices (such as terminal devices) that operate as access points, and a relay station perform transmission of signals to a target device (such as a base station or a terminal device) in parallel using the same frequency resource in the third embodiment.

3.1. Schematic Configuration of Communication System

First of all, a schematic configuration of a communication system 1-3 according to the third embodiment of the present disclosure will be described with reference to FIG. 16. FIG. 16 is an explanatory diagram illustrating an example of a schematic configuration of the communication system 1-3 according to the third embodiment. FIG. 16 illustrates that the communication system 1-3 includes a macrocell base station 10, a terminal device 20, a control server 100-3, a dynamic AP 200, and a relay station 400.

(Macrocell Base Station 10)

The macrocell base station 10 wirelessly communicates with a device positioned within a macrocell 11. This point has been described in the first embodiment.

(Terminal Device 20)

When positioned within the macrocell 11, the terminal device 20 wirelessly communicates with the macrocell base station 10. The terminal device 20 is, for example, a movable device. These points have been described in the first embodiment.

For example, the terminal device 20 wirelessly communicates with the relay station 400 as needed, thereby communicating with the base station 10 in the third embodiment. That is to say, the terminal device 20 transmits a signal to the relay station 400, which provides a relay from the terminal device 20 to the base station 10, and receives a signal from the relay station 400, which provides a relay from the base station 10 to the terminal device 20.

(Dynamic AP 200)

The dynamic AP 200 is a wireless communication device, and wirelessly communicates with the macrocell base station 10 when the dynamic AP 200 is positioned within the macrocell 11. The dynamic AP 200 is, for example, a movable device. In addition, the dynamic AP 200 can operate as an access point. These points have been described in the first embodiment.

For example, the dynamic AP 200 wirelessly communicates with the relay station 400 as needed, thereby communicating with the base station 10 in the third embodiment. That is to say, the dynamic AP 200 transmits a signal to the relay station 400, which provides a relay from the dynamic AP 200 to the base station 10, and receives a signal from the relay station 400, which provides a relay from the base station 10 to the dynamic AP 200.

The one or more dynamic APs 200 perform transmission of signals to a target device in parallel along with the one or more relay stations 400 by using the same frequency resource especially in the third embodiment. For example, the target device is the base station 10 or the terminal device 20. In other words, the one or more dynamic APs 200 perform joint transmission to the base station 10 or the terminal device 20 along with the one or more relay stations 400.

(Relay Station 400)

The relay station 400 provides a relay between one device and another device as needed. The relay station 400 provides a relay to the target device especially in the third embodiment. For example, the target device is the base station 10 or the terminal device 20.

For example, the relay station 400 provides a relay to the terminal device 20 as needed. For example, the relay station 400 provides a relay from the base station 10 to the terminal device 20. That is to say, in the downlink, the relay station 400 receives signals including data addressed to the terminal device 20 from the base station 10, and transmits the signals including the data to the terminal device 20.

For example, the relay station 400 provides a relay to the base station 10 as needed. For example, the relay station 400 provides a relay from the terminal device 20 to the base station 10. That is to say, in the uplink, the relay station 400 receives signals including data addressed to another device from the terminal device 20, and transmits the signals including the data to the base station 10. For example, the relay station 400 provides a relay from the dynamic AP 200 to the base station 10. That is to say, in the uplink, the relay station 400 receives signals including data addressed to another device from the dynamic AP 200, and transmits the signals including the data to the base station 10.

The one or more relay stations 400 perform transmission of signals to a target device in parallel along with the one or more dynamic APs 200 by using the same frequency resource especially in the third embodiment. For example, the target device is the base station 10 or the terminal device 20. In other words, the one or more relay stations 400 perform joint transmission to the base station 10 or the terminal device 20 along with the one or more dynamic APs 200.

(Control Server 100-3)

When a plurality of access points perform transmission of signals to a target device in parallel using the same frequency resource, the control server 100-3 decides transmission timing for the transmission.

The plurality of access points include the one or more dynamic APs 200. Additionally, the plurality of access points include the one or more relay stations 400, which provide relays to the target device, especially in the third embodiment. That is to say, as discussed above, the one or more dynamic APs and the one or more relay stations 400 perform transmission of signals to a target device in parallel using the same frequency resource in the third embodiment. The control server 100-3 decides transmission timing of each of the one or more dynamic APs and the one or more relay stations 400 for the transmission in this case. Each of the one or more dynamic APs 200 and the one or more relay stations 400 then performs the transmission on the basis of the decided transmission timing.

(Others)

Additionally, the macrocell base station 10 and the control server 100-3 communicate with each other, for example, via a wired backbone line. Meanwhile, the macrocell base station 10 and the dynamic AP 200 communicate with each other, for example, via a wireless backbone line. These points have been described in the first embodiment.

In addition, the relay station 400 and the base station 10 communicate with each other, for example, via a wireless backbone line in the third embodiment.

3.2. Configuration of Each Device

Next, the configurations of the control server 100-3 and the relay station 400 will be described. Additionally, the configuration of the dynamic AP 200 has been described in the first embodiment.

<3.2.1. Configuration of Control Server>

Figure 17:
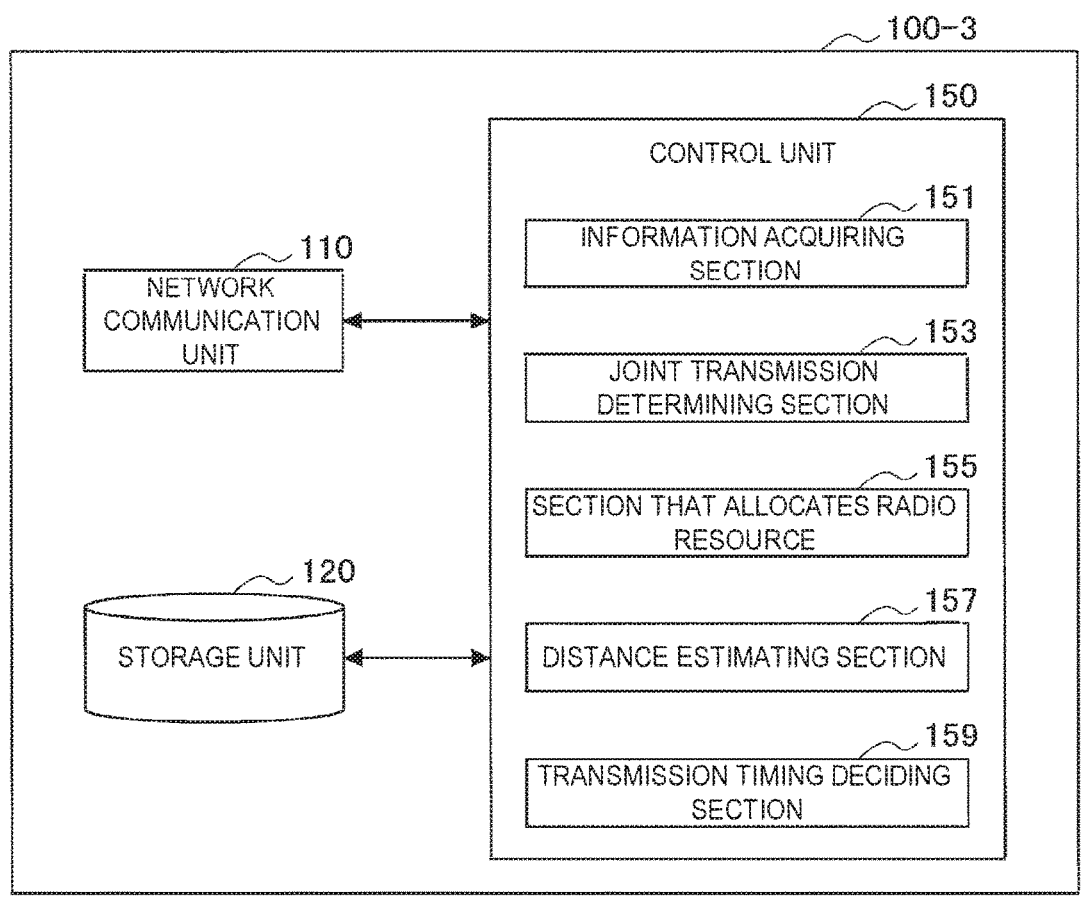
FIG. 17 is a block diagram illustrating an example of a configuration of a control server according to the third embodiment.

An example of the configuration of the control server 100-3 according to the third embodiment will be described with reference to FIG. 17. FIG. 17 is a block diagram illustrating an example of the configuration of the control server 100-3 according to the third embodiment. FIG. 17 illustrates that the control server 100-3 includes a network communication unit 110, a storage unit 120, and a control unit 150.

Additionally, there is no difference in particular in the network communication unit 110 and the storage unit 120 between the first embodiment and the third embodiment. Accordingly, the control unit 150 alone will be described here.

(Control Unit 150)

The control unit 150 provides a variety of functions of the control server 100-3. The control unit 150 includes, for example, a processor such as a CPU or a DSP. The control unit 150 then provides the variety of functions by executing a program stored in the storage unit 120 or another storage medium.

The control unit 150 includes an information acquiring section 151, a joint transmission determining section 153, a scheduling section 155, a distance estimating section 157, and a transmission timing deciding section 159.

(Information Acquiring Section 151)

The information acquiring section 151 acquires first position related information (i.e. DAP position related information) and second position related information (i.e. target device position related information), the DAP position related information relating to the positions of the one or more dynamic APs 200 among a plurality of access points that perform transmission of signals to a target device in parallel using the same frequency resource, the target device position related information relating to the position of the target device.

For example, the information acquiring section 151 acquires individual position related information from each of the one or more dynamic APs 200 via the network communication unit 110, thereby acquiring the DAP position related information.

For example, the target device is the base station 10 or the terminal device 20. When the target device is the terminal device 20, the information acquiring section 151 acquires target device position related information from the terminal device 20 via the network communication unit 110. Meanwhile, when the target device is the base station 10, the information acquiring section 151, for example, acquires target device position related information stored in the storage unit 120 (i.e. information relating to the position of the base station 10).

For example, the plurality of access points include one or more relay stations especially in the third embodiment. The information acquiring section 151 further acquires fourth position related information ("relay station position related information" below) relating to the positions of the one or more relay stations.

For example, the information acquiring section 151 acquires relay station position related information (i.e. information relating to the position of the relay station 400) stored in the storage unit 120.

DAP Position Related Information

For example, the DAP position related information includes information relating to a change in the position of each of the one or more dynamic APs 200. This point has been described in the first embodiment.

Additionally, the one or more dynamic APs 200 may be, for example, the one dynamic AP 200 or the plurality of dynamic APs 200 in the third embodiment.

Target Device Position Related Information

The content of target device position related information has been described in the first embodiment.

Relay Station Position Related Information

The relay station position related information includes positional information indicating the positions of the one or more relay stations 400. For example, the positional information indicates a fixed position that does not change with the lapse of time. In addition, the positional information is stored, for example, in the storage unit 120.

(Joint Transmission Determining Section 153)

The joint transmission determining section 153 determines whether or not a plurality of access points perform transmission of signals to a target device in parallel using the same frequency resource.

For example, once the terminal device 20 requests communication in the cell 11 via a plurality of access points, the joint transmission determining section 153 determines whether or not the plurality of access points perform transmission of signals to a target device in parallel using the same frequency resource.

For example, the joint transmission determining section 153 determines whether or not the one or more dynamic APs 200 and the one or more relay stations 400 perform transmission of signals to the terminal device 20 in parallel using the same frequency resource in the third embodiment. In other words, the joint transmission determining section 143 determines whether or not joint transmission to the terminal device 20 in the downlink is performed.

More specifically, the joint transmission determining section 153, for example, estimates the reception power of signals in the terminal device 20, and compares the estimated reception power with a threshold, the signals being transmitted by the base station 10. If the estimated reception power falls below the threshold, the joint transmission determining section 153 determines that the one or more dynamic APs 200 and the one or more relay stations 400 perform transmission of signals to the terminal device 20 in parallel using the same frequency resource. That is to say, it is determined that the macrocell base station 10 transmits signals including the same data to the one or more dynamic APs 200 and the one or more relay stations 400, and the one or more dynamic APs 200 and the one or more relay stations 400 transmit the signals including the same data to the terminal device 20 in parallel using the same frequency resource.

For example, the joint transmission determining section 153 determines whether or not the one or more dynamic APs 200 and the one or more relay stations 400 perform transmission of signals to the base station 10 in parallel using the same frequency resource in the third embodiment. In other words, the joint transmission determining section 153 determines whether or not joint transmission to the base station 10 in the uplink is performed.

More specifically, the joint transmission determining section 153, for example, estimates the reception power of signals in the base station 10, and compares the estimated reception power with a threshold, the signals being transmitted by the terminal device 20. If the estimated reception power falls below the threshold, the joint transmission determining section 153 determines that the plurality of dynamic APs 200 perform transmission of signals to the base station 10 in parallel using the same frequency resource. That is to say, it is determined that the terminal device 20 transmits signals including the same data to the one or more dynamic APs 200 and the one or more relay stations 400, and the one or more dynamic APs 200 and the one or more relay stations 400 transmit the signals including the same data to the base station 10 in parallel using the same frequency resource.

(Scheduling Section 155)

The scheduling section 155 allocates a radio resource for performing transmission of signals to the target device in parallel using the same frequency resource. In other words, the scheduling section 155 allocates a radio resource for performing joint transmission to the target device.

For example, when the communication system 1-3 is compliant with LTE, the radio resource is one or more resource blocks as an example. That is to say, the scheduling section 155 allocates one or more resource blocks for performing joint transmission to each of a plurality of access points.

The plurality of access points include, for example, the one or more dynamic APs 200 and the one or more relay stations 400 especially in the third embodiment. Accordingly, the scheduling section 155 allocates each of the one or more resource blocks to the one or more dynamic APs 200 and the one or more relay stations 400.

In addition, the scheduling section 155, for example, generates allocation information relating to the allocation of a radio resource for performing the transmission (i.e. transmission of signals to a target device in parallel using the same frequency resource). This point has been described in the first embodiment.

The scheduling section 155 then provides, for example, the allocation information to the macrocell base station 10 via the network communication unit 110. As a result, the allocation information is transmitted to the one or more dynamic APs 200 and the one or more relay stations 400, for example, by the macrocell base station 10. As a result, the radio resource is used by each of the one or more dynamic APs 200 and the one or more relay stations 400 for joint transmission in the macrocell 11.

In addition, the scheduling section 155 provides the allocation information to the distance estimating section 157.

(Distance Estimating Section 157)

The distance estimating section 157 estimates the distance between the target device and each of the one or more dynamic APs 200 during the transmission of signals to the target device on the basis of the DAP position related information and the target device position related information. This point has been described in the first embodiment.

For example, when the target device is the terminal device 20, the distance estimating section 157 estimates the distance between the terminal device 20 and each of the one or more relay stations 400 in during the transmission of signals to the terminal device 20 on the basis of the relay station position related information and the target device position related information in the third embodiment. Additionally, the distance between the terminal device 20 and each of the one or more relay stations 400 may also be estimated in the same technique for the distance between the terminal device 20 and the one or more dynamic APs 200.

In addition, for example, information relating to the distance between the base station 10 and each of the one or more relay stations 400 is prepared in advance, and stored in the storage unit 120 in the third embodiment. When the target device is the base station 10, the information relating to the distance is then acquired from the storage unit 120.

For example, the information relating to the distance between the base station 10 and each of the one or more relay stations 400 includes information on the distance.

Additionally, the information relating to the distance between the base station 10 and each of the one or more relay stations 400 may include information on a propagation delay time between the base station 10 and the one or more relay stations 400 instead of the information on the distance or in combination with the information on the distance. The information on a propagation delay time may be, for example, updated as required on the basis of a result obtained by actually measuring a propagation delay time.
(Transmission Timing Deciding Section 159)

The transmission timing deciding section 159 decides transmission timing of each of the plurality of access points for the transmission of signals to the target device on the basis of information relating to the distance between the target device and each of the plurality of access points. The information relating to the distance includes information on the estimated distance between the target device and each of the one or more dynamic APs 200.

In addition, for example, when the target device is the terminal device 20, the information relating to the distance includes information on the estimated distance between the terminal device 20 and each of the one or more relay stations 400 in the third embodiment. Meanwhile, for example, when the target device is the base station 10, the information relating to the distance includes the information relating to the distance between the base station 10 and each of the one or more relay stations 400.

For example, the decided transmission timing is timing of the transmission in a transmission frame in which the transmission of signals to the terminal device 20 is performed.

As specific processing, the transmission timing deciding section 159, for example, selects the farthest device from the target device among the one or more dynamic APs 200 and the one or more relay stations 400. The device is selected on the basis of information on the estimated distance between the terminal device 20 and each of the one or more dynamic APs 200 and information relating to the distance between the target device and each of the one or more relay stations 400. The information relating to the distance between the target device and each of the one or more relay stations 400 is information on the estimated distance between the terminal device 20 and each of the one or more relay stations 400 if the target device is the terminal device 20. For example, the information relating to the distance between the target device and each of the one or more relay stations 400 is information (prepared in advance) on the distance between the terminal device 20 and each of the one or more relay stations 400 if the target device is the base station 10. The transmission timing deciding section 159 then decides, as transmission timing of the selected device (dynamic AP 200 or relay station 400), a starting point of a transmission frame with which the transmission (i.e. joint transmission) of signals to the target device is performed, for example.

The transmission timing deciding section 159, for example, estimates a propagation delay time (which will be referred to as "reference propagation delay time" below) from the selected device to the target device on the basis of the information on the distance between the target device and the selected device. In addition, the transmission timing deciding section 159 estimates a propagation delay time of signals from the other individual devices of the one or more dynamic APs 200 and the one or more relay stations 400 to the terminal device 20 for the other individual devices on the basis of information on the distance between the terminal device 20 and the individual devices. The transmission timing deciding section 159 then calculates a difference between the estimated propagation delay time and the reference propagation delay time. The transmission timing deciding section 159 decides, as transmission timing of the individual devices (dynamic APs 200 or relay stations 400), a time point that is delayed from the starting time point of a transmission frame as much as the difference.

In this way, the transmission timing deciding section 159, for example, decides transmission timing of each of the one or more dynamic APs 200 and the one or more relay stations 400 for the transmission (i.e. joint transmission) of signals to the target device.

Additionally, when the information relating to the distance between the base station 10 and each of the one or more relay stations 400 includes information on a propagation delay time between the base station 10 and the one or more relay stations 400, the propagation delay time does not have to be estimated.

The transmission timing deciding section 149 provides information on the decided transmission timing to a plurality of access points via the network communication unit 110, the plurality of access points performing the transmission (i.e. joint transmission) of signals to the target device. The information on the decided transmission timing is provided to the one or more dynamic APs 200 and the one or more relay stations 400 in the third embodiment.

Additionally, the transmission timing deciding section 159 may decide the transmission timing further on the basis of propagation path information relating to a propagation path between the target device and each of the one or more dynamic APs 200. This point has been described in the first embodiment.

<3.2.2. Configuration of Relay Station>

Figure 18:
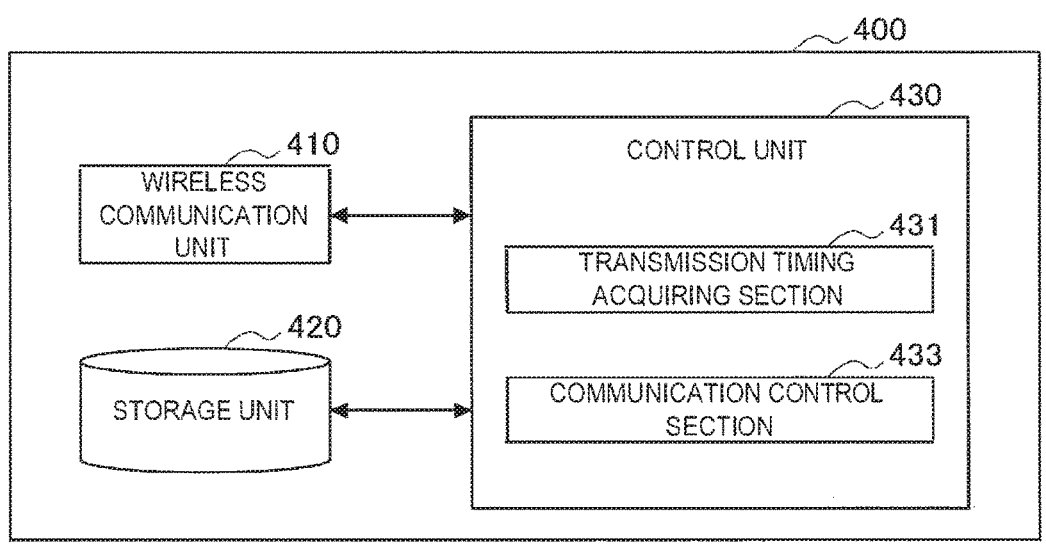
FIG. 18 is a block diagram illustrating an example of a configuration of a relay station according to the third embodiment.

An example of the configuration of the relay station 400 according to the third embodiment will be described with reference to FIG. 18. FIG. 18 is a block diagram illustrating an example of the configuration of the relay station 400 according to the third embodiment. FIG. 18 illustrates that the relay station 400 includes a wireless communication unit 410, a storage unit 420, and a control unit 430.
(Wireless Communication Unit 410)

The wireless communication unit 410 wirelessly communicates with another device. That is to say, the wireless communication unit 410 transmits a signal to the other device, and receives a signal transmitted by the other device.

For example, the wireless communication unit 410 wirelessly communicates with the base station 10. For example, the wireless communication unit 410 wirelessly communicates with the terminal device 20. In addition, the wireless communication unit 410 wirelessly communicates, for example, with the dynamic AP 200. The wireless communication unit 410 includes, for example, a communication antenna, an RF circuit, and another communication processing circuit.

(Storage Unit 420)

The storage unit 420 stores a program and data for operating the relay station 400. The storage unit 420 includes, for example, a magnetic storage device such as a hard disk, or nonvolatile memory such as EEPROM and flash memory.

(Control Unit 430)

The control unit 430 provides a variety of functions of the relay station 400. The control unit 430 includes, for example, a processor such as a CPU or a DSP. The control unit 430 then provides the variety of functions by executing a program stored in the storage unit 420 or another storage medium.

The control unit 430 includes a transmission timing acquiring section 431 and a communication control section 433.

(Transmission Timing Acquiring Section 431)

The transmission timing acquiring section 431 then acquires information on the transmission timing of the relay station 400 for the transmission (i.e. joint transmission) of signals to the terminal device 20.

In addition, the transmission timing acquiring section 431 acquires allocation information including information on a transmission frame with which the transmission of signals to the terminal device 20 is performed.

For example, once the control server 100-3 provides the allocation information and the information on the transmission timing to the base station 10, the base station 10 transmits the allocation information and the information on the transmission timing to the relay station 400. The transmission timing acquiring section 431 then acquires the allocation information and the information on the transmission timing via the wireless communication unit 410.

(Communication Control Section 433)

The communication control section 433 controls communication performed by the relay station 400.

In particular, based on the transmission timing of the relay station 400 for the transmission (i.e. joint transmission) of signals to a target device in parallel using the same frequency resource, the communication control section 433 controls the transmission of the relay station 400 for the transmission.

For example, once the transmission timing acquiring section 431 acquires transmission timing and allocation information, the communication control section 433 causes the wireless communication unit 410 to transmit signals to the target device at the transmission timing in a transmission frame in which the transmission of signals to the target device is performed.

3.3. Flow of Processing

Next, an example of communication control processing according to the third embodiment will be described with reference to FIGS. 19A to 20.

(Communication Control Processing for Downlink)

Figure 19C:
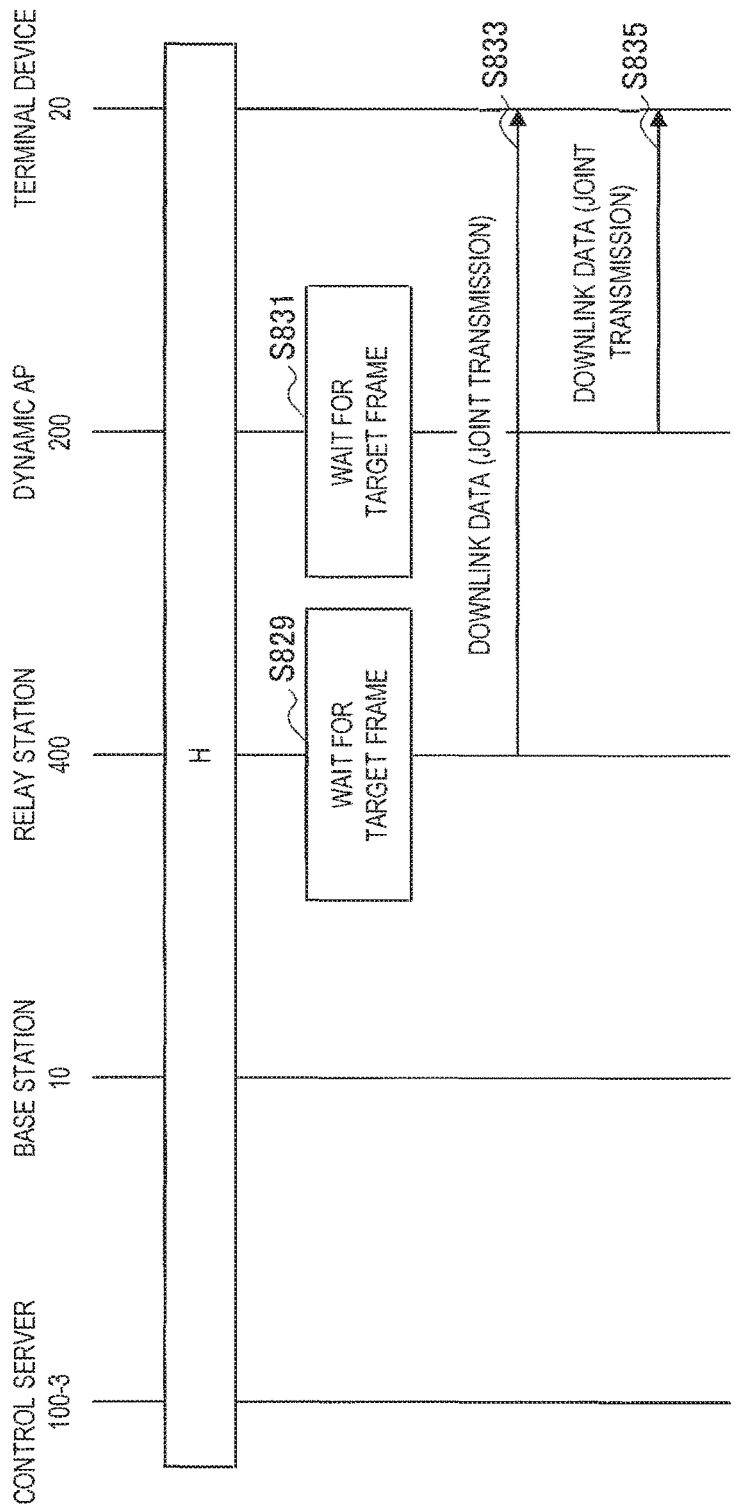
FIG. 19C is a flowchart illustrating the example of the schematic flow of the communication control processing according to the third embodiment for a downlink.

First of all, an example of communication control processing for the downlink will be described with reference to FIGS. 19A to 19C. Each of FIGS. 19A to 19C is a flowchart illustrating an example of a schematic flow of communication control processing according to the third embodiment for the downlink.

First of all, the information acquiring section 241 of the dynamic AP 200 acquires individual position related information relating to the position of the dynamic AP 200 (step S801). Furthermore, the terminal device 20 also acquires position related information relating to the position of the terminal device 20 (step S803).

The terminal device 20 then transmits a request for communication by the terminal device 20 in the cell 11 and the position related information relating to the position of the terminal device 20 to the dynamic AP 200 and the relay station 400 (steps S805 and S807).

The information providing section 243 of the dynamic AP 200 transmits the request for communication by the terminal device 20 in the cell 11, the position related information relating to the position of the terminal device 20, and the individual position related information relating to the position of the dynamic AP 200 to the base station 10 via the wireless communication unit 210 (S809).

In addition, the relay station 400 transmits a request for communication by the terminal device 20 in the cell 11 and the position related information relating to the position of the terminal device 20 to the base station 10 via the wireless communication unit 410 (S811).

Thereafter, the base station 10 transmits the request for communication by the terminal device 20 in the cell 11, the position related information relating to the position of the terminal device 20, and the individual position related information relating to the position of the dynamic AP 200 to the control server 100-3 (S813).

The joint transmission determining section 153 of the control server 100-3 then determines whether or not the dynamic AP 200 and the relay station 400 perform transmission of signals to the terminal device 20 in parallel using the same frequency resource (S815). Here, for example, the joint transmission determining section 153 determines that the transmission of signals to the terminal device 20 is performed.

The scheduling section 155 of the control server 100-3 then allocates a radio resource for performing the transmission of signals to the terminal device 20 (S817). Moreover, the distance estimating section 157 of the control server 100-3 estimates the distance between the terminal device 20 and each of the dynamic AP 200 and the relay station 400 during the transmission of signals to the terminal device 20 on the basis of the position related information on each device (S819).

The transmission timing deciding section 159 of the control server 100-3 then decides transmission timing of each of the dynamic AP 200 and the relay station 400 for the transmission (i.e. joint transmission) of signals to the terminal device 20 on the basis of information on the estimated distance (S821).

Thereafter, the control server 100-3 transmits downlink data addressed to the terminal device 20, allocation information relating to the allocation of a radio resource, and information on the decided transmission timing to the base station 10 (S823).

Moreover, the base station 10 transmits the downlink data addressed to the terminal device 20, the allocation information, and the information on the decided transmission timing to the dynamic AP 200 and the relay station 400 (S825 and S827).

Thereafter, the dynamic AP 200 and the relay station 400 wait for a target frame corresponding to the allocated radio resource (S829 and S831).

The communication control section 433 of the relay station 400 then transmits signals including the downlink data to the terminal device 20 with the target frame at the decided transmission timing of the relay station 400 (S833).

The communication control section 247 of the dynamic AP 200 also transmits signals including the downlink data to the terminal device 20 with the target frame at the decided transmission timing of the dynamic AP 200 (S835).

(Communication Control Processing for Uplink)

Furthermore, an example of communication control processing for the uplink will be described with reference to FIGS. 20A to 20C. Each of FIGS. 20A to 20C is a flowchart illustrating an example of a schematic flow of communication control processing according to the third embodiment for the downlink.

First of all, the information acquiring section 241 of the dynamic AP 200 acquires individual position related information relating to the position of the dynamic AP 200 (step S901).

The terminal device 20 then transmits a request for communication by the terminal device 20 in the cell 11 to the dynamic AP 200 and the relay station 400 (steps S903 and S905).

The information providing section 243 of the dynamic AP 200 transmits the request for communication by the terminal device 20 in the cell 11 and the individual position related information relating to the position of the dynamic AP 200 to the base station 10 via the wireless communication unit 210 (S907).

In addition, the relay station 400 transmits a request for communication by the terminal device 20 in the cell 11 to the base station 10 via the wireless communication unit 410 (S909).

Thereafter, the base station 10 transmits the request for communication by the terminal device 20 in the cell 11 and the individual position related information relating to the position of the dynamic AP 200 to the control server 100-3 (S911).

The joint transmission determining section 153 of the control server 100-3 then determines whether or not the dynamic AP 200 and the relay station 400 perform transmission of signals to the base station 10 in parallel using the same frequency resource (S913). Here, for example, the joint transmission determining section 153 determines that the transmission of signals to the base station 10 is performed.

The scheduling section 155 of the control server 100-3 then allocates a radio resource for performing the transmission of signals to the base station 10 (S915).

Moreover, the distance estimating section 157 of the control server 100-3 estimates the distance between the base station 10 and the dynamic AP 200 during the transmission of signals to the base station 10 on the basis of the position related information on each device (S917).

The transmission timing deciding section 159 of the control server 100-3 then decides transmission timing of each of the dynamic AP 200 and the relay station 400 for the transmission (i.e. joint transmission) of signals to the base station 10 on the basis of information on the estimated distance and information relating to the distance between the base station 10 and the relay station 400 (S919).

Thereafter, the control server 100-3 transmits allocation information relating to the allocation of a radio resource and information on the decided transmission timing to the base station 10 (S921).

Moreover, the base station 10 transmits the allocation information and the information on the decided transmission timing to the relay station 400 and the dynamic AP 200 (S923 and S925).

Thereafter, the terminal device 20 transmits signals including uplink data to the dynamic AP 200 and the relay station 400 (S927 and S929).

The dynamic AP 200 and the relay station 400 then wait for a target frame corresponding to the allocated radio resource (S931 and S933).

Thereafter, the communication control section 433 of the relay station 400 transmits signals including the uplink data to the base station 10 with the target frame at the decided transmission timing of the relay station 400 (S935).

The communication control section 247 of the dynamic AP 200 also transmits signals including the uplink data to the base station 10 with the target frame at the decided transmission timing of the dynamic AP 200 (S937).

3.4. Modified Example

Next, a modified example of the third embodiment will be described with reference to FIGS. 21 and 22.

FIG. 16 has illustrated an example in which the one or more dynamic APs 200 and the one or more relay stations 400 communicate with the base station 10 of the cell 11, and perform joint transmission to the base station 10 or the terminal device 20 as an example of the third embodiment.

First Modified Example

Meanwhile, the one or more dynamic APs 200 and the one or more relay stations 400 may also communicate with a small cell base station 30 of a small cell 31 a part or the whole of which overlaps with the cell 11, and perform joint transmission to the small cell base station 30 or the terminal device 20 as a first modified example of the third embodiment. That is to say, a target device that is a target of joint transmission may be a small cell base station. A specific example of the first modified example will be described with reference to FIG. 21.

Figure 21:
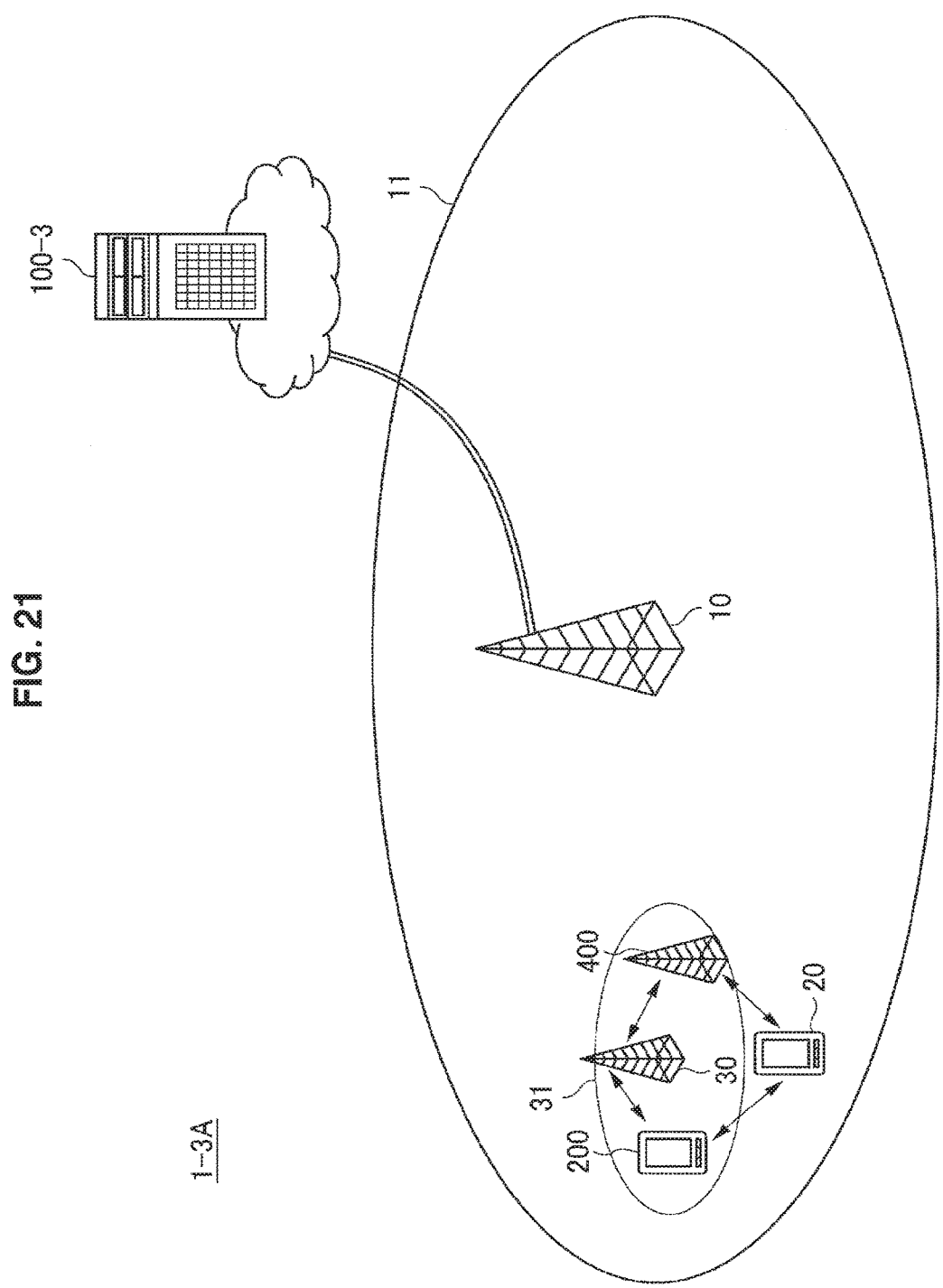
FIG. 21 is an explanatory diagram illustrating an example of a schematic configuration of a communication system according to a first modified example of the third embodiment.

FIG. 21 is an explanatory diagram illustrating an example of a schematic configuration of a communication system 1-3A according to the first modified example of the third embodiment. As illustrated in FIG. 21, the communication system 1-3A may include the small cell base station 30 in the first modified example of the third embodiment. When the dynamic AP 200 and the relay station 400 communicate with the small cell base station 30, transmission of signals to the small cell base station 30 or the terminal device 20 in parallel may be performed using the same frequency resource. As with the base station 10, transmission timing of joint transmission to the terminal device 20 or the small cell base station 30 is decided even in such a case of the small cell base station 30.

Second Modified Example

A part of the one or more dynamic APs 200 and the one or more relay stations 400 may communicate with the small cell base station 30 of the small cell 31, and the rest of the one or more dynamic APs 200 and the one or more relay stations 400 may communicate with the base station 10 as a second modified example of the third embodiment. The one or more dynamic APs 200 and the one or more relay stations 400 may then perform joint transmission to the terminal device 20 in this case. A specific example of the second modified example will be described with reference to FIG. 22.

FIG. 22 is an explanatory diagram illustrating an example of a schematic configuration of a communication system 1-3B according to the second modified example of the third embodiment. As illustrated in FIG. 22, the communication system 1-3B may also include the small cell base station 30 in the first modified example of the third embodiment. When the relay station 400 communicates with the base station 10 and the dynamic AP 200 communicates with the small cell base station 30, the dynamic AP 200 and the relay station 400 may perform transmission of signals to the terminal device 20 in parallel using the same frequency resource. Transmission timing for joint transmission to the terminal device 20 is decided in the same way even in such a case.

It goes without saying that if both of the one or more dynamic APs 200 and the one or more relay stations 400 have any chance to communicate with the base station 10 (i.e. macro cell base station), the one or more dynamic APs 200 and the one or more relay stations 400 may perform transmission of signals to the base station 10 or the terminal device 20 in parallel using the same frequency resource in the second modified example. If both of the one or more dynamic APs 200 and the one or more relay stations 400 have any chance to communicate with the small cell base station 30, the one or more dynamic APs 200 and the one or more relay stations 400 may perform transmission of signals to the terminal device 20 or the small cell base station 30 in parallel using the same frequency resource.

4. Conclusion

FIGS. 1 to 22 have been used so far to describe each of the devices and processing according to each embodiment of the present disclosure. According to an embodiment of the present disclosure, DAP position related information and target device position related information are acquired, the DAP position related information relating to the positions of the one or more dynamic APs 200 among a plurality of access points that perform transmission of signals to a target device in parallel using the same frequency resource, the target device position related information relating to the position of the target device. In addition, the distance between the target device and each of the one or more dynamic APs 200 during the transmission is estimated on the basis of the DAP position related information and the target device position related information. Furthermore, transmission timing of each of the plurality of access points for the transmission is decided on the basis of information relating to the distance between the target device and each of the plurality of access points, the information including information on the estimated distance. Moreover, the DAP position related information includes information relating to a change in the position of each of the one or more dynamic APs 200.

Accordingly, it becomes possible to increase the reception power level of signals with joint transmission even when one or more of a plurality of access points may move, the plurality of access points performing transmission (i.e. joint transmission) of the signals to a target device in parallel using the same frequency resource. That is to say, even if the dynamic AP 200 moves before performing joint transmission, it is possible to reduce a gap of the timing at which a target device receives signals of the joint transmission because the transmission timing is decided on the basis of the distance between the target device and the moved dynamic AP 200. As a result, the reception power level of the signals in the target device is increased.

In addition, the use of the movable dynamic AP 200 as an access point makes it possible to form a flexible network. That is to say, it is possible to increase the reception power of signals by use of joint transmission while forming a flexible network. An increase in the reception power of signals may result in increased transmission speed for a target device and increased network capacity.

Regarding Downlink

For example, the target device is the terminal device 20. Accordingly, it becomes possible to increase the reception power level of signals in the terminal device 20 for joint transmission in the downlink.

Furthermore, target device position related information includes, for example, information relating to a change in the position of the terminal device 20.

Accordingly, it becomes possible to increase the reception power level of the signals with joint transmission even if the terminal device 20, which is a target of the joint transmission, may move. That is to say, even if the terminal device 20 moves before performing joint transmission, it is possible for the terminal device 20 to receive signals of the joint transmission at the same timing because transmission timing is decided on the basis of the distance between the moved terminal device 20 and the moved dynamic AP 200. As a result, the reception power level of the signals in the terminal device 20 is increased.

Additionally, the plurality of access points include, for example, one or more base stations as described in the second embodiment.

Accordingly, it becomes possible to increase the reception power level of signals in the terminal device 20 with joint transmission even when there is only a single dynamic AP positioned around the terminal device 20. It also becomes possible to perform joint transmission to the terminal device 20 with a smaller number of the dynamic APs 200 from another perspective. That is to say, it is possible to reduce the power consumption of the dynamic AP 200.

For example, the one or more base stations include at least one small cell base station 300.

Accordingly, the small cell base station 300 positioned around the terminal device 20 can increase the reception power level of signals in the terminal device 20 with joint transmission even when the only one dynamic AP 200 is positioned around the terminal device 20. To the contrary, the dynamic AP 300 positioned around the terminal device 20 can increase the reception power level of signals in the terminal device 20 with joint transmission even when the only one small cell base station 300 is positioned around the terminal device 20.

It also becomes possible to perform joint transmission to the terminal device 20 with a smaller number of the dynamic APs 200 from another perspective, when the small cell base station 300 is installed. That is to say, it is possible to reduce the power consumption of the dynamic AP 200.

Meanwhile, the one or more base stations may include at least the one macrocell base station 10 as described in the modified example of the second embodiment.

Accordingly, it becomes possible for a single dynamic AP alone, which is positioned around the terminal device 20, to increase the reception power level of signals in the terminal device 20 when the small cell base station 300 is not installed or when the small cell base station 300 is not positioned around the terminal device 20.

Regarding Uplink

For example, the target device is a base station. Accordingly, it becomes possible to increase the reception power level of signals in a base station for joint transmission in the uplink.

Furthermore, the target device may be the mall cell base station 30 as described in the first modified example of the first embodiment and the first modified example of the third embodiment.

Accordingly, it becomes possible to increase the reception power level of signals in the small cell base station 30.

Regarding Downlink and Uplink

A plurality of access points are, for example, the dynamic APs 200 as described in the modified examples of the first embodiment.

Accordingly, it is possible to increase the reception power level of signals in a target device (terminal device 20 or base station) only with the dynamic AP 200 positioned within the cell. It is thus possible to perform effective joint transmission while forming a more flexible network.

Additionally, a plurality of access points include, for example, the one or more relay stations 400, which provide relays to the target device, as described in the modified examples of the third embodiment.

Accordingly, the relay station 400 positioned around the terminal device 20 can increase the reception power level of signals in the terminal device 20 with joint transmission even when the one dynamic AP 200 alone is positioned around the terminal device 20. To the contrary, the dynamic AP 200 positioned around the terminal device 20 can increase the reception power level of signals in the terminal device 20 with joint transmission even when the one relay station 400 alone is positioned around the terminal device 20.

It also becomes possible to perform joint transmission to the terminal device 20 with a smaller number of the dynamic APs 200 from another perspective, when the relay station 400 is installed. That is to say, it is possible to reduce the power consumption of the dynamic AP 200.

Others

Additionally, the transmission timing may be decided further on the basis of propagation path information relating to a propagation path between the target device and each of the one or more dynamic APs 200.

Accordingly, a propagation delay time according to the characteristics of a propagation path may be calculated, so that more approximate transmission timing can be decided. As a result, it is possible to further reduce a gap of the timing at which a target device receives signals of joint transmission. As a result, the reception power level of the signals in the target device is further increased.

In addition, the distance between the target device and each of the one or more dynamic APs 200 during the transmission is, for example, estimated further on the basis of allocation information relating to the allocation of a radio resource for performing the transmission.

The allocation information includes, for example, information on a transmission frame with which the transmission is performed. The decided transmission timing is timing of the transmission in the transmission frame.

Accordingly, it becomes possible to estimate the position of the moved dynamic AP 200 during the joint transmission, even when a radio resource (such as a transmission frame) for joint transmission is flexibly decided.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, an example has been described in which information relating to a change in the position of a dynamic AP includes positional information and movement information on the dynamic AP, but the present disclosure is not limited to the example. The information relating to a change in the position may be another kind of information that allows a change in the position of a dynamic AP to be estimated. As an example, the information relating to a change in the position may be positional information on a dynamic AP at a plurality of time points. According to such a kind of information, for example, it becomes possible to acquire information equal to the movement information.

Meanwhile, an example has been described in which the distance between a target device and a dynamic AP is estimated on the basis of allocation information relating to the allocation of a radio resource, but the present disclosure is not limited to the example. For example, if a radio resource (such as a transmission frame) with which joint transmission is performed has been decided in advance, the allocation information does not have to be used to estimate the distance.

The transmission timing may be decided in terms of the Doppler Effect in the movement of a dynamic AP (and a terminal device).

An example has been described in which the transmission timing is decided on the basis of propagation path information, but the present disclosure is not limited to the example. For example, the propagation path information does not have to be used to decide the transmission timing. Apart from the decision of the transmission timing, a change in a phase (i.e. phase shift) of a propagation path may be overcome by the processing of a dynamic AP.

An example has been described in which a communication system includes a control server, but the present disclosure is not limited to the example. For example, a base station may have the function of the control server.

An example has been described in which a terminal device and a dynamic AP are smartphones, but the present disclosure is not limited to the example. For example, these devices may be other devices such as tablet terminals, personal computers (PCs), personal digital assistants, electronic book terminals, car navigation systems, and game consoles.

Processing steps in the communication control processing in the present description do not necessarily have to be performed in the chronological order described in the flowcharts. For example, the processing steps in the communication control processing may be performed in order different from the order described as the flowcharts, or may be performed in parallel.

It is also possible to create a computer program for causing hardware such as a CPU, ROM, and RAM built in a communication control device (such as a control server) and a wireless communication device (such as a dynamic AP) to execute the communication control processing and the same function as that of each configuration of the wireless communication control device. There is also provided a storage medium having the computer program stored therein.

Additionally, the present disclosure may also be configured as below.

(1)

A communication control device including:

an acquiring section configured to acquire first position related information and second position related information, the first position related information relating to positions of one or more wireless communication devices among a plurality of access points that perform transmission of signals to a target device in parallel using an identical frequency resource, the second position related information relating to a position of the target device;

an estimating section configured to estimate a distance between the target device and each of the one or more wireless communication devices during the transmission on the basis of the first position related information and the second position related information; and a deciding section configured to decide transmission timing of each of the plurality of access points for the transmission on the basis of information that includes information on the estimated distance and relates to a distance between the target device and each of the plurality of access points, wherein the first position related information includes information relating to a change in the position of each of the one or more wireless communication devices.

(2)

The communication control device according to (1), wherein the target device is a terminal device.

(3)

The communication control device according to (2), wherein the second position related information includes information relating to a change in the position of the target device.

(4)

The communication control device according to (2) or (3), wherein the plurality of access points include one or more base stations.

(5)

The communication control device according to (4), wherein the acquiring section further acquires third position related information relating to positions of the one or more base stations, wherein the estimating section estimates a distance between the target device and each of the one or more base stations during the transmission on the basis of the second position related information and the third position related information, wherein the information relating to the distance between the target device and each of the plurality of access points includes information on the estimated distance between the target device and each of the one or more base stations, and wherein the third position related information further includes positional information indicating the positions of the one or more base stations.

(6)

The communication control device according to (4) or (5), wherein the one or more base stations include at least one base station of a small cell.

(7)

The communication control device according to any one of (4) to (6), wherein the one or more base stations include at least one base station of a macrocell.

(8)

The communication control device according to (1), wherein the target device is a base station.

(9)

The communication control device according to (8), wherein the second position related information includes positional information indicating the position of the target device.

(10)

The communication control device according to (8) or (9), wherein the target device is a base station of a small cell.

(11)

The communication control device according to (1), wherein a plurality of access points are the one or more wireless communication devices.

(12)

The communication control device according to (1), wherein the plurality of access points include one or more relay stations that provide relays to the target device.

(13)

The communication control device according to (12), wherein the target device is a base station, and wherein the information relating to the distance between the target device and each of the plurality of access points includes information on a distance between the target device and the one or more relay stations or information on a propagation delay time between the target device and the one or more relay stations.

(14)

The communication control device according to any one of (1) to (13), wherein the deciding section decides the transmission timing further on the basis of propagation path information relating to a propagation path between the target device and each of the one or more wireless communication devices.

(15)

The communication control device according to (14), wherein the propagation path information includes information relating to a change in a phase of the propagation path.

(16)

The communication control device according to any one of (1) to (15), wherein the estimating section estimates the distance further on the basis of allocation information relating to an allocation of a radio resource for performing the transmission.

(17)

The communication control device according to (16), wherein the allocation information includes information on a transmission frame with which the transmission is performed, and wherein the decided transmission timing is timing of transmission in the transmission frame.

(18)

A communication control method including:

acquiring first position related information and second position related information, the first position related information relating to positions of one or more wireless communication devices among a plurality of access points that perform transmission of signals to a target device in parallel using an identical frequency resource, the second position related information relating to a position of the target device;

estimating a distance between the target device and each of the one or more wireless communication devices during the transmission on the basis of the first position related information and the second position related information; and deciding transmission timing of each of the plurality of access points for the transmission on the basis of information that includes information on the estimated distance and relates to a distance between the target device and each of the plurality of access points, wherein the first position related information includes information relating to a change in the position of each of the one or more wireless communication devices.

(19)

A wireless communication device including:

a communication control section configured to operate the wireless communication device as an access point; and an acquiring section configured to, when the wireless communication device and one or more access points perform transmission of signals to a target device in parallel using an identical frequency resource, acquire information on transmission timing of the wireless communication device for the transmission after a communication control device decides transmission timing of the wireless communication device and each of the one or more access points for the transmission, wherein the communication control section controls transmission of the wireless communication device for the transmission on the basis of the transmission timing of the wireless communication device for the transmission, wherein the transmission timing of the wireless communication device and each of the one or more access points for the transmission is decided on the basis of information relating to a distance between the target device and the wireless communication device and between the target device and each of the one or more access points, wherein the information relating to the distance includes information on a distance to be estimated between the target device and the wireless communication device during the transmission, wherein the distance to be estimated is estimated on the basis of individual position related information relating to a position of the wireless communication device and position related information relating to a position of the target device, and wherein the individual position related information includes information on a change in the position of the wireless communication device.

(20)

The communication device according to (19), further including:

an acquiring section configured to acquire the individual position related information; and a providing section configured to provide the individual position related information to the communication control device.

REFERENCE SIGNS LIST

1 communication system
10 base station (macrocell base station)
11 cell (macrocell)
20 terminal device
30 small cell base station
31 small cell
100 control server
131, 141, 151 information acquiring section
137, 147, 157 distance estimating section
139, 149, 159 transmission timing deciding section
200 dynamic AP
241 information acquiring section
243 information providing section
245 transmission timing acquiring section
247 communication control section
300 small cell base station
400 relay station

The invention claimed is:

1. A communication control device, comprising:
circuitry configured to:
acquire first position related information and second position related information, wherein the first position related information relates to a position of at least one wireless communication device that corresponds to an access point of a plurality of access points, and the second position related information relates to a position of a target device;
estimate the position of the target device and the at least one wireless communication device based on the first position related information and the second position related information;
determine transmission timing of each of the plurality of access points for transmission of a signal to the target device, wherein the transmission timing is determined based on the first position related information and the second position related information; and
generate allocation information that comprises identification information related to a frequency resource, wherein the frequency resource is utilized for the transmission of the signal to the target device, wherein the at least one wireless communication device transmits the signal to the target device in parallel based on the frequency resource, and
wherein the second position related information further includes information that relates to a change in the position of the target device.

2. The communication control device according to claim 1, wherein the target device is a terminal device.

3. The communication control device according to claim 1, wherein the target device is a base station.

4. The communication control device according to claim 3, wherein the second position related information further includes positional information indicating the position of the target device.

5. The communication control device according to claim 1, wherein the target device is a base station of a small cell.

6. The communication control device according to claim 1, wherein the access point includes a relay station configured to provide a relay to the target device.

7. The communication control device according to claim 6,
wherein the target device is a base station, and
wherein the first position related information related to a distance between the target device and the access point includes at least one of first information on the distance between the target device and the relay station or second information on a propagation delay time between the target device and the relay station.

8. The communication control device according to claim 1, wherein the circuitry is further configured to estimate the position of the target device and the at least one wireless communication device based on a transmission frame included in the allocation information.

9. A communication control method, comprising:
acquiring first position related information and second position related information, wherein the first position related information is related to a position of at least one wireless communication device that corresponds to an access point of a plurality of access points, and the second position related information is related to a position of a target device;
estimating the position of the target device and the at least one wireless communication device based on the first position related information and the second position related information;
determining transmission timing of each of the plurality of access points for transmission of a signal to the target device, wherein the transmission timing is determined based on the first position related information and the second position related information; and
generating allocation information comprising identification information related to a frequency resource, wherein the frequency resource is utilized for the transmission of the signal to the target device, wherein the at least one wireless communication device transmits the signal to the target device in parallel based on the frequency resource, and wherein the second position related information further includes information related to a change in the position of the target device.

* * * * *